US012712488B2

(12) United States Patent
Ge et al.

(10) Patent No.: US 12,712,488 B2
(45) Date of Patent: Aug. 18, 2026

(54) MATERIAL/GAUGE TRANSITION CONNECTORS FOR PHOTOVOLTAIC WIRING SYSTEMS

(71) Applicant: Voltage, LLC, Chapel Hill, NC (US)

(72) Inventors: Ruiyan Ge, Ningbo (CN); Li Wang, Ningbo (CN)

(73) Assignee: VOLTAGE, LLC, Chapel Hill, NC (US)

( * ) Notice: Subject to any disclaimer, the term of this patent is extended or adjusted under 35 U.S.C. 154(b) by 0 days.

(21) Appl. No.: 19/319,538

(22) Filed: Sep. 4, 2025

(65) Prior Publication Data

US 2026/0005647 A1 Jan. 1, 2026

Related U.S. Application Data

(63) Continuation-in-part of application No. 18/957,438, filed on Nov. 22, 2024, which is a (Continued)

(51) Int. Cl.

*H02S 40/36* (2014.01)
*H01B 7/00* (2006.01)
(Continued)

(52) U.S. Cl.

CPC ........... *H02S 40/36* (2014.12); *H01B 7/0045* (2013.01); *H01R 4/625* (2013.01); *H01R 4/72* (2013.01)

(58) Field of Classification Search

CPC ........... H02S 40/30; H02S 40/36; H01R 4/70; H01R 4/625

(Continued)

(56) References Cited

U.S. PATENT DOCUMENTS 1,831,002 A 11/1931 Hickey
3,243,211 A 3/1966 Douglas
(Continued)

FOREIGN PATENT DOCUMENTS

CN 2336459 9/1999
CN 2411542 12/2000
(Continued)

OTHER PUBLICATIONS

Amended Complaint, Inv. No. 337-TA-1365 (Jul. 19, 2023).
(Continued)

*Primary Examiner* — Hae Moon Hyeon
(74) *Attorney, Agent, or Firm* — Weaver Austin Villeneuve & Sampson LLP

(57) ABSTRACT

An apparatus for forming electrical connections comprises a metal transition conductor, a terminal portion of a first electrical cable electrically and mechanically coupled to the metal transition conductor, a terminal portion of a second electrical cable electrically and mechanically coupled to the metal transition conductor, and a terminal portion of a third electrical cable electrically and mechanically coupled to the metal transition conductor. Each of the first, second, and third electrical cables terminates at the metal transition conductor. At least two of the first, second, and third electrical cables comprise conductors of different metal materials, and at least two of the first, second, and third electrical cables comprise conductors of different wire gauges. The apparatus also includes a mold structure encasing the metal transition conductor, the terminal portion of the first electrical cable, the terminal portion of the second electrical cable, and the terminal portion of the third electrical cable.

29 Claims, 38 Drawing Sheets

Related U.S. Application Data continuation-in-part of application No. 17/870,307, filed on Jul. 21, 2022.

(60) Provisional application No. 63/224,631, filed on Jul. 22, 2021.

(51) Int. Cl.
*H01R 4/62* (2006.01)
*H01R 4/72* (2006.01)

(58) Field of Classification Search
USPC .......................... 439/523, 730, 505, 449, 798
See application file for complete search history.

(56) References Cited

U.S. PATENT DOCUMENTS

| | | | | | |
|---|---|---|---|---|---|
| 3,700,786 | A | | 10/1972 | Lawrenson | |
| 3,777,050 | A | | 12/1973 | Silva | |
| 3,795,757 | A | | 3/1974 | Higgins | |
| 3,852,516 | A | * | 12/1974 | Vander Ploog | H02G 15/003 174/76 |
| 4,077,697 | A | | 3/1978 | Yates | |
| 4,464,583 | A | | 8/1984 | Holmgren | |
| 4,778,948 | A | | 10/1988 | Fitch et al. | |
| 5,316,789 | A | | 5/1994 | Ookuma et al. | |
| 5,403,977 | A | | 4/1995 | Steptoe et al. | |
| 6,025,560 | A | | 2/2000 | De Buyst et al. | |
| 6,265,665 | B1 | | 7/2001 | Zahnen | |
| 6,268,559 | B1 | * | 7/2001 | Yamawaki | H02S 40/34 307/77 |
| 7,387,537 | B1 | | 6/2008 | Daily et al. | |
| 7,442,077 | B2 | | 10/2008 | Peress et al. | |
| 7,445,488 | B2 | | 11/2008 | Feldmeier et al. | |
| 7,511,226 | B2 | | 3/2009 | Fahey | |
| 7,824,191 | B1 | | 11/2010 | Browder | |
| 7,896,712 | B2 | * | 3/2011 | Cecil | H01R 4/20 439/810 |
| 8,207,637 | B2 | | 6/2012 | Marroquin et al. | |
| 8,227,696 | B2 | | 7/2012 | Pullium, III et al. | |
| 8,227,942 | B2 | | 7/2012 | Marroquin et al. | |
| 8,604,342 | B2 | * | 12/2013 | Solon | H01R 43/24 174/72 A |
| 8,632,358 | B2 | | 1/2014 | Leonhard et al. | |
| 8,715,000 | B2 | * | 5/2014 | Zhu | G06F 13/4045 439/620.21 |
| 8,723,370 | B2 | | 5/2014 | West | |
| 8,779,627 | B2 | | 7/2014 | Gerhardinger et al. | |
| 8,853,520 | B2 | | 10/2014 | Ueda et al. | |
| 8,864,503 | B2 | | 10/2014 | Charpentier et al. | |
| 8,911,264 | B2 | | 12/2014 | Goyal et al. | |
| 8,937,249 | B2 | | 1/2015 | Solon | |
| 9,059,579 | B2 | | 6/2015 | Pullium, III et al. | |
| 9,502,879 | B2 | | 11/2016 | Takasu | |
| 9,531,145 | B2 | | 12/2016 | Byrne et al. | |
| 10,192,706 | B2 | | 1/2019 | Solon et al. | |
| 10,553,739 | B1 | | 2/2020 | Solon | |
| 10,992,254 | B2 | * | 4/2021 | Solon | H02S 40/30 |
| 11,355,871 | B2 | | 6/2022 | Wang | |
| 11,450,975 | B2 | | 9/2022 | Wang | |
| 11,689,153 | B2 | | 6/2023 | Solon | |
| 12,015,375 | B2 | | 6/2024 | Solon | |
| 12,015,376 | B2 | | 6/2024 | Solon | |
| 2008/0011347 | A1 | | 1/2008 | Aoyama et al. | |
| 2008/0293304 | A1 | | 11/2008 | Friedrich et al. | |
| 2009/0088032 | A1 | | 4/2009 | Keeven et al. | |
| 2009/0300909 | A1 | | 12/2009 | Kummer et al. | |
| 2010/0090851 | A1 | | 4/2010 | Hauser | |
| 2010/0139733 | A1 | * | 6/2010 | Jonczyk | H01H 85/201 174/72 A |
| 2010/0258157 | A1 | | 10/2010 | Arai | |
| 2011/0011642 | A1 | * | 1/2011 | Solon | H02S 40/34 174/72 A |
| 2011/0174521 | A1 | | 7/2011 | Hernandez-Hernandez et al. | |
| 2011/0209741 | A1 | | 9/2011 | Solon | |
| 2011/0300730 | A1 | | 12/2011 | Someya | |
| 2011/0308833 | A1 | | 12/2011 | West | |
| 2012/0085040 | A1 | | 4/2012 | Ketwitz, Jr. | |
| 2012/0125395 | A1 | | 5/2012 | Bellacicco et al. | |
| 2012/0181973 | A1 | | 7/2012 | Lyden | |
| 2012/0217973 | A1 | | 8/2012 | Avrutsky | |
| 2013/0257154 | A1 | | 10/2013 | Tagliamonte | |
| 2013/0269746 | A1 | | 10/2013 | Ramsey | |
| 2014/0141658 | A1 | * | 5/2014 | Bazenas | H01R 4/183 439/730 |
| 2015/0219856 | A1 | | 8/2015 | Wang | |
| 2016/0072431 | A1 | * | 3/2016 | Solon | H02S 40/30 29/854 |
| 2016/0149539 | A1 | | 5/2016 | Franke et al. | |
| 2021/0226581 | A1 | | 7/2021 | Solon | |
| 2023/0027228 | A1 | | 1/2023 | Ge et al. | |
| 2024/0258754 | A1 | | 8/2024 | Wang et al. | |
| 2024/0333210 | A1 | | 10/2024 | Solon | |
| 2024/0339250 | A1 | | 10/2024 | Brentrup et al. | |
| 2024/0363263 | A1 | | 10/2024 | Ookawa et al. | |
| 2024/0391399 | A1 | | 11/2024 | Raybold et al. | |
| 2024/0421511 | A1 | | 12/2024 | Ge et al. | |
| 2025/0018885 | A1 | | 1/2025 | Eshima et al. | |
| 2025/0132724 | A1 | | 4/2025 | Ge et al. | |
| 2025/0158566 | A1 | | 5/2025 | Solon | |
| 2025/0210228 | A1 | * | 6/2025 | Renken | H01R 4/70 |
| 2025/0211163 | A1 | | 6/2025 | Solon | |
| 2025/0219573 | A1 | | 7/2025 | Solon | |
| 2025/0239382 | A1 | | 7/2025 | Nagano et al. | |
| 2025/0350072 | A1 | | 11/2025 | Ge et al. | |

FOREIGN PATENT DOCUMENTS

| | | | |
|---|---|---|---|
| CN | 2660691 | | 12/2004 |
| CN | 2785100 | | 5/2006 |
| CN | 201134283 | | 10/2008 |
| CN | 201262842 | | 6/2009 |
| CN | 201387761 | | 1/2010 |
| CN | 201518320 | | 6/2010 |
| CN | 101923915 | A | 12/2010 |
| CN | 201682254 | | 12/2010 |
| CN | 201750032 | | 2/2011 |
| CN | 201845580 | | 5/2011 |
| CN | 201877150 | | 6/2011 |
| CN | 102332345 | A | 1/2012 |
| CN | 202153443 | | 2/2012 |
| CN | 202258411 | | 5/2012 |
| CN | 202524026 | | 11/2012 |
| CN | 103000468 | A | 3/2013 |
| CN | 202797033 | | 3/2013 |
| CN | 103165235 | A | 6/2013 |
| CN | 202977351 | | 6/2013 |
| CN | 203038709 | | 7/2013 |
| CN | 203102969 | | 7/2013 |
| CN | 203118602 | | 8/2013 |
| CN | 103325450 | A | 9/2013 |
| CN | 203326312 | | 12/2013 |
| CN | 104021860 | A | 9/2014 |
| CN | 203967369 | | 11/2014 |
| CN | 104464920 | A | 3/2015 |
| CN | 204463897 | | 7/2015 |
| CN | 204558134 | | 8/2015 |
| CN | 204760094 | | 11/2015 |
| CN | 104205514 | B | 11/2016 |
| CN | 104464920 | B | 2/2017 |
| CN | 114883031 | A | 8/2022 |
| DE | 202006007613 | | 8/2006 |
| DE | 102006032275 | | 1/2008 |
| DE | 102008027189 | | 1/2009 |
| DE | 202008016324 | | 3/2009 |
| DE | 102012218366 | | 2/2014 |
| DE | 102013106255 | | 12/2014 |
| DE | 102015114289 | A1 | 3/2017 |
| EP | 0136154 | | 4/1985 |
| EP | 0321263 | | 6/1989 |
| EP | 0977333 | | 2/2000 |
| EP | 2495825 | | 9/2012 |
| EP | 2287915 | | 1/2013 |

(56) References Cited

FOREIGN PATENT DOCUMENTS

| | | | |
|---|---|---|---|
| EP | 2645425 | | 10/2013 |
| FR | 1470590 | | 2/1967 |
| FR | 2983361 | | 12/2013 |
| GB | 1133266 | | 11/1968 |
| JP | S52135081 | A | 11/1977 |
| JP | S585292 | Y2 | 1/1983 |
| JP | H0223016 | A | 1/1990 |
| JP | H0441733 | Y2 | 9/1992 |
| JP | H0684410 | A | 3/1994 |
| JP | H0624131 | Y2 | 6/1994 |
| JP | 3004630 | U | 11/1994 |
| JP | H08289450 | A | 11/1996 |
| JP | H08289451 | A | 11/1996 |
| JP | H09245533 | A | 9/1997 |
| JP | H09261835 | A | 10/1997 |
| JP | H10135499 | A | 5/1998 |
| JP | 2000004516 | | 1/2000 |
| JP | 2000348836 | A | 12/2000 |
| JP | 2002231989 | A | 8/2002 |
| JP | 2002331529 | A | 11/2002 |
| JP | 2003031834 | A | 1/2003 |
| JP | 2003293536 | A | 10/2003 |
| JP | 2003298100 | A | 10/2003 |
| JP | 2005039981 | A | 2/2005 |
| JP | 2006050847 | A | 2/2006 |
| JP | 2006087219 | A | 3/2006 |
| JP | 3884838 | B2 | 2/2007 |
| JP | 4044484 | B2 | 2/2008 |
| JP | 4080663 | B2 | 4/2008 |
| JP | 2008166492 | A | 7/2008 |
| JP | 2008187814 | A | 8/2008 |
| JP | 4169490 | B2 | 10/2008 |
| JP | 4171359 | B2 | 10/2008 |
| JP | 2009038216 | A | 2/2009 |
| JP | 2009148010 | A | 7/2009 |
| JP | 4606774 | B2 | 1/2011 |
| JP | 2011072172 | A | 4/2011 |
| JP | 4730794 | B2 | 7/2011 |
| JP | 4926340 | B2 | 5/2012 |
| JP | 2012115043 | A | 6/2012 |
| JP | 5384073 | B2 | 1/2014 |
| JP | 2014050227 | A | 3/2014 |
| JP | 2014229639 | A | 12/2014 |
| JP | 2015060813 | A | 3/2015 |
| JP | 2015133822 | A | 7/2015 |
| JP | 2015198508 | A | 11/2015 |
| KR | 20030009178 | A | 1/2003 |
| KR | 101428689 | B1 | 8/2014 |
| WO | 0109990 | A1 | 2/2001 |
| WO | 2012083785 | A1 | 6/2012 |

OTHER PUBLICATIONS

"AWG Wire Gauges Current Ratings," The Engineering Tool Box, 2014, pp. 1-11. Retrieved from Online: https://web.archive.org/web/20190601203050/https://www.engineeringtoolbox.com/wire-gauges-d_419.html on Jun. 16, 2023.
Balance of Systems Product Catalog 2012, Shoals Technologies Group.
"Balance of Systems Product Catalog," Shoals Technologies Group, 2013, pp. 1-36.
"Cable Systems for Photovoltaic Installations" Helukabel GmbH, 2011, 72 Pages. Retrieved from https://web.archive.org/web/20130325182920/ http:/www.helukabel.de/media/publication/de/brochures/pv_20/PV_BROCHURE_Photovoltaik_EN~1.pdf.
Complaint, Inv. No. 337-TA-1365 (May 4, 2023).
Complaint, Inv. No. 337-TA-1438 (Jan. 9, 2025).
"DC Cabling Perfectly Connected," Jurchen Technology, 2014, 20 Pages.
Definition of Voltage Rating, Farlex, Sep. 2018, 2 Pages. Retrieved from https://encyclopedia2.thefreedictionary.com/voltage+rating.
"EN 50618," European Committee for Electrotechnical Standardization CENELEC, Dec. 2014, 29 Pages.
"Enphase Engage Cable and Accessories Installation Manual," Enphase Energy, 2011, pp. 1-28.
Helukabel "Cable systems for photovoltaic installations" retrieved from https://web.archive.org/web/20140807212651/ http:/www.helukabel.de/media/publication/de/flyer_1/pv_24/Cable-Solutions-for-Photovoltaic-Systems~1.pdf.
Helukabel "Green Line" retried from https://web.archive.org/web/20140807212915/ http:/www.helukabel.de/media/publication/de/flyer_1/pv_24/PV_FLYER_SOLARFLEX-X_EN.pdf.
"IEC 60050-461 International Standard," International Electrotechnical Vocabulary: Part 461: Electric Cables, 2nd Edition, Jun. 2008, 180 Pages.
Jurchen Technology—Components for photovoltaic systems [retrieved from http://web.archive.org/web/20140208150811/ http://www.jurchen-technology.com/ on Oct. 9, 2023].
Jurchen Technology —DC Verkabelung, retrieved from https://web.archive.org/web/20130918085535/ http://www.jurchen-technology.de/fileadmin/redakteur_verzeichnis/pdfs/JT_Produktbroschuere_DC_Verkabelung_2012_0920_DE_ebook.pdf.
Jurchen Technology—DC Verkabelung, retrieved from https://web.archive.org/web/20131030021022/ http://www.jurchen-technology.de:80/fileadmin/redakteur_verzeichnis/pdfs/Broschueren/JT_ProBro_DC_Verkabelung_2012_0920_DE_ebook.pdf.
Jurchen TechnologyComponents for photovoltaic systems, retrieved from http://web.archive.org/web/20120428223249/ http://www.jurchen-technology.com/.
"Lapp Kabel Datasheet," U.I. Lapp GmbH, 2010, pp. 1-3.
Markman Order, Inv. No. 337-TA-1365, Order No. 16 (Feb. 20, 2024).
Markman Transcript, Inv. No. 337-TA-1365 (Dec. 13, 2023).
Messenger R A., et al., "Photovoltaic Systems Engineering—Second Edition," CRC Press, 2004, 458 Pages.
"National Fire Protection Association," National Electrical Code, 2002, 740 Pages.
"National Fire Protection Association NFPA 70," National Electrical Code, 2014, 927 Pages.
"Solar Line: Photovoltaic Interconnection System," Amphenol industrial solar technologies, Nov. 2012, 16 Pages.
Polycab brochure, Mar. 2015, pp. 1-6.
Public Commission Opinion, Inv. No. 337-TA-1365 (Feb. 4, 2025).
Public Final Initial Determination, Inv. No. 337-TA-1365 (Aug. 30, 2024).
"Radox® Solar," Huber+Suhner Group, 2011, 60 Pages.
Respondents' Opening Claim Construction Brief, Inv. No. 337-TA-1365 (Nov. 2, 2023).
Respondents' Opening Claim Construction Brief, Inv. No. 337-TA-1438 (May 7, 2025).
Respondents' Rebuttal Claim Construction Brief, Inv. No. 337-TA-1365 (Nov. 16, 2023).
Respondents' Rebuttal Claim Construction Brief, Inv. No. 337-TA-1438 (May 20, 2025).
Response to Amended Complaint, Inv. No. 337-TA-1365 (Aug. 8, 2023).
Response to Complaint, Inv. No. 337-TA-1365 (Jul. 7, 2023).
Response to Complaint, Inv. No. 337-TA-1438 (Mar. 4, 2025).
Shoals' Opening Claim Construction Brief, Inv. No. 337-TA-1365 (Nov. 2, 2023).
Shoals' Opening Claim Construction Brief, Inv. No. 337-TA-1438 (May 7, 2025).
Shoals' Rebuttal Claim Construction Brief, Inv. No. 337-TA-1365 (Nov. 16, 2023).
Shoals' Rebuttal Claim Construction Brief, Inv. No. 337-TA-1438 (May 20, 2025).
Staff's Opening Claim Construction Brief, Inv. No. 337-TA-1365 (Nov. 9, 2023).
"The World of Lapp—Products for Photovoltaic," Lapp Group, 2012, 44 Pages.
"Summary of Photovoltaic Wire Requirements as outlined in UL 4703," Anixter, 2014, 1 Page.
"Sunnector Solar Assemblies & Harnesses," Cooper Interconnect, 2011, 16 Pages.
U.S. Non-Final Office Action dated Apr. 24, 2025 in U.S. Appl. No. 17/870,307.

(56) References Cited

OTHER PUBLICATIONS

U.S. Appl. No. 19/287,769, inventors Ge R et al., filed Jul. 31, 2025.
International Search Report and Written Opinion dated Dec. 19, 2025 in PCT Application No. PCT/US2025/041998.
U.S. Non-Final Office Action dated Dec. 11, 2025 in U.S. Appl. No. 17/870,307.

* cited by examiner (Bottom)

(Side)

110

(End)

FIG. 5A
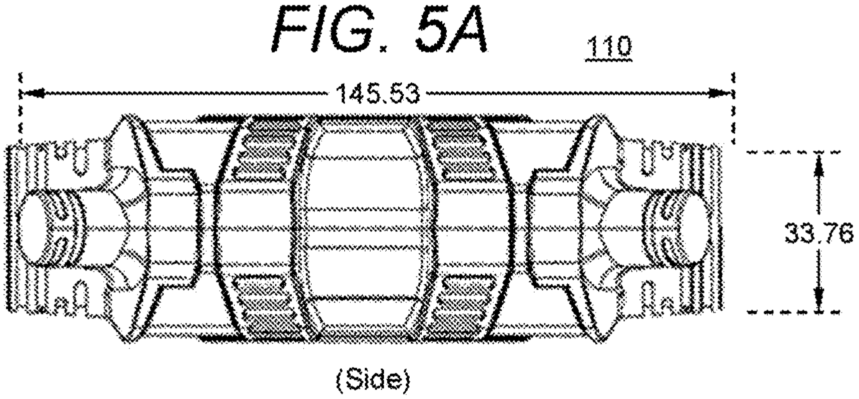
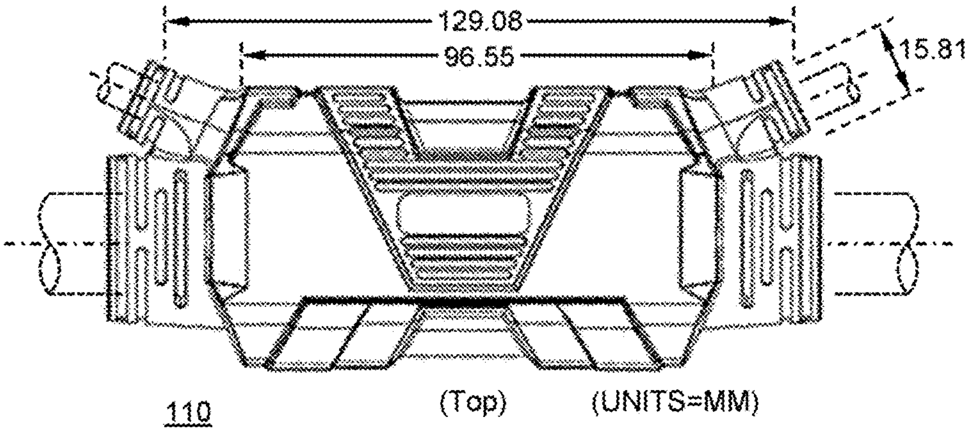
FIG. 5B (UNITS=MM)

1800

3000

MATERIAL/GAUGE TRANSITION CONNECTORS FOR PHOTOVOLTAIC WIRING SYSTEMS

CROSS-REFERENCE TO RELATED APPLICATIONS

This application is a continuation-in-part of U.S. Non-Provisional application Ser. No. 18/957,438, filed Nov. 22, 2024, titled "MATERIAL/GAUGE TRANSITION CONNECTORS FOR PHOTOVOLTAIC WIRING SYSTEMS," which is a continuation-in-part of U.S. Non-Provisional application Ser. No. 17/870,307, filed Jul. 21, 2022, titled "TRUNK BUS SYSTEM," which claims the benefit and priority of U.S. Provisional Application No. 63/224,631, filed on Jul. 22, 2021, entitled "TRUNK BUS SYSTEM." Both of these applications are incorporated by reference herein, in their entirety, for all purposes.

BACKGROUND

Solar panels have long been used to capture energy from the sun and convert the energy into electricity, specifically, direct current (DC) electricity. In many applications, the electricity from a panel or several panels may be delivered to an energy storage device (e.g., battery) or other electrical component that may convert, store, or otherwise use the energy. When the generated electricity is to be provided to an alternating current (AC) system (e.g., electric grid, household, etc.), deliver the electricity collected by solar panel(s) to an inverter that converts the electricity from DC to AC and passes the AC electricity onto the consumer (grid, household, etc.).

One conventional method of installing solar power DC wires is to connect a plurality of conducting (e.g., copper) photovoltaic extender wires from solar strings to a combiner box, and then combine several DC feeder lines from combiner boxes to an inverter. To implement this method, on-site technicians must pull the wires, cut the wires to length, crimp connectors, and connect to the combiner boxes. Another method involves using a thick cable, called a trunk bus or trunk line, to carry electricity collected from multiple solar panels to an inverter, where individual strings of solar panels connect to the trunk bus at designated points.

BRIEF SUMMARY

In some embodiments, an apparatus for forming electrical connections is provided. The apparatus may comprise a metal transition conductor, a terminal portion of a first electrical cable electrically and mechanically coupled to the metal transition conductor, a terminal portion of a second electrical cable electrically and mechanically coupled to the metal transition conductor, and a terminal portion of a third electrical cable electrically and mechanically coupled to the metal transition conductor. Each of the first, second, and third electrical cables terminates at the metal transition conductor. At least two of the first, second, and third electrical cables comprise conductors of different metal materials. At least two of the first, second, and third electrical cables comprise conductors of different wire gauges. The apparatus also includes a mold structure that encases the metal transition conductor, the terminal portion of the first electrical cable, the terminal portion of the second electrical cable, and the terminal portion of the third electrical cable.

In some embodiments, the different metal materials comprise a copper metal material and an aluminum metal material. The different metal materials may also comprise a copper clad material. The metal transition conductor may be a metal plate. The terminal portions of the electrical cables may be welded directly to the metal plate by ultrasonic welding. Alternatively, the welding may be done by electric resistance welding (ERW). The metal plate may have a main body comprising a body metal material such as copper or aluminum. The metal plate may also include a coating layer on an outer surface of the main body. In another embodiment, the metal transition conductor may comprise a first, second, and third metal lug. The terminal portion of each of the three cables can be inserted and secured to an interior portion of a corresponding metal lug by crimping. The apparatus can also include a terminal portion of a fourth electrical cable electrically and mechanically coupled to the metal transition conductor. In some embodiments, the apparatus can include additional terminal portions of additional electrical cables, such that the terminal portions of a total of N electrical cables are electrically and mechanically coupled to the metal transition conductor, where N is a positive integer greater than 4. The terminal portion of each of the electrical cables can be a flattened core conductor.

In some embodiments, the mold structure comprises an inner mold and an outer mold. The inner mold encases the metal transition conductor and the terminal portions of the electrical cables, while the outer mold encases the inner mold. A plurality of heat shrink tube (HST) segments may also be included, with a first HST segment positioned over a first extension portion of the inner mold and a near-terminal portion of the first electrical cable, with similar arrangements for the second and third cables.

A wiring harness for forming electrical connections is also disclosed. The harness comprises a plurality of multi-terminal metal transition connectors and a plurality of electrical cable segments connecting them. Each of the connectors in the harness comprises a metal transition conductor and terminal portions of at least a first, a second, and a third electrical cable, each coupled to the conductor. At least two of the electrical cables comprise conductors of different metal materials. At least two of the first, second, and third electrical cables comprise conductors of different wire gauges.

A solar power system is also disclosed. It comprises a combiner box, at least one row of solar panels, and a positive and a negative terminal wiring harness that are each electrically connected between the combiner box and the solar panels. Each wiring harness includes a plurality of connectors. Each connector comprises a metal transition conductor and terminal portions of a first, a second, and a third electrical cable, each coupled to the conductor. Each of the three cables terminates at the metal transition conductor. At least two of the electrical cables comprise conductors of different metal materials. At least two of the first, second, and third electrical cables comprise conductors of different wire gauges. The connector also includes a mold structure encasing the metal transition conductor and the terminal portions of the first, second, and third electrical cables. In a solar power system, each wiring harness can comprise a segment of an aluminum cable extending along a row of solar panels, along with a plurality of copper cables forming drop lines to corresponding solar panel strings. Each drop line on the positive terminal wiring harness may further include an in-line fuse. The system may also have a metal transition connector located between the combiner box and a first connector, configured to transition from a copper cable to an aluminum cable.

A method of manufacturing an apparatus for forming electrical connections is also disclosed. The method involves providing a first electrical cable, a second electrical cable, and a third electrical cable, where at least two of the cables have conductors of different metal materials and at least two of the cables have conductors of different wire gauges. The method further includes electrically and mechanically coupling a terminal portion of the first, second, and third electrical cables to a metal transition conductor, such that each cable terminates at the conductor. Finally, a mold structure is formed to encase the metal transition conductor and the terminal portions of the first, second, and third electrical cables. The step of electrically and mechanically coupling may be performed by ultrasonic welding. The step of forming a mold structure can comprise forming an inner mold to encase the conductor and terminal portions, and then forming an outer mold to encase the inner mold. The method can also include positioning HST segments over the inner mold and near the cables, and applying heat to cause them to shrink and conform to the inner mold and cables, prior to forming the outer mold to encase the inner mold and HST segments.

BRIEF DESCRIPTION OF THE DRAWINGS

Aspects of the disclosure are illustrated by way of example. In the accompanying figures, like reference numbers indicate similar elements.

FIGS. 5A and 5B illustrate exemplary dimensions of the overmold of the disclosed trunk bus device shown in FIGS. 1-4, though embodiments may be of any size/dimensions desired for any particular system or implementation.

DETAILED DESCRIPTION

Figure 1:
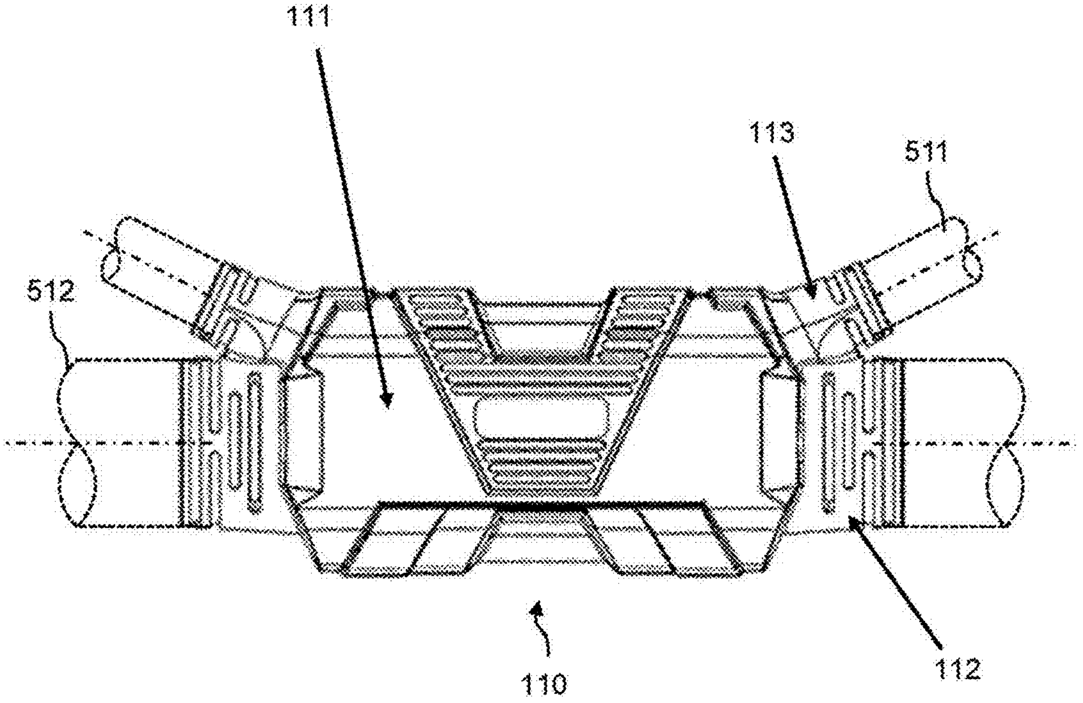
FIG. 1 illustrates a top view of an overmold of an example of a trunk bus device, according to an embodiment.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

The presently disclosed subject matter now will be described more fully hereinafter with reference to the accompanying Figures, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Figures. Therefore, it is to be understood that the presently disclosed subject matter is not to be limited to the specific embodiments disclosed and that modifications and other embodiments are intended to be included within the scope of the appended claims.

As noted, one conventional method of installing solar power DC wires is to connect a plurality of conducting (e.g., copper) photovoltaic extender wires from solar strings to a combiner box, and then combine several DC feeder lines from combiner boxes to an inverter. To implement this method, on-site technicians must pull the wires, cut the wires to length, crimp connectors, and connect to the combiner boxes. This process is very labor-intensive and time-consuming, and the quality of work is very low and inconsistent. Additionally, existing wiring harnesses used to make the connections are labor intensive and yield failed and broken connections that often require rework.

Further complicating matters, more recently, many solar module manufacturers are launching high-wattage power solar panels. Such panels have lower voltage at maximum power (Vmp) but higher short circuit current (Isc). Using existing wiring harnesses and methods, #6 American Wire Gauge (AWG) copper photovoltaic (PV) wire, for example, will be required, substantially increasing costs and adding to the Capex value of the solar installation. In addition, due to exposure to severe weather at most sites, combiner boxes installed on-site often malfunction, requiring additional intensive maintenance. Furthermore, to better take advantage of the land, most sites try to go with higher numbers of trackers in a row. However, solar sites are currently limited to 3 or 4 trackers due to DC loss requirements.

Embodiments herein address these and other issues by providing various embodiments of connector hardware and embodiments of a trunk bus system that may be used to electrically connect solar panels and inverters (or other receivers of solar-generated electricity or other electricity) to increase flexibility and reduce cost of installation. For instance, wiring for solar panel installations may be implemented without the need for combiner boxes or the associated combiner box maintenance and installation. By way of just one example, a trunk bus feeder/trunk may be made using 2 kV aluminum photovoltaic wire and may range in sizes from 4/0 to 1000MCM, but larger or smaller sizes are also contemplated.

Referring now to FIG. 1, a top view of an embodiment of a trunk bus 110 is presented. In certain embodiments, the trunk bus 110 may include an undermold layer 210 (shown in FIG. 6), an overmold layer 111 (which also may be referred to as an "outermold"), a trunk line through port 112 wherein one or more trunk lines 512 run through, and one or more branch cable entry ports 113 wherein one or more branch cables 511 enter the trunk bus.

The branch cables 511 (smaller lines in the figures) may connect to solar panels, and the trunk line 512 (e.g., the larger, central cable running through the joint, also known as a feeder cable) may be connected to an inverter or to a disconnect box or other electricity receiving device/component, which may, in some embodiments, include a switch and/or fuse protection. By using the trunk bus system, the usage of copper string wires, for example, may be minimized, and larger-size aluminum wires (sizing according to National Electrical Code (NEC) requirements), which are more cost-efficient than copper string wires, may also be utilized. Further, the need for combiner boxes and combiner boxes installation and maintenance can be eliminated. Since, in some embodiments, the main trunk/feeder size can be as large as 1000 MCM, for example, solar farms may exceed more than 4 or 5 high trackers while maintaining DC loss requirements.

Figure 2:
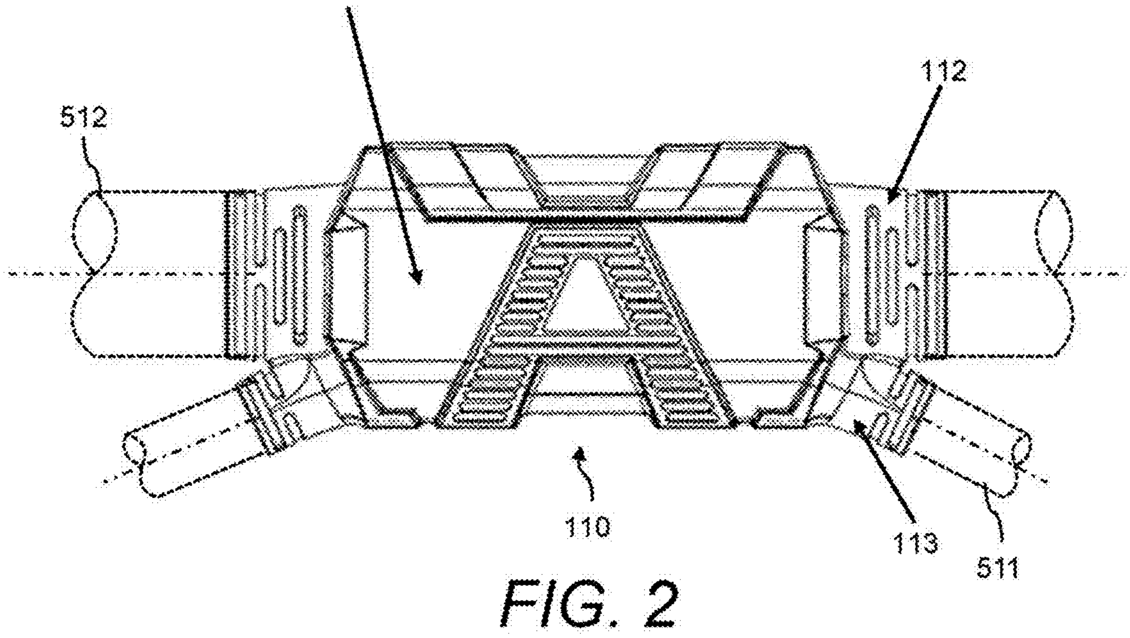
FIG. 2 illustrates a bottom view of the overmold illustrated in FIG. 1.
Figure 3:
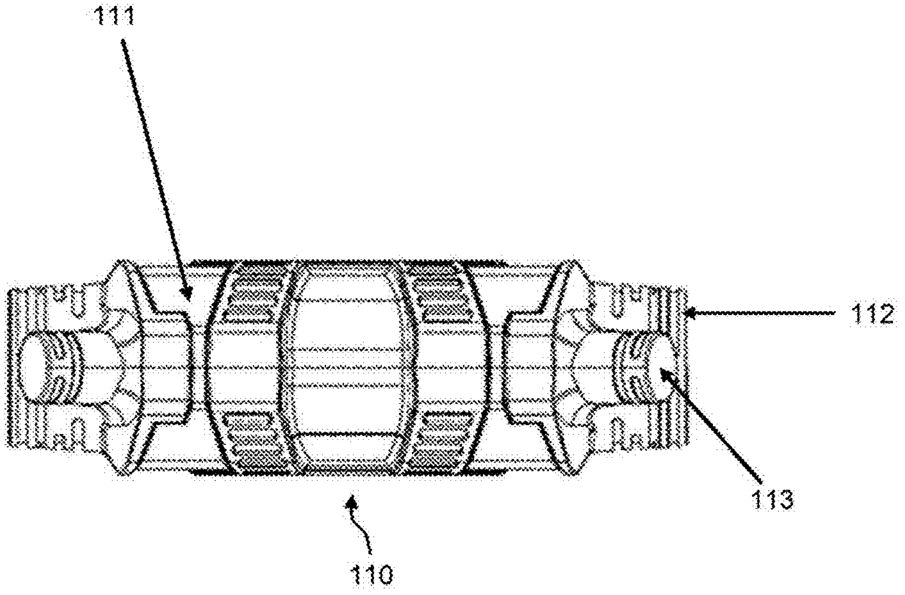
FIG. 3 illustrates a side view of the overmold illustrated in FIG. 1.
Figure 4:
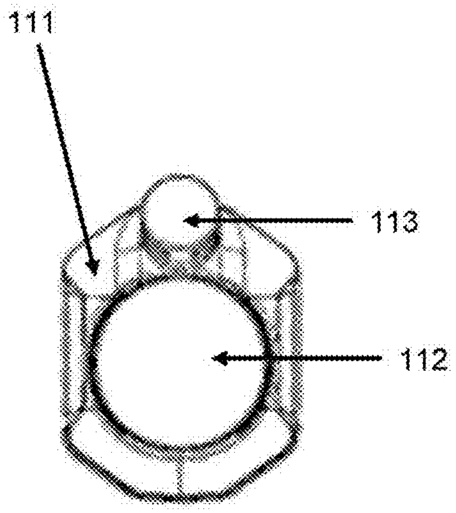
FIG. 4 illustrates an end view of the overmold illustrated in FIG. 1.

Referring now to FIGS. 2, 3, and 4, a bottom, side, and end view of an embodiment of the trunk bus 110 is presented, respectively. Notably, each view includes an overmold layer 111, a trunk line through port 112 wherein one or more trunk lines 512 run through, and one or more branch cable entry ports 113 wherein one or more branch cables 511 enter the trunk bus 110.

FIG. 5A and FIG. 5B both display exemplary dimensions of the overmold 111 of the embodiment of the trunk bus 110 device shown in FIGS. 1-4.

Figure 6:
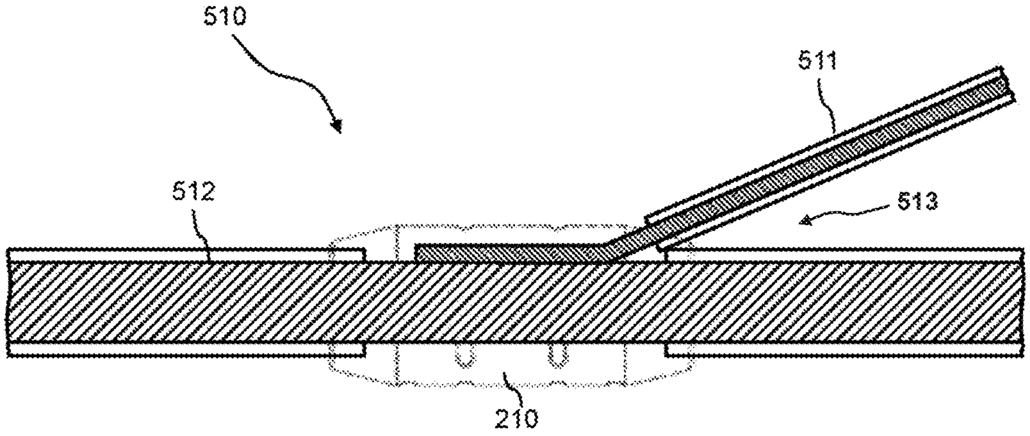
FIG. 6 illustrates an exemplary instance of a branch cable being coupled to a trunk line within an undermold located inside a trunk bus device, according to an embodiment.
Figure 7A:
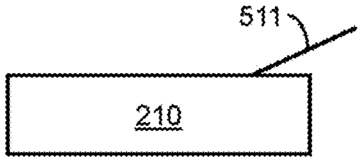
FIGS. 7A-7F illustrate some exemplary arrangements of branch cables entering the undermold of a trunk bus to be coupled to a trunk line, according to some embodiments.
Figure 7B:
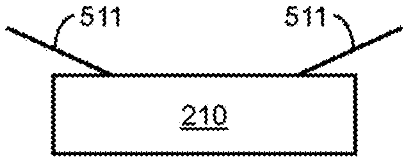
Figure 7C:
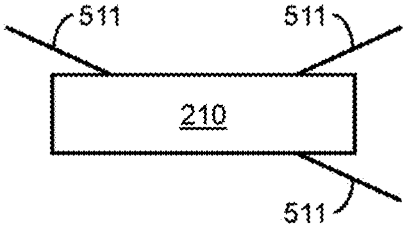
Figure 7D:
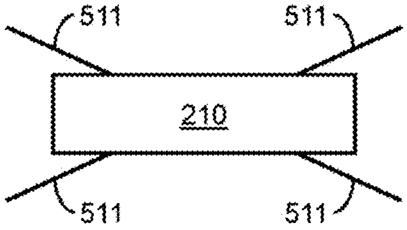
Figure 7E:
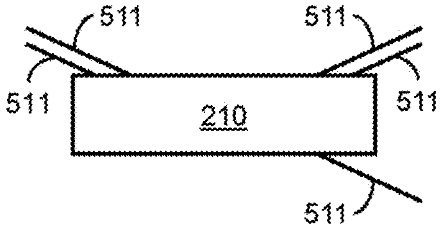
Figure 7F:
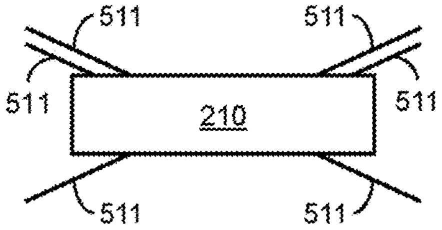
Figure 8A:
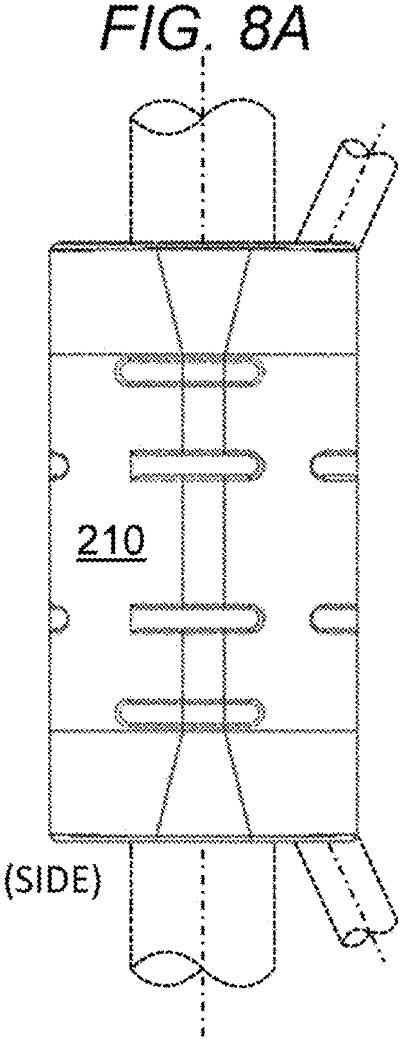
FIGS. 8A-8D illustrate the side, bottom, backside, and end view of the undermold portion of a trunk bus device, according to an embodiment.
Figure 8B:
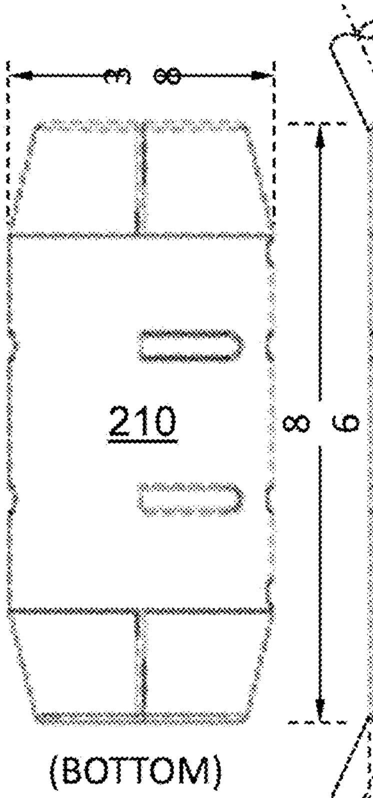
Figure 8C:
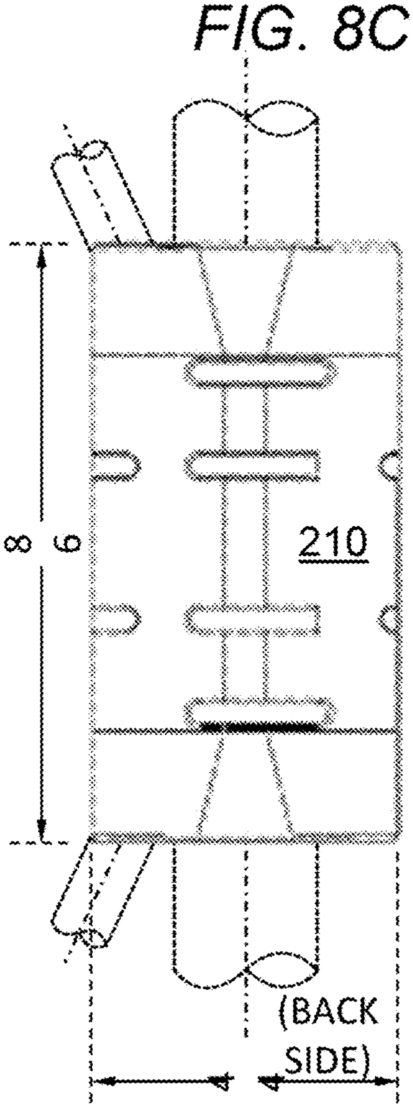
Figure 8D:
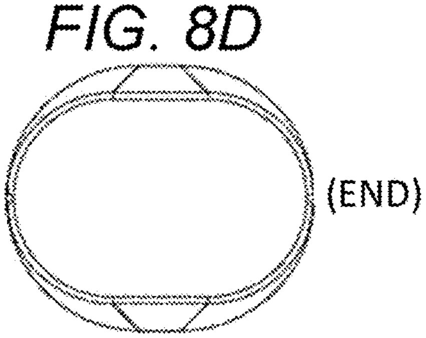

Those skilled in the art will appreciate that embodiments of a trunk bus as provided in this disclosure can eliminate several disadvantages with the parallel connectors commonly found in the prior art. As illustrated in FIG. 6, for example, the junction zone 510 within the trunk bus connector may provide for entry of the branch cable 511 at an angle 513, rather than parallel to the trunk line 512, for example, approximately 45 degrees (though other angles are contemplated). One advantage is the elimination of multiple 90-degree bends necessitated by connectors of the prior art. Instead, the branch cable 511 requires only a single, substantially less than 90-degree bend, thereby eliminating stress on the branch cable 511, reducing the number of wire breaks during installation, and simplifying installation overall. The inclined or angled approach shown for example in FIG. 6 also allows for a greater bending radius of the branch cable 511 overall, which further protects the branch cable 511 and reduces installation issues and breaks. Additionally, the inclined or angled approach shown for example in FIG. 6 further allows for the branch cables 511 to be shorter, further reducing installation and material costs. Utilizing only a single bend, the branch cable 511 may approach and lay flat against the trunk line 512 to be electrically coupled in the area within the undermold 210.

FIGS. 7A-7F illustrate certain embodiments of undermold 210 and branch cable 511 arrangements. Modifications to the overmold 111 (not shown in FIGS. 7A-F) and undermold 210 allow for the preferred, inclined installation approach taught by this disclosure. In certain embodiments, the undermold 210 may be manufactured with various dimensions so that multiple different size branch cables 511 may be accommodated, while still only necessitating a single bend in the branch cables 511. In certain other embodiments, the overmold may include multiple branch cable entry ports so as to accommodate the coupling of one or more branch cables 511 to a single trunk line 512, thereby resulting in reduced cost, increased efficiency, and easier installation and maintenance of the trunk bus system when utilized in solar electricity generation arrays. It should be noted that there are numerous examples of the number and arrangement of branch cables 511 that may enter the undermold 210 depending on the specific need within the electricity generation array, some of which may not be present in FIG. 7A-7F but are nonetheless inherently present in the design and this disclosure.

Referring now to FIG. 8A-8D, side, bottom, backside, and end views of an embodiment of an undermold 210 with exemplary dimensions are presented. It should be noted that other examples of the undermold 210 may also be contemplated to accommodate the potential arrangements of branch cables 511 displayed and contemplated in FIG. 7A-7F.

Figure 9:
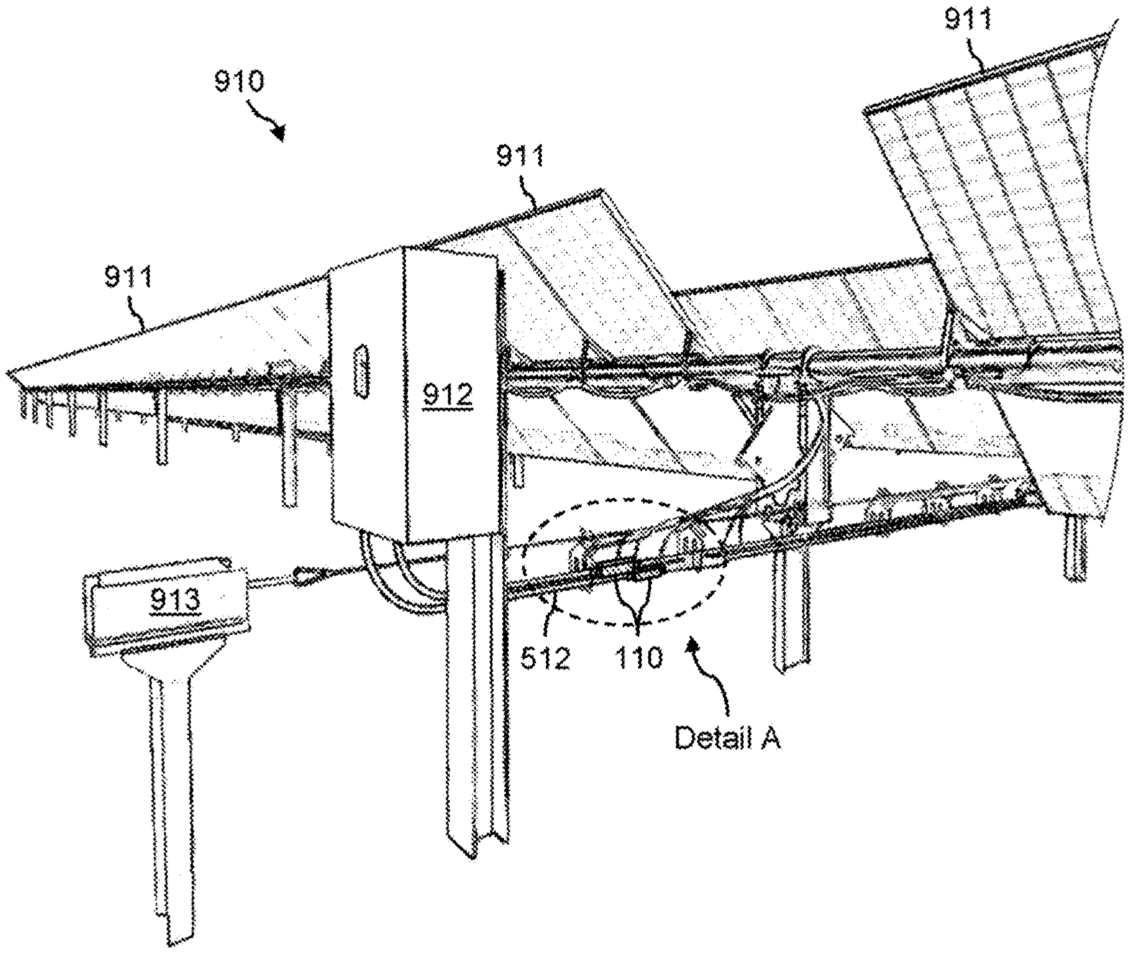
FIG. 9 is an illustration of an example location of a trunk device shown relative to the overall architecture of a solar farm, according to an embodiment.

FIG. 9 is an illustration that presents an exemplary location of trunk bus devices 110 disclosed herein, shown relative to the overall architecture of a solar farm 910 or electricity generation array as they might be installed and used in the field. Those skilled in the art will appreciate that an exemplary trunk bus device 110 is illustrated with multiple branch cables 511 (see e.g., FIG. 10) extending to multiple solar panels 911. Advantageously, the inclined branch cable installation enables ease of installation, and better protects the branch cables by allowing for fewer bends of the conductor metal in the connector, and increase bend radius of the branch cable, among other things. Also present in FIG. 9 is an electrical disconnect box 912 and an inverter 913, both of which are commonly found electrical components necessary for solar array operation.

Figure 10:
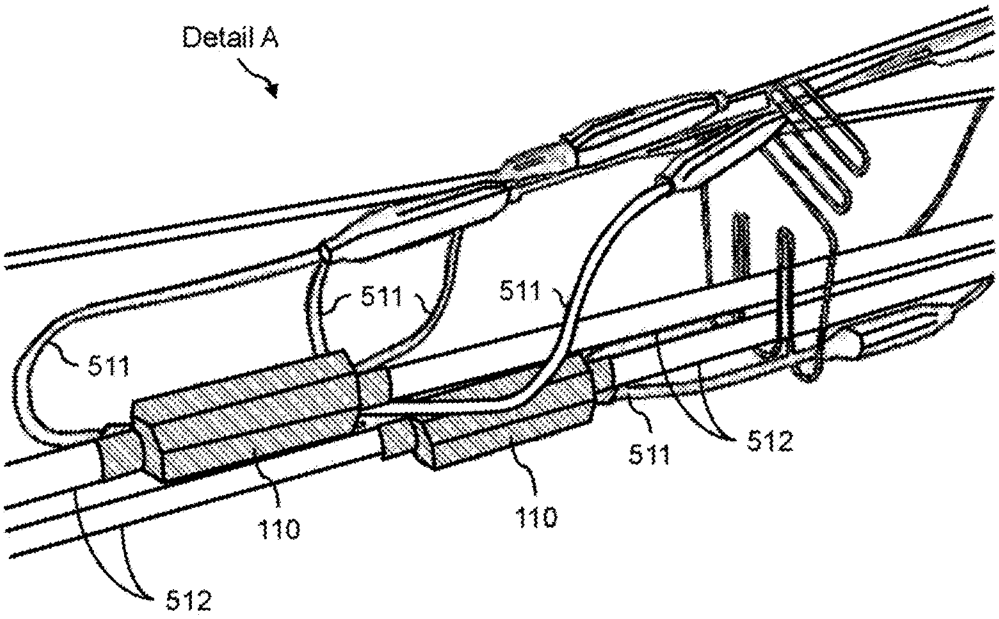
FIG. 10 illustrates a more detailed example of how multiple trunk busses may be incorporated into the overall architecture of a solar farm, thereby allowing multiple panels to transfer power to the main trunk lines, according to an embodiment.
Figure 11:
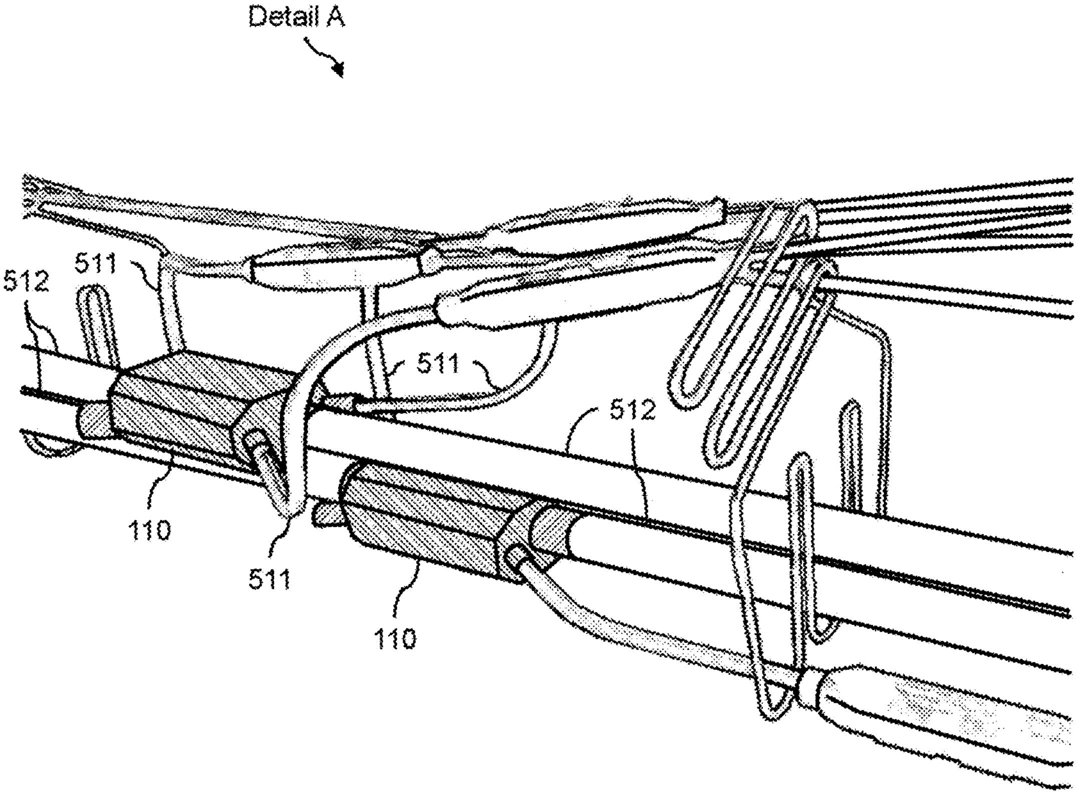
FIG. 11 illustrates an additional example of multiple trunk busses incorporated into the overall architecture of a solar farm, thereby allowing multiple panels to transfer power to the main trunk lines.

FIGS. 10 and 11 are illustrations of closer views of the portion of FIG. 9 designated as Detail A. This portion is of particular interest because it illustrates an exemplary instance of how the presently disclosed trunk bus device 110 may be arranged for use in a solar array. Particular attention should be directed at how numerous branch cables 511 may feed into the trunk bus device 110, and that multiple trunk bus devices 110 may be located on a trunk line 512. This broader implementation of the presently disclosed trunk bus devices 110 allows the electrical current produced by multiple solar panels to be consolidated into a single trunk line 512 before being transferred for further processing.

As noted previously (e.g. in FIGS. 7A-7F), different embodiments may accommodate various configurations for coupling one or more branch cables 511 to a trunk line 512. Further, a single type of bus connector may be capable of accommodating different configurations.

Figure 12A:
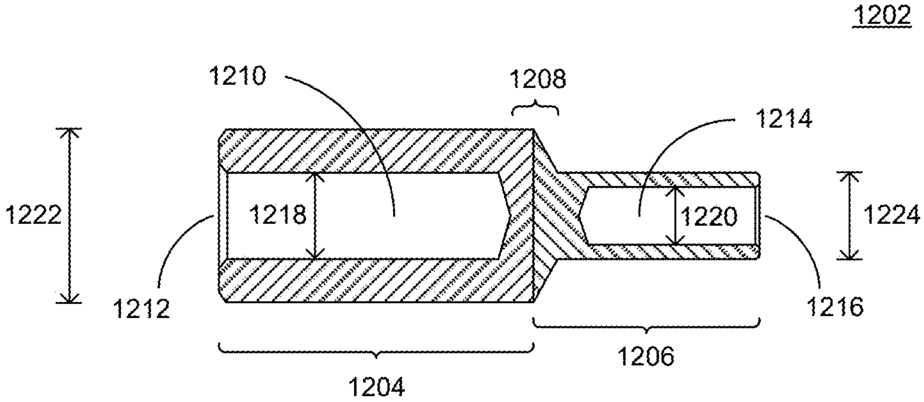
FIG. 12A presents a longitudinal cross-section view of an aluminum-copper (AL-CU) metal material transition connector that may incorporate one or more embodiments.

FIG. 12A presents a longitudinal cross-section view of an aluminum-copper (AL-CU) metal material transition connector 1202 that may incorporate one or more embodiments. The AL-CU metal material transition connector 1202 is an example of a metal material transition connector configured to facilitate formation of a reliable, oxidation-resistant, mechanical and electrical connection between two conductors comprised of different metal materials suitable for deployment in a solar array wiring system. An example of a solar array wiring system is a wiring system comprising cables and connectors that provide connections for one or more arrays of photovoltaic panels. Here, the metal material transition connector 1202 comprises two different metal materials, e.g., aluminum (AL) and copper (CU). While these two particular metal materials are illustrated by way of example, other embodiments of the disclosure include metal material transition connectors capable of forming electrical connection between other types of metal materials. As shown, the AL-CU metal material transition connector 1202 includes a first metal portion 1204 comprising a first metal material, AL, and a second metal portion 1206 comprising a second metal material, CU.

At a welded region 1208, the first metal portion 1204 is welded to the second metal portion 1206. In one embodiment, the weld at the welded region 1208 comprises a friction weld formed by rotationally rubbing the first metal portion 1204 against the second metal portion 1206 to generate a sufficient amount of heat to at least partially melt the AL and CU materials and bond them together. Friction welding may generate a high integrity joint at the welded region 1208 that provides full contact between the AL and CU materials and reduces the likelihood of oxidation. The friction weld can be formed with little or minimal amount of excess welding material protruding at the welded region 1208, to achieve more symmetrical and precise physical dimensions for the AL-CU metal material transition connector 1202, which in turn improves the fit and performance of additional sealing member(s) and/or mold(s) (e.g., shown in subsequent figures), that may serve to protect the AL-CU metal material transition connector 1202. While a friction weld is described with particular technical benefits, other types of welds can be used in other embodiments of the disclosure.

The first metal portion 1204 includes a first recess 1210 configured to receive, at a first entrance region 1212, a proximal end of an elongated conductor member, such as an AL conductor. The second metal portion 1206 includes a second recess 1214 configured to receive, at a second entrance region 1216, a proximal end of another elongated conductor member, such as a CU conductor. In some embodiments, the first recess 1210 may have an interior diameter 1218 that is larger than an interior diameter 1220 of the second recess 1214. Correspondingly, the first metal portion 1204 may have an outer diameter 1222 that is larger than an outer diameter 1224 of the second metal portion 1206. Further details regarding the operation of the first recess 1210 and the second recess 1214 are described in conjunction with subsequent figures.

Figure 12B:
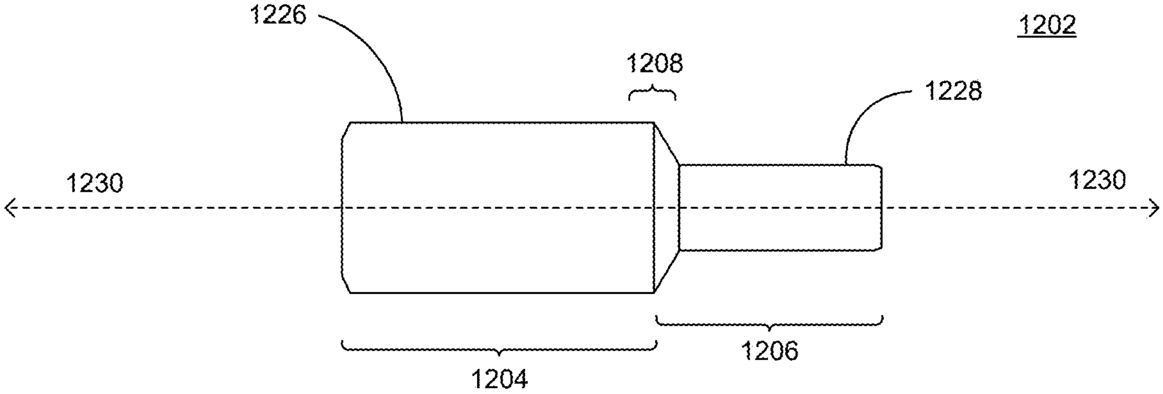
FIG. 12B presents an external view of the AL-CU metal material transition connector, according to one or more embodiments of the disclosure.

FIG. 12B presents an external view of the AL-CU metal material transition connector 1202, according to one or more embodiments of the disclosure. The first metal portion 1204 and the second metal portion 1206 are both visible in the external view of the AL-CU metal material transition connector 1202. In particular, an outer surface 1226 of the first metal portion 1204, an outer surface 1228 of the second metal portion 1206, and the welded region 1208 may be visible in the external view of the AL-CU metal material transition connector 1202.

According to some embodiments, the metal material transition connector (e.g., AL-CU metal material transition connector 1202) has a shape characterized as a "solid of revolution." Geometrically speaking, a solid-of-revolution shape may be described as a three-dimensional shape that can be formed by rotating a two-dimensional shape about an axis of rotation. The solid-of-revolution shape facilitates efficient manufacturing of the various features of the metal material transition connector. For example, the first metal portion 1204 and the second metal portion 1206 may each be manufactured by rotating a solid metal work piece while cutting away excess material, to form a desired shape. The first metal portion 1204 may be friction-welded to the second metal portion 1206 by rotating the two portions relative to one another while pressing them together, to generate friction between the engaged surfaces. An axis of rotation for turning the first metal portion 1204 and the second metal portion 1206 is shown as an axis 1230.

Figure 13A:
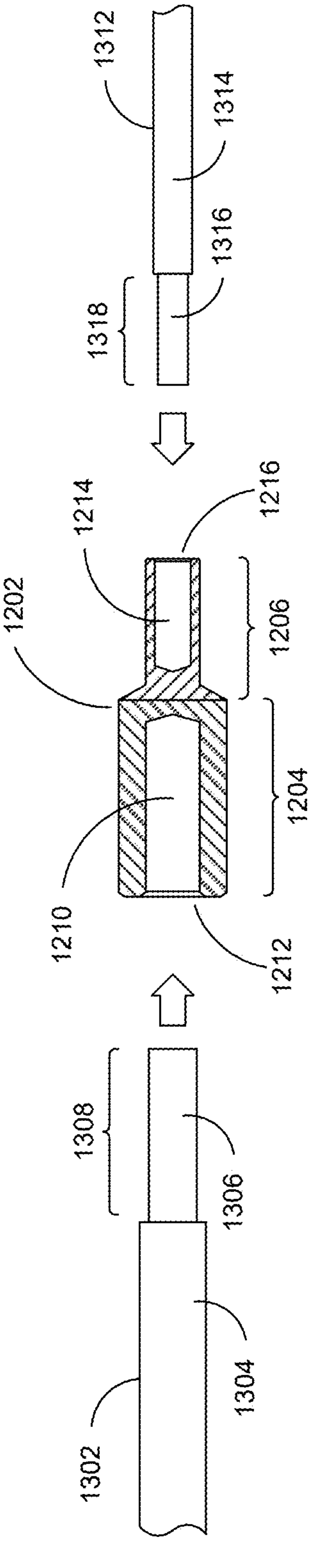
FIG. 13A presents an external view of the AL-CU metal material transition connector, according to one or more embodiments of the disclosure.

FIG. 13A illustrates the insertion of an AL conductor and a CU conductor into the AL-CU metal material transition connector 1202, according to some embodiments. As discussed, the AL-CU metal material transition connector 1202 includes a first metal portion 1204 comprising an AL material and a second metal portion 1206 comprising a CU material. A first elongated conductor member, here an AL conductor 1302, may comprise an insulator layer 1304 and a center conductor 1306. The center conductor 1306 may comprise either a solid conductor or a stranded conductor made up of multiple strands of individual solid conductors or multiple strands of stranded conductors. Here, the center conductor 1306 is made of an AL material. At a proximal end 1308 (from the perspective of the AL-CU metal material transition connector 1202) of the AL conductor 1302, a portion of the insulator layer 1304 is removed to expose a portion of the center conductor 1306. As shown, the proximal end 1308 of the AL conductor 1302, comprising the exposed portion of the center conductor 1306, is inserted into the first recess 1210 of the AL-CU metal material transition connector 1202 at the first entrance region 1212.

A second elongated conductor member, here a CU conductor 1312, may comprise an insulator layer 1314 and a center conductor 1316. The center conductor 1316 may comprise either a solid conductor or a stranded conductor made up of multiple strands of individual solid conductors or multiple strands of stranded conductors. Here, the center conductor 1316 is made of a CU material. At a proximal end 1318 (from the perspective of the AL-CU metal material transition connector 1202) of the CU conductor 1312, a portion of the insulator layer 1314 is removed to expose a portion of the center conductor 1316. As shown, the proximal end 1318 of the CU conductor 1312, comprising the exposed portion of the center conductor 1316, is inserted into the second recess 1214 of the AL-CU metal material transition connector 1202 at the second entrance region 1216.

As mentioned previously, the first recess 1210 may have an interior diameter that is larger than the interior diameter of the second recess 1214. The larger interior diameter of the first recess 1210 may accommodate the AL conductor 1302, which may have a larger gauge than the CU conductor 1312. For purposes of the present disclosure, gauge size can be considered as increasing with diameter. However, some systems adopt a different convention. For example, in the American Wire Gauge (AWG) system, gauge size is inversely proportional to wire diameter. In some embodiments, the first recess 1210 may be configured to accept a first range of gauges of conductors, and the second recess 1214 may be configured to accept a second range of gauges of conductors that is different from the first range of gauges. For instance, the first range of gauges may generally be larger than the second range of gauges. The first range of gauges may be associated with (e.g., defined by) a first maximum gauge and a first minimum gauge. The second range of gauges may be associated with (e.g., defined by) a second maximum gauge and a second minimum gauge. The first maximum gauge may be larger than the second maximum gauge, and the first minimum gauge may be larger than the second minimum gauge.

Figure 13B:
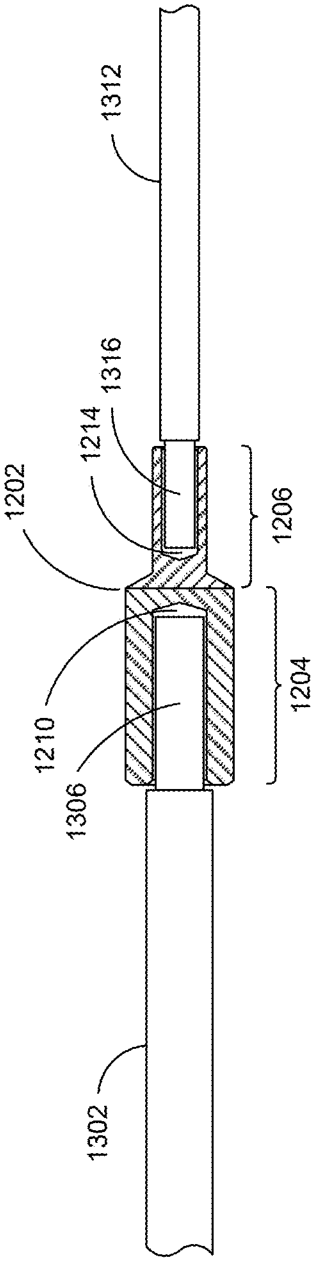
FIG. 13B illustrates the AL-CU metal material transition connector 1202 after insertion of an AL conductor and a CU conductor, according to some embodiments.

FIG. 13B illustrates the AL-CU metal material transition connector 1202 after insertion of an AL conductor and a CU conductor, according to some embodiments. As shown, the proximal end 1308 of the of the AL conductor 1302, specifically the exposed portion of the center conductor 1306, has been inserted into the first recess 1210 of the AL-CU metal material transition connector 1202. After insertion, the proximal end 1308 of the of the AL conductor 1302 may be fastened in order to form a reliable electrical and mechanical connection with the AL-CU metal material transition connector 1202. Thus, the first metal portion 1204 of the AL-CU metal material transition connector 1202 may be mechanically fastened to and electrically connected with the proximal end 1308 of the of the AL conductor 1302. Here, "electrically connected" refers to the formation of a connection capable of conducting electrical current and does not necessary require an electrical potential to be applied to cause the actual flow of electricity.

In some embodiments, the proximal end 1308 of the of the AL conductor 1302 is crimped by compressing the outer walls of the first metal portion 1204 of the AL-CU metal material transition connector 1202 while the center conductor 1306 is positioned within the first recess 1210. A crimping tool (not shown) may comprise multiple tool surfaces positioned at various circumferential locations surrounding the first metal portion 1204. The crimping tool may simultaneously drive the multiple tool surfaces toward the center conductor 1306. For example, the multiple tool surfaces may comprise an integer number (e.g., N=6) of tool surfaces, to form the same integer number (e.g., N=6) of crimp facets on the outer surface of the first metal portion 1204. The crimping action may deform the walls of the first metal portion 1204 of the AL-CU metal material transition connector 1202, to mechanically compress against the center conductor 1306, forming a mechanical and electrical connection between the first metal portion 1204 and the center conductor 1306.

Similarly, the proximal end 1318 of the CU conductor 1312, specifically the exposed portion of the center conductor 1316, is shown as being inserted into the second recess 1214 of the AL-CU metal material transition connector 1202. After insertion, the proximal end 1318 of the of the CU conductor 1312 may be fastened in order to form a reliable electrical and mechanical connection with the AL-CU metal material transition connector 1202. In some embodiments, the proximal end 1318 of the of the CU conductor 1312 is crimped by compressing the outer walls of the second metal portion 1206 of the AL-CU metal material transition connector 1202 while the center conductor 1316 is positioned within the second recess 1214 in a similar manner, e.g., by using a crimping tool to mechanically compress the walls of the second metal portion 1206 against the center conductor 1316, to form a mechanical and electrical connection between the second metal portion 1206 and the center conductor 1316. The second metal portion 1206 may be crimped to form the same number (e.g., N=6) of crimp facets or a different number of crimp facets on the outer surface of the second metal portion 1206 of the AL-CU metal material transition connector 1202. The crimping action may deform the walls of the second metal portion 1206 of the AL-CU metal material transition connector 1202, to mechanically compress against the center conductor 1316, forming a mechanical and electrical connection between the second metal portion 1206 and the center conductor 1316.

Figure 14A:
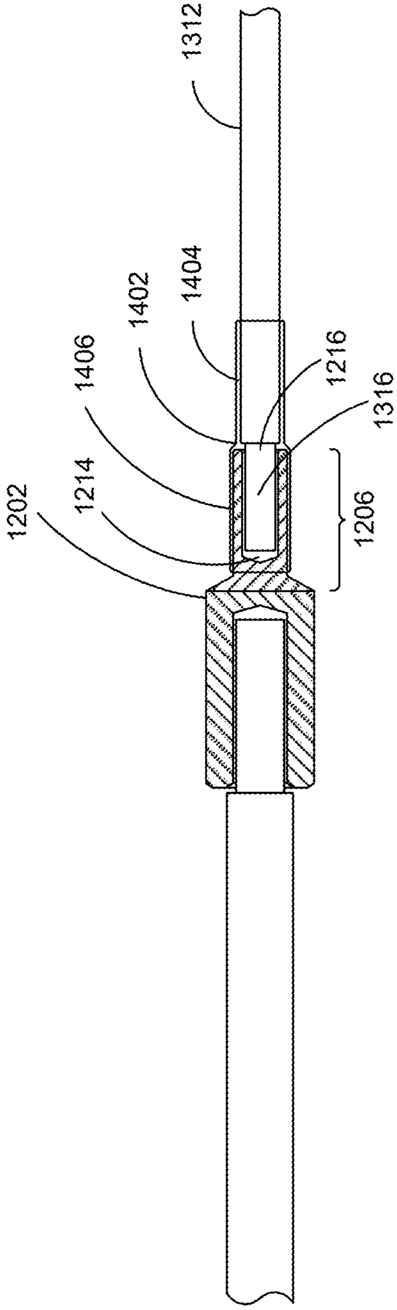
FIG. 14A illustrates the installation of a first temperature-activated sealing member in an embodiment employing two temperature-activated sealing members.

FIG. 14A illustrates the installation of a first temperature-activated sealing member in an embodiment employing two temperature-activated sealing members. An example of a temperature-activated sealing member is a heat shrink tube (HST). Shown is a first HST 1402 which circumferentially surrounds, and forms a seal 1404 against, a portion of the CU conductor 1312 outside of the second recess 1214. For example, the seal 1404 may be formed against the outer surface of the insulation layer of the portion of the CU conductor 1312, at a location that is adjacent to and outside of the second entrance region 1216, as shown in the figure. The first HST 1402 may also circumferentially surround, and form a seal 1406 against, the second metal portion 1206 of the AL-CU metal material transition connector 1202. In some embodiments, the first HST 1402 comprises a temperature-activated outer layer and a temperature-activated adhesive lining an interior surface of the temperature-activated outer layer.

The first HST 1402 may be slipped over the CU conductor 1312 prior to the insertion of the center conductor 1316 into the second recess 1214 of the AL-CU metal material transition connector 1202. Once the second metal portion 1206 of the AL-CU metal material transition connector 1202 has been mechanically fastened to and electrically connected with the proximal end of the CU conductor 1312 (e.g., crimped), the first HST 1402 may be moved into position over the second metal portion 1206 of the AL-CU metal material transition connector 1202 and a portion of the CU conductor 1312. Heat may then be applied to the first HST 1402. The applied heat may cause the outer layer of the first HST 1402 to shrink and conform to the outer shape of the second metal portion 1206 of the AL-CU metal material transition connector 1202 and the portion of the CU conductor 1312. In addition, the applied heat may cause the adhesive lining the interior surface of the outer layer of the first HST 1402 to soften and begin to melt, to form the seal 1404 against the portion of the CU conductor 1312 and the seal 1406 against the second metal portion 1206 of the AL-CU metal material transition connector 1202. While an adhesive is described here as part of the first HST 1402, an HST that does not comprise any adhesive may be used to form seals such as seals 1404 and 1406 in other embodiments.

One benefit of using the first HST 1402 is that it provides an improved sealing and contact surface for additional layer(s) to be installed to encapsulate the structure containing the AL-CU metal material transition connector 1202, as discussed in later sections. Another benefit of using the first HST 1402 is that it can provide a hermetic seal to block undesirable elements such as moisture, dust, and air from coming into contact with the center conductor 1316 or entering the second recess 1214 of the AL-CU metal material transition connector 1202.

Figure 14B:
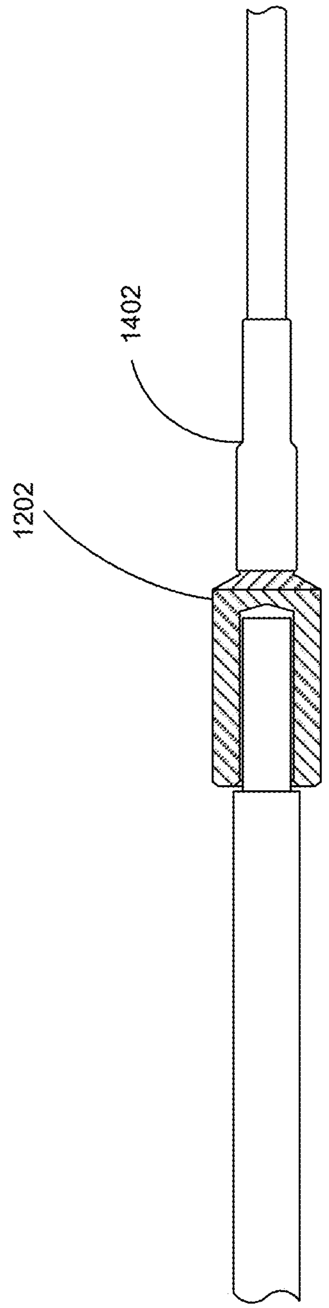
FIG. 14B presents an external view of the first temperature-activated sealing member after it is installed, in an embodiment employing two temperature-activated sealing member.

FIG. 14B presents an external view of the first temperature-activated sealing member (e.g., HST 1402) after it is installed, in an embodiment employing two temperature-activated sealing members. For example, the HST 1402 may be paired with the second HST described below in connection with FIG. 15A. At this time, the second temperature-activated sealing member has not yet been installed.

Figure 15A:
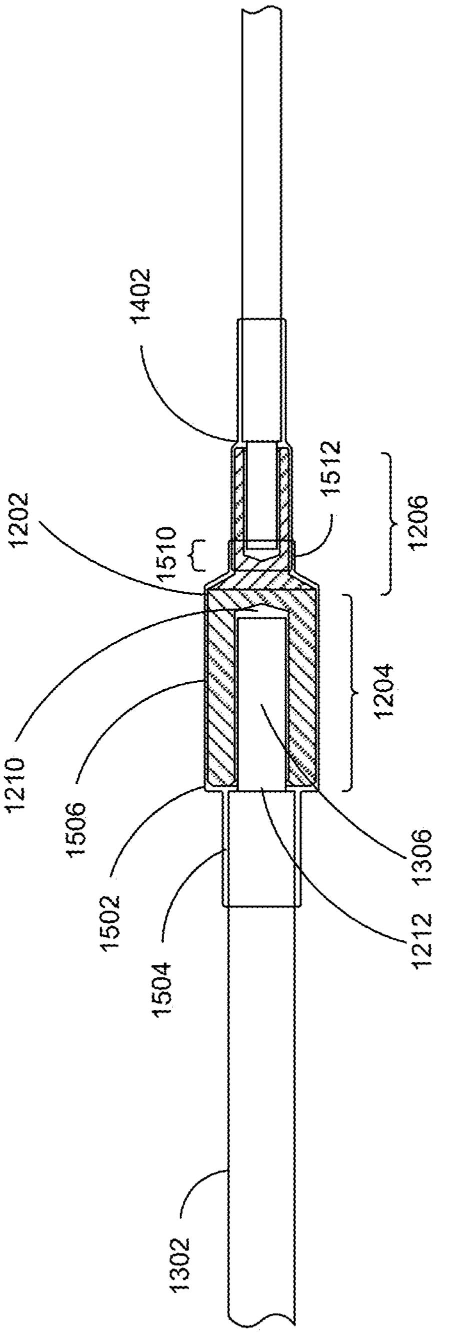
FIG. 15A illustrates the installation of a second temperature-activated sealing member in an embodiment employing two temperature-activated sealing members.

FIG. 15A illustrates the installation of a second temperature-activated sealing member in an embodiment employing two temperature-activated sealing members. As discussed, an example of a temperature-activated sealing member is an HST. Shown is a second HST 1502 which circumferentially surrounds, and forms a seal 1504 against, a portion of the AL conductor 1302 outside of the first recess 1210. For example, the seal 1504 may be formed against the outer surface of the insulation layer of the portion of the AL conductor 1302 at a location that is adjacent to and outside of the first entrance region 1212, as shown in the figure. The second HST 1502 may also circumferentially surround, and form a seal 1506 against, the first metal portion 1204 of the AL-CU metal material transition connector 1202. In some embodiments, the second HST 1502 comprises a temperature-activated outer layer and a temperature-activated adhesive lining an interior surface of the temperature-activated outer layer.

The second HST 1502 may be slipped over the AL conductor 1302 prior to the insertion of the center conductor 1306 into the first recess 1210 of the AL-CU metal material transition connector 1202. Once the first metal portion 1204 of the AL-CU metal material transition connector 1202 has been mechanically fastened to and electrically connected with the proximal end of the AL conductor 1302 (e.g., crimped), the second HST 1502 may be moved into position over a portion of the AL conductor 1302, the first metal portion 1204 of the AL-CU metal material transition connector 1202, and optionally a portion of the second metal portion 1206 of the AL-CU metal material transition connector 1202.

Here, the second HST 1502 may at least partially overlap the first HST 1402 in an HST overlap region 1510. Heat may then be applied to the second HST 1502. The applied heat may cause the outer layer of the second HST 1502 to shrink and conform to the outer shape of the first metal portion 1204 of the AL-CU metal material transition connector 1202 and the portion of the AL conductor 1302. In addition, the applied heat may cause the adhesive lining the interior surface of the outer layer of the second HST 1502 to soften and begin to melt, to form the seal 1504 against the portion of the AL conductor 1302, the seal 1506 against the first metal portion 1204 of the AL-CU metal material transition connector 1202, and a seal 1512 against the second HST 1502 in the overlap region 1510. While an adhesive is described here as part of the second HST 1502, an HST that does not comprise any adhesive may be used to form seals such as seals 1504, 1506, and 1512 in other embodiments.

One benefit of using the second HST 1502 is that it provides an improved sealing and contact surface for additional layer(s) to be installed to encapsulate the structure containing the AL-CU metal material transition connector 1202, as discussed in later sections. Another benefit of using the second HST 1502 is that it can provide a hermetic seal to block undesirable elements such as moisture, dust, and air from coming into contact with the center conductor 1306 or entering the first recess 1210 of the AL-CU metal material transition connector 1202.

Figure 15B:
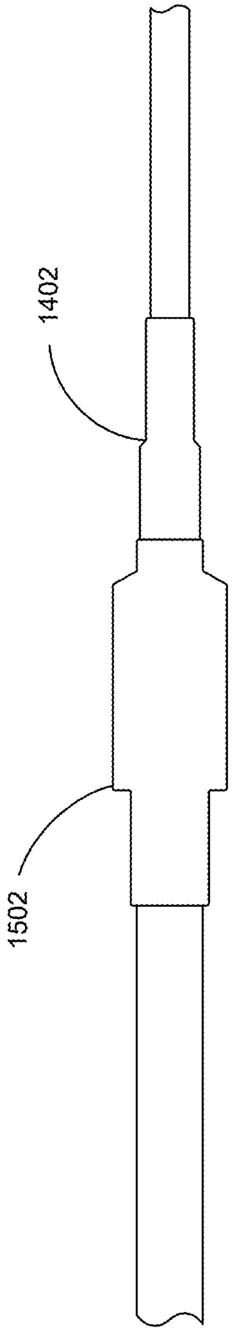
FIG. 15B presents an external view of the second temperature-activated sealing member after it is installed to partially overlap the first temperature-activated sealing member, in an embodiment employing two temperature-activated sealing members.

FIG. 15B presents an external view of the second temperature-activated sealing member (e.g., HST 1502) after it is installed to partially overlap the first temperature-activated sealing member (e.g., HST 1402), in an embodiment employing two temperature-activated sealing members.

The configuration of two separate HSTs, such as HST 1402 and HST 1502, as the one or more temperature-activated sealing members may be referred to as a "two-segment" HST and may provide further technical benefits. For a metal material transition connector used in a solar array wiring system, the selection of the physical dimensions and material composition of the HST for the one or more temperature-activated sealing members may depend on specific constraints, such as fire-retardation rating, electrical resistance, physical dimension shrinkage range, and/or other parameters. Furthermore, the required diameter of the HST (e.g., prior to and/or subsequent to temperature-activated shrinkage) may be larger at one section (e.g., first metal portion 1204) than at another section (second metal portion 1206) of the overall AL-CU connector structure. By employing a two-segment HST structure, a first HST 1402 having pre-shrinkage and post-shrinkage diameter specifications tailored to the outer diameter of the first metal portion 1204 may be selected, and a second HST 1502 having pre-shrinkage and post-shrinkage diameter specifications tailored to the outer diameter of the second metal portion 1206 may be separately selected. Thus, various performance parameters such as fire-retardation rating, electrical resistance, etc. may be separately met and optimized, without the requirement of a physical dimension shrinkage range that accommodates both the larger outer diameter of the first metal portion 1204 and the smaller outer diameter of the second metal portion 1206 of the AL-CU metal material transition connector 1202.

Figure 16A:
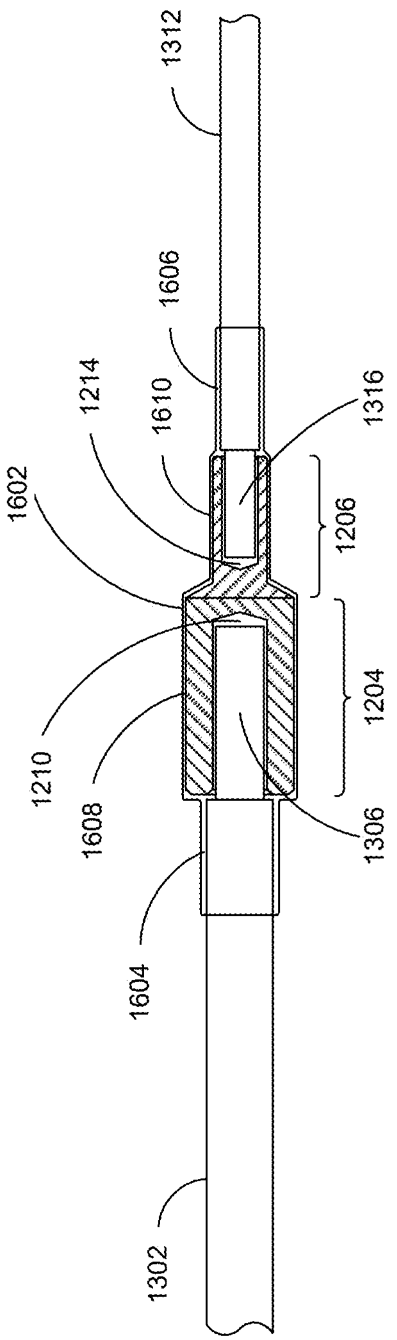
FIG. 16A illustrates the installation of a single temperature-activated sealing member, according to some embodiments of the disclosure.

FIG. 16A illustrates the installation of a single temperature-activated sealing member, according to some embodiments of the disclosure. As discussed, an example of a temperature-activated sealing member is an HST. Shown is an HST 1602 which circumferentially surrounds, and forms a seal 1604 against, a portion of the AL conductor 1302. The HST 1602 also circumferentially surrounds, and forms a seal 1606 against, a portion of the CU conductor 1312. In addition, the HST 1602 may also circumferentially surround, and form a seal 1608 against, the first metal portion 1204 of the AL-CU metal material transition connector 1202. Furthermore, the HST 1602 may also may also circumferentially surround, and form a seal 1610 against, the second metal portion 1206 of the AL-CU metal material transition connector 1202. In some embodiments, the HST 1602 comprises a temperature-activated outer layer and a temperature-activated adhesive lining an interior surface of the temperature-activated outer layer.

The HST 1602 may be slipped over the AL conductor 1302 or the CU conductor 1312 prior to the insertion of the center conductor 1306 into the first recess 1210 of the AL-CU metal material transition connector 1202 and/or the insertion of the center conductor 1316 into the second recess 1214 of the AL-CU metal material transition connector 1202. Once the first metal portion 1204 of the AL-CU metal material transition connector 1202 has been mechanically fastened to and electrically connected with the proximal end of the AL conductor 1302 (e.g., crimped), and the second metal portion 1206 of the AL-CU metal material transition connector 1202 has been mechanically fastened to and electrically connected with the proximal end of the CU conductor 1312 (e.g., crimped), the HST 1602 may be moved into position over a portion of the AL conductor 1302, the first metal portion 1204 of the AL-CU metal material transition connector 1202, the second metal portion 1206 of the AL-CU metal material transition connector 1202, and a portion of the CU conductor 1312. Heat may then be applied to the HST 1602.

The applied heat may cause the outer layer of the HST 1602 to shrink and conform to the outer shape of the portion of the AL conductor 1302, the first metal portion 1204 of the AL-CU metal material transition connector 1202, the second metal portion 1206 of the AL-CU metal material transition connector 1202, and the portion of the CU conductor 1312. In addition, the applied heat may cause the adhesive lining the interior surface of the outer layer of the HST 1602 to soften and begin to melt, to form the seal 1604 against the portion of the AL conductor 1302, the seal 1608 against the first metal portion 1204 of the AL-CU metal material transition connector 1202, the seal 1610 against the second metal portion 1206 of the AL-CU metal material transition connector 1202, and the seal 1606 against the portion of the CU conductor 1312. While an adhesive is described here as part of the HST 1602, an HST that does not comprise any adhesive may be used to form seals such as seals 1604, 1608, 1610, and 1606 in other embodiments.

One benefit of using the HST 1602 is that it provides an improved sealing and contact surface for additional layer(s) to be installed to encapsulate the structure containing the AL-CU metal material transition connector 1202, as discussed in later sections. Another benefit of using HST 1602 is that it can provide a hermetic seal to block undesirable elements such as moisture, dust, and air from coming into contact with the center conductors 1306 and 1316 or entering the first recess 1210 and second recess 1214 of the AL-CU metal material transition connector 1202.

Figure 16B:
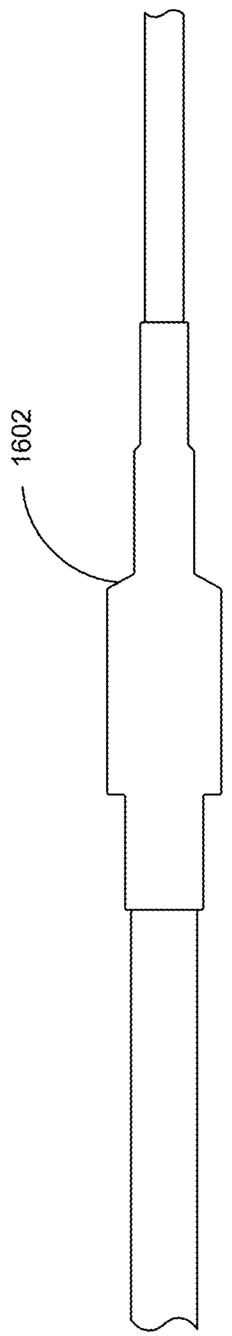
FIG. 16B presents an external view of the single temperature-activated sealing member after it is installed, according to some embodiments of the disclosure.

FIG. 16B presents an external view of the single temperature-activated sealing member (e.g., HST 1602) after it is installed, according to some embodiments of the disclosure. For illustration purposes, the HST 1602 is shown as having approximately the same length as the combined lengths of HSTs 1402 and 1502 in FIG. 15B once they are installed (i.e., with HSTs 1402 and 1502 having a region of overlap).

Figure 17A:
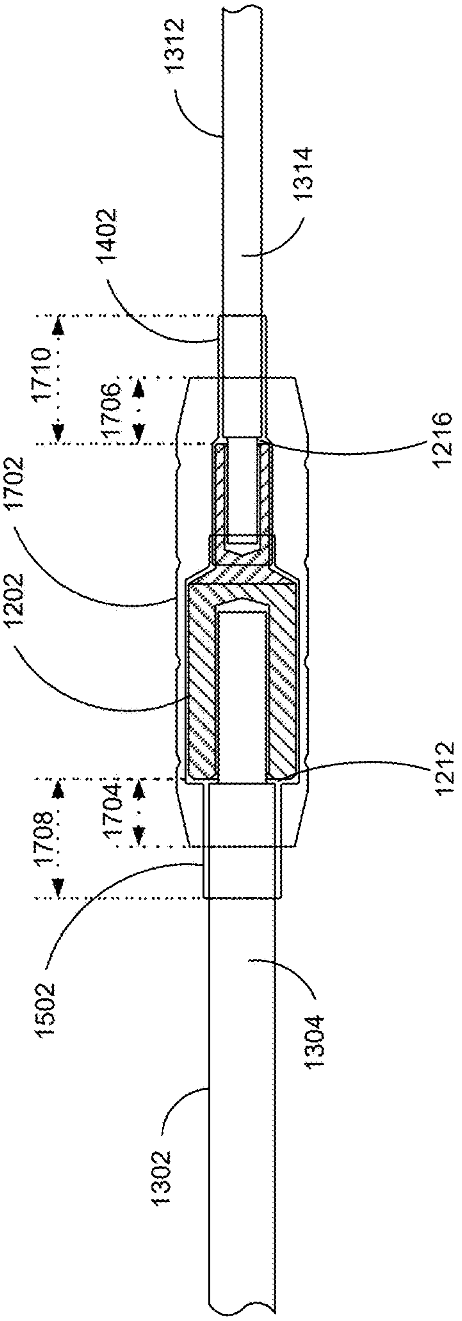
FIG. 17A illustrates the installation of an inner mold that encapsulates the metal material transition connector and at least partially encapsulates the one or more temperature-activated sealing members according to various embodiments of the disclosure.

FIG. 17A illustrates the installation of an inner mold 1702 that encapsulates the metal material transition connector 1202 and at least partially encapsulates the one or more temperature-activated sealing members (e.g., HSTs 1402, 1502, and/or 1602) according to various embodiments of the disclosure. The construction of the metal material transition connector 1202 and the one or more temperature-activated sealing members may correspond with the description provided as relating to previous figures. The example of two HSTs 1402 and 1502 is shown in this figure. However, a single HST 1602 may also be encapsulated by an inner mold 1702 in a similar manner.

The inner mold 1702 may provide mechanical rigidity to protect the assembly comprising the metal material transition connector 1202, the AL conductor 1302 inserted into the first recess 1210 of the metal material transition connector 1202, the CU conductor 1312 inserted into the second recess 1214 of the metal material transition connector 1202, and the one or more temperature-activated sealing members (e.g., HSTs 1402 and 1502). According to embodiments of the disclosure, the inner mold 1702 may comprise a relatively rigid, lightweight, and electrically non-conductive material capable of withstanding various forces exerted on the assembly. In some embodiments, the inner mold 1702 comprises a polypropylene (PP) material. The solar array wiring system employing the above-described wiring assembly may need to withstand harsh environmental conditions for prolonged time periods. In many deployments, the environment can have strong wind conditions that can subject the wiring system to abrupt movement, including vibration and impact. Furthermore, installation in challenging physical environments such as roughly prepared fields of dirt and rocky surfaces may also subject the wiring system to movement such as vibration and impact. Forces acting on the wiring assembly during installation and/or operation may also include tensile and bending forces that can damage the wire assembly. Adding an inner mold such as that described herein can significantly improve the reliability of the assembly, especially in environments where the assembly is subjected to forces associated with movement of the solar array wiring system.

The inner mold 1702 may also contribute to providing internal strain relief to certain portions of the wiring assembly (in addition to the external strain relief provided by the outer mold, as described in later sections). As discussed, forces acting on the wiring assembly during installation and/or operation may include bending forces that can damage the wire assembly. For example, the AL conductor 1302 and the CU conductor 1312 may be prone to breakage near the first entrance region 1212 and the second entrance region 1216 of the metal material transition connector 1202 resulting from such bending forces. The inner mold 1702 may extend for a distance, e.g., over a first inner mold extension region 1704 and a second inner mold extension region 1706, beyond the ends of the metal material transition connector 1202. The mechanical rigidity of the inner mold 1702 spanning the first inner mold extension region 1704 and the second inner mold extension region 1706 may provide a degree of strain relief for the AL conductor 1302 and the CU conductor 1312 against bending forces encountered during installation and operation of the solar array wiring assembly.

In addition, the inner mold 1702 may provide protection against external elements such as moisture, dust, and air that can potentially cause corrosion or other damage to interior components. According to various embodiments, the inner mold 1702 may work in conjunction with the one or more temperature-activated sealing members (e.g., HSTs 1402 and 1502) to form an effective shield against such external elements, particularly in the context of a solar array wiring system. One technical problem addressed by the inner mold 1702 used in conjunction with the one or more temperature-activated sealing members relates to the material properties of the insulator layer of the elongated conductor members (e.g., insulator layer 1304 of the AL conductor 1302, insulator layer 1314 of the CU conductor 1312, etc.). Often, such insulator layers are composed of rugged and relatively rigid polymer materials with high resistance to wear and ultraviolet (UV) exposure, to ensure longevity in potentially harsh external environments associated with deployment of solar array wiring systems. The material used for the inner mold 1702, such as polypropylene (PP), may also be relatively rigid. Direct contact of these two relatively rigid materials can result in a seal having reduced performance, as both rigid materials may have limited ability to conform to the shape of a surface.

Thus, according to certain embodiments of the disclosure, the one or more temperature-activated sealing members (e.g., HSTs 1402 and 1502) may serve as an intervening layer. Here, the one or more temperature-activated sealing members (e.g., HSTs 1402 and 1502) may form a primary seal against the insulator layer (e.g., insulator layer 1304 and insulator layer 1314) of the conductor, while also providing a more pliable surface against which the inner mold 1702 can form a secondary seal. For instance, the primary seal may be formed in a first HST extension region 1708 and a second HST extension region 1710, against the insulator layer 1304 of the AL conductor 1302 and the insulator layer 1314 of the CU conductor 1312, respectively. The secondary seal may be formed in the first inner mold extension region 1704 and the second inner mold extension region 1706, against the HSTs 1402 and 1502. As shown, the first HST extension region 1708 may extend further than the first inner mold extension region 1704 beyond the end of the metal material transition connector 1202. Similarly, the second HST extension region 1710 may extend further than the second inner mold extension region 1706 beyond the end of the metal material transition connector 1202. The resulting overall seal, comprising the primary seal and the secondary seal, may have significantly better performance than, e.g., directly sealing the inner mold 1702 against the insulator layer of the conductor(s). The combination of the inner mold 1702, the one or more temperature-activated sealing members, and the insulator layer of the conductor(s) thus provides effective protection against external elements, particularly in harsh environmental conditions associated with solar array deployments.

Figure 17B:
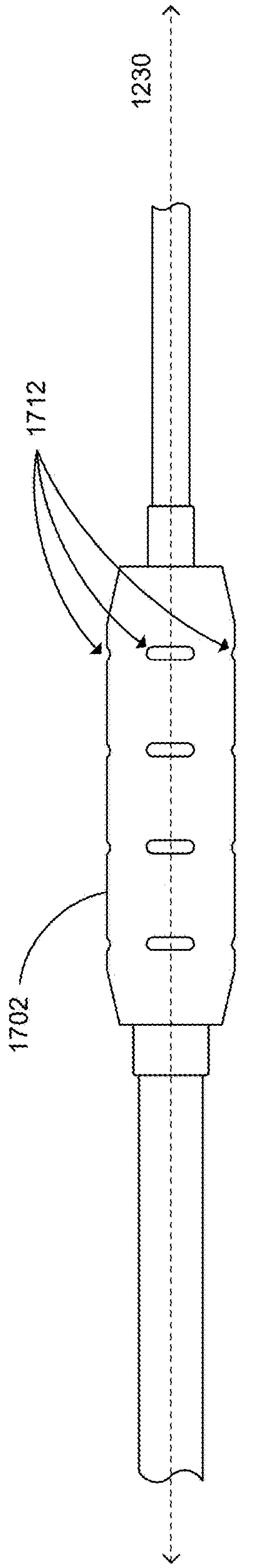
FIG. 17B presents an external view of the inner mold, according to one or more embodiments.
Figure 17C:
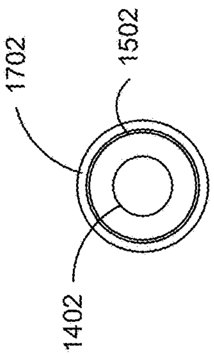
FIG. 17C presents a lateral cross-sectional view of the inner mold that encapsulates the metal material transition connector and at least partially encapsulates the one or more temperature-activated sealing members, according to one or more embodiments.

FIG. 17B presents an external view of the inner mold 1702, according to one or more embodiments. In some embodiments, the inner mold 1702 may also comprise exterior features that match, or key to, portions of the interior contours of the outer mold (described in later sections), to reduce relative movement between the inner mold 1702 and the outer mold. Examples of such exterior features include divots 1712 that may be formed on the exterior surface of the body of the inner mold 1702. In certain embodiments, the divots 1712 are depressions formed on the exterior surface of the inner mold 1702 that do not form holes that puncture the body of the inner mold 1702. That is, the divots 1712 do not allow external elements such as moisture, dust, and air to penetrate the body of the inner mold 1702. Rather, the divots 1712 merely provide exterior features that match, or key to, portions of the interior contours of the outer mold (described in later sections), to reduce relative movement between the inner mold 1702 and the outer mold. In some embodiments, the divots 1712 may be repeated in an evenly spaced pattern over the outer surface of the inner mold 1702. For example, a row of divots 1712 may be located at evenly spaced positions along a longitudinal axis of the inner mold 1702 (e.g., axis 1230). Alternatively or additionally, a plurality of divots 1712 may be located at evenly spaced positions along a circumference of the inner mold 1702. In other embodiments, the inner mold 1702 may have a smooth exterior surface that does not include individual patterned features such as divots. Here, the frictional properties and/or general exterior contours of the inner mold 1702 (when keyed to the general interior contours of the outer mold) are sufficient to reduce relative movement between the inner mold 1702 and the outer mold. FIG. 17C presents a lateral cross-sectional view of the inner mold 1702 that encapsulates the metal material transition connector 1202 and at least partially encapsulates the one or more temperature-activated sealing members, such as HST 1502 and HST 1402, according to one or more embodiments.

Figure 18A:
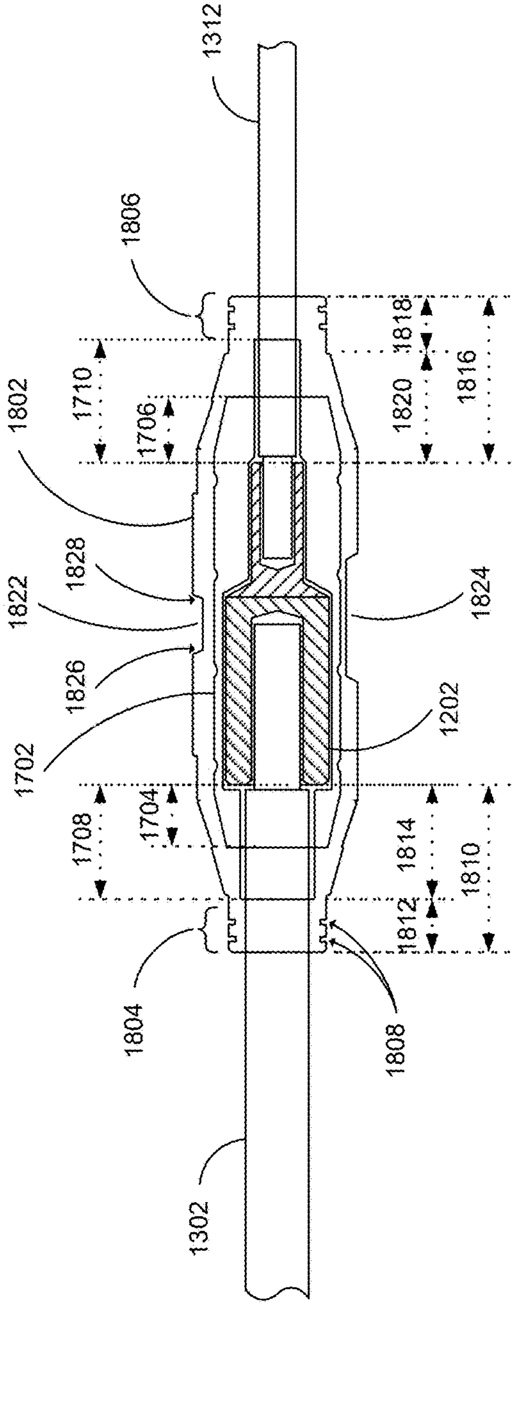
FIG. 18A presents an assembled metal material transition connector after installation of an outer mold, according to one or more embodiments of the disclosure.

FIG. 18A presents an assembled metal material transition connector 1800 after installation of an outer mold 1802, according to one or more embodiments of the disclosure. The outer mold 1802 may comprise a rugged and pliable material that can withstand rough handling, abrasion, and prolonged exposure to UV rays. In some embodiments, the outer mold 1802 comprises a thermoplastic vulcanizate (TVP) material. The outer mold 1802 may provide external strain relief, as mentioned previously. As shown, the outer mold 1802 may include a first strain relief (SR) segment 1804 and a second strain relief segment 1806. Each of the first strain relief segment 1804 and the second strain relief segment 1806 comprises one or more strain relief concavities 1808. The strain relief concavities 1808 increase the flexibility of the outer mold 1802 at the respective strain relief segments, such that the strain sustained as result of a bending force applied to each elongated conductor (e.g., the AL conductor 1302 or the CU conductor 1312) is spread out over a greater length of the conductor. Thus, the first strain relief segment 1804 is configured to provide strain relief and counter against a force, such as a bending force, applied to the AL conductor 1302. The second strain relief segment 1806 is configured to provide strain relief and counter against a force, such as a bending force, applied to the CU conductor 1312.

According to some embodiments, the design of the outer mold 1802, including the placement of the first strain relief segment 1804 and the second strain relief segment 1806, may work in conjunction with the inner mold 1702 to further enhance the overall strain relief performance of the assembled metal material transition connector 1800. As shown, the outer mold 1802 may extend, in a first outer mold extension region 1810, beyond one end of the metal material transition connector 1202. The first outer mold extension region 1810 may comprise a first SR region 1812 and a first non-SR region 1814. The first non-SR region 1814 may extend beyond the end of the inner mold 1702. The outer mold 1802 may be more flexible in the first SR region 1812, where the first strain relief segment 1804 is located. The outer mold 1802 may be less flexible in the first non-SR region 1814, where the first strain relief segment 1804 is not located, but the outer mold 1802 may nevertheless provide some flexibility due to the pliability of the outer mold material (e.g., TVP). This reduced flexibility is especially exhibited where the first non-SR region 1814 extends beyond the end of the inner mold 1702 (e.g., beyond the first inner mold extension region 1704).

Similarly, the outer mold 1802 may extend, in a second outer mold extension region 1816, beyond the other end of the metal material transition connector 1202. The second outer mold extension region 1816 may comprise a second SR region 1818 and a second non-SR region 1820. The second non-SR region 1820 may extend beyond the other end of the inner mold 1702. The outer mold 1802 may be more flexible in the second SR region 1818, where the second relief segment 1806 is located (e.g., equally as flexible as in the first SR region 1812). The outer mold 1802 may be less flexible in the second non-SR region 1820, where the second relief segment 1806 is not located, but the outer mold 1802 may nevertheless provide some flexibility due to the pliability of the outer mold material (e.g., TVP), especially where the second non-SR region 1820 extends beyond the end of the inner mold 1702 (e.g., beyond the second inner mold extension region 1706).

Overall, the assembled metal material transition connector 1800 may have the least flexibility over the region occupied by the inner mold 1702 (e.g. in the first inner mold extension region 1704 and/or the second inner mold extension region 1706), where rigidity of the inner mold 1702, together with the additional structural support provided by the outer mold 1802, provide the most rigidity. Thus, the combination and relative placement of the first strain relief segment 1804 and the inner mold 1702 can provide graduated levels of structural support to enhance the ability of the assembled metal material transition connector 1800 to provide strain relief to the AL conductor 1302. Likewise, the combination and relative placement of the second relief segment 1806 and the inner mold 1702 can provide graduated levels of structural support to enhance the ability of the assembled metal material transition connector 1800 to provide strain relief to the CU conductor 1312.

Figure 18B:
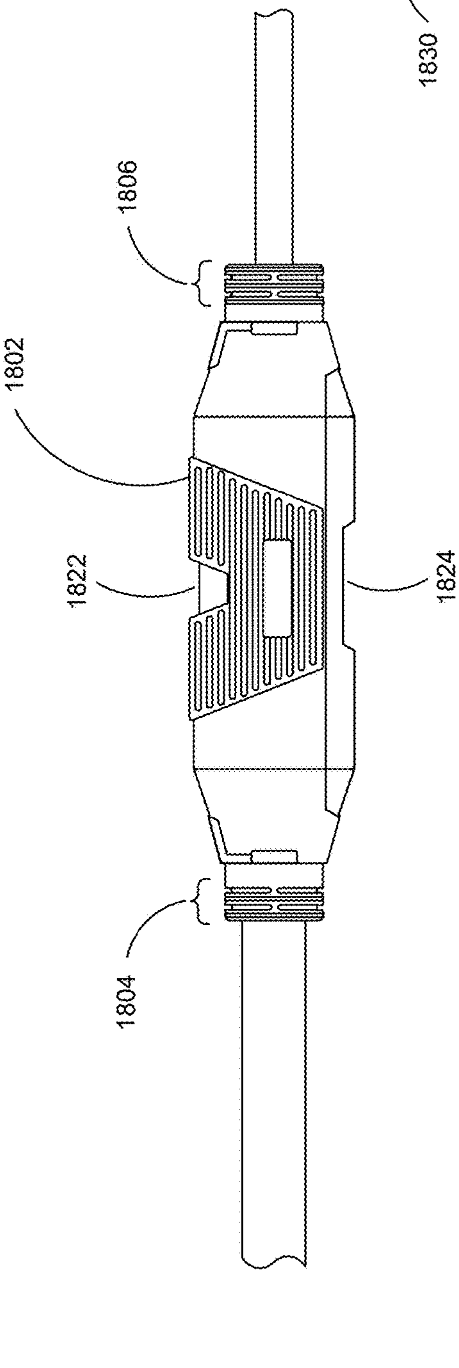
FIG. 18B presents an external view of the assembled metal material transition connector, according to one or more embodiments.

FIG. 18B presents an external view of the assembled metal material transition connector 1800 after installation of the outer mold 1802, according to one or more embodiments. As shown in the figure, the outer mold 1802 may comprise the first strain relief segment 1804 and the second strain relief segment 1806. In addition, the outer mold 1802 may include one or more exterior troughs, such as a first exterior trough 1822 and a second exterior trough 1824, configured to receive an anchoring device (not shown) for the assembled metal material transition connector 1800. Some solar array deployment environments may be prone to extreme weather conditions, including those associated with high winds. Exterior troughs formed in the material of the outer mold 1802 provide a location for installing one or more anchoring devices used to secure the assembled metal material transition connector 1800 and attached conductors, e.g., against a rigid support structure, other cables, etc., in order to secure the wiring assembly against excessive movement. Examples of such an anchoring device may include a cable tie, a wire tie, a cable belt, etc.

Figure 18C:
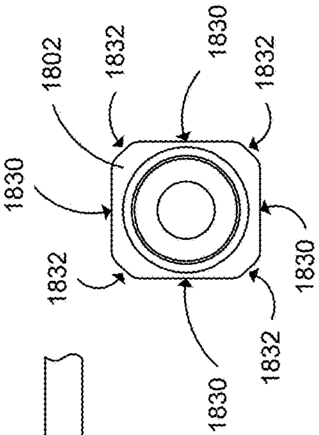
FIG. 18C presents a lateral cross-sectional view of the assembled metal material transition connector after installation of an outer mold, according to one or more embodiments of the disclosure.

Each exterior trough may be flanked by features that keep the anchoring device in place. For example, the first exterior trough 1822 may be positioned between a first raised wall 1826 and a second raised wall 1828, which can keep a cinched cable tie or other anchoring device from slipping off of the assembled metal material transition connector 1800. As shown, the first exterior trough 1822 is positioned at or near a center position (e.g., midpoint) along the length of the assembled metal material transition connector 1800. Other exterior trough(s), such as the second exterior trough 1824, may also be positioned at or near the center location along the length of the assembled metal material transition connector 1800, but at different facets. For example, FIG. 18C presents a lateral cross-sectional view of the assembled metal material transition connector after installation of an outer mold, according to one or more embodiments of the disclosure. Some exterior troughs, such as the first and second exterior troughs 1822 and 1824, may also be position at or near the center location along the length of the assembled metal material transition connector 1800, but at different facets (e.g., facets 1830 and 1832, shown in FIG. 18C) or different angles around the circumference of the assembled metal material transition connector 1800. Each trough thus reduces the exterior circumference of the assembled metal material transition connector 1800. Individually and collectively, the troughs contribute to the formation of a centrally-positioned, reduced-circumference location at which an anchoring device may be installed.

Figure 19A:
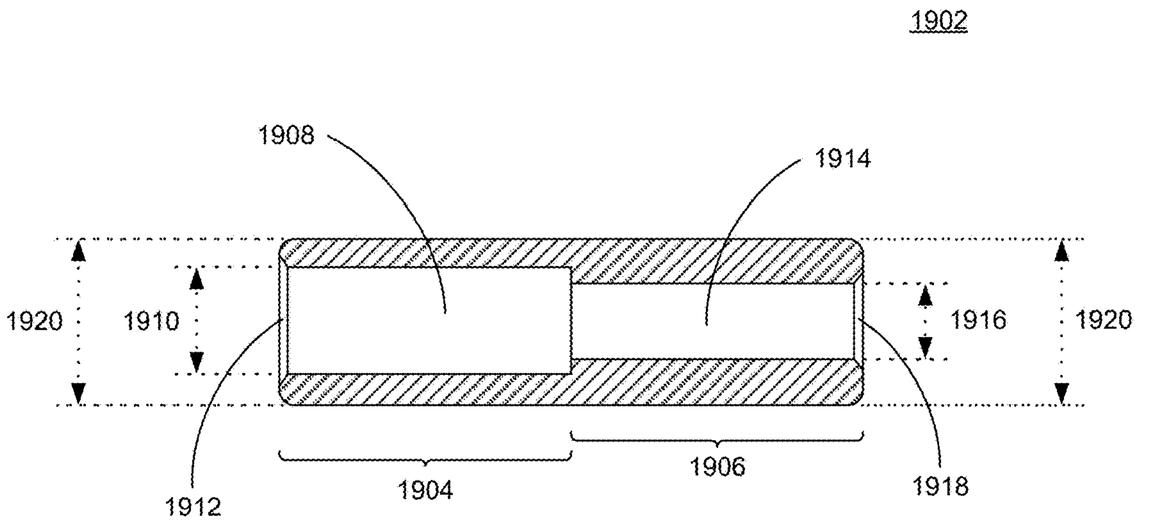
FIG. 19A presents a longitudinal cross-section view of an aluminum-aluminum (AL-AL) metal gauge transition connector that may incorporate one or more embodiments.

FIG. 19A presents a longitudinal cross-section view of an aluminum-aluminum (AL-AL) metal gauge transition connector 1902 that may incorporate one or more embodiments. The AL-AL metal gauge transition connector 1902 is an example of a metal gauge transition connector configured to facilitate the formation of a reliable mechanical and electrical connection between two conductors comprised of the same metal material but having different gauge sizes as deployed in a solar array wiring system. Once again, an example of a solar array wiring system is a wiring system comprising cables and connectors that provide connections for one or more arrays of photovoltaic panels. Here, the metal gauge transition connector 1902 comprises a single type of metal material, e.g., aluminum (AL). While AL is illustrated here by way of example, other embodiments of the disclosure include metal gauge transition connectors capable of forming electrical and mechanical connection between conductors of different gauges but made of a different (e.g., non-aluminum) metal material. As shown, the AL-AL metal gauge transition connector 1902 comprises a first section 1904 and a second section 1906. In some embodiments, the first section 1904 and the second section 1906 may be manufactured from a single piece of metal.

The first section 1904 of the metal gauge transition connector 1902 includes a first recess 1908 that has a first internal diameter 1910 and is configured to receive, at a first entrance region 1912, a proximal end of a first elongated conductor member, such as an AL conductor, of a first range of gauges. The second section 1906 of the metal gauge transition connector 1902 includes a second recess 1914 that has a second internal diameter 1916 and is configured to receive, at a second entrance region 1918, a proximal end of a second elongated conductor member, such as another AL conductor, of a second range of gauges different from the first range of gauges. The first internal diameter 1910 may be different than the second internal diameter 1916. For example, the first internal diameter 1910 may be larger than the second internal diameter 1916. In some embodiments, the first section 1904 and the second section 1906 may have a common external diameter 1920, even though the first section 1904 and the second section 1906 have respective recesses with different internal diameters, e.g., the first internal diameter 1910 and the second internal diameter 1916. In some embodiments, the metal gauge transition connector 1902 has an external diameter 1920 that remains the same over the entire longitudinal length of the metal gauge transition connector 1902. Further details regarding the operation of the first recess 1908 and the second recess 1914 are described in conjunction with subsequent figures.

Figure 19B:
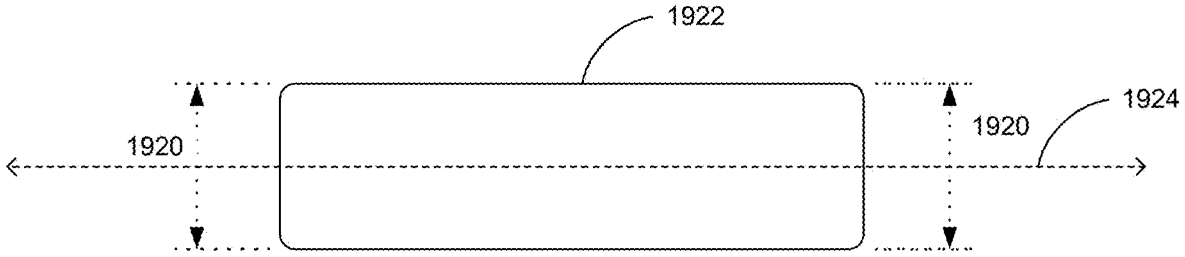
FIG. 19B presents an external view of the AL-AL metal gauge transition connector, according to some embodiments of the disclosure.

FIG. 19B presents an external view of the AL-AL metal gauge transition connector 1902, according to some embodiments of the disclosure. An outer surface 1922 of the AL-AL metal gauge transition connector 1902 is visible in this external view. The consistent external diameter 1920 that remains the same over the entire longitudinal length of the metal gauge transition connector 1902 is also visible in the external view of the metal gauge transition connector 1902.

According to some embodiments, the metal gauge transition connector (e.g., AL-AL metal gauge transition connector 1902 has a shape characterized as a "solid of revolution." Once again, geometrically speaking, a solid-of-revolution shape may be described as a three-dimensional shape that can be formed by rotating a two-dimensional shape about an axis of rotation. The solid-of-revolution shape facilitates efficient manufacturing of the various features of the metal gauge transition connector. For example, features of the AL-AL metal gauge transition connector 1902, including the first recess 1908, the second recess 1914, and the outer surface 1922, may be manufactured by rotating a solid metal work piece while cutting away excess material, to form the desired shape. An axis of rotation for turning AL-AL metal gauge transition connector 1902 is shown as an axis 1924.

Figure 20A:
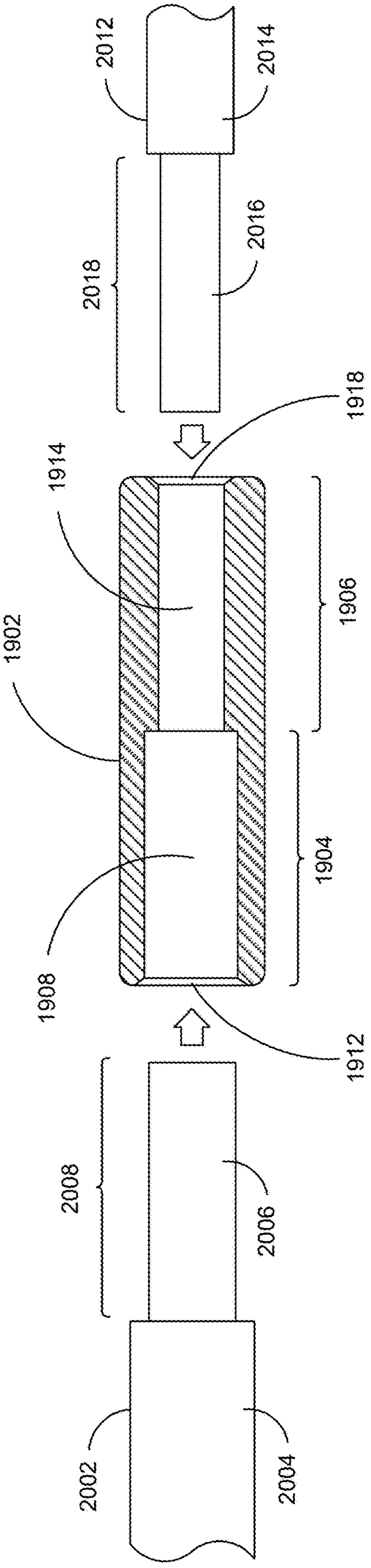
FIG. 20A illustrates the insertion of a first AL conductor of a particular gauge and a second AL conductor of a different gauge into the AL-AL metal gauge transition connector, according to some embodiments.

FIG. 20A illustrates the insertion of a first AL conductor of a particular gauge and a second AL conductor of a different gauge into the AL-AL metal gauge transition connector 1902, according to some embodiments. A first elongated conductor member, here an AL conductor 2002, may comprise an insulator layer 2004 and a center conductor 2006. The center conductor 2006 may comprise either a solid conductor or a stranded conductor made up of multiple strands of individual solid conductors or multiple strands of stranded conductors. Here, the center conductor 2006 is made of an AL material. At a proximal end 2008 (from the perspective of the AL-AL metal gauge transition connector 1902) of the AL conductor 2002, a portion of the insulator layer 2004 is removed to expose a portion of the center conductor 2006. As shown, the proximal end 2008 of the AL conductor 2002, comprising the exposed portion of the center conductor 2006, is inserted into the first recess 1908 of the AL-AL metal gauge transition connector 1902 at the first entrance region 1912.

A second elongated conductor member, here an AL conductor 2012, may comprise an insulator layer 2014 and a center conductor 2016. The center conductor 2016 may comprise either a solid conductor or a stranded conductor made up of multiple strands of individual solid conductors or multiple strands of stranded conductors. Here, the center conductor 2016 is made of an AL material. At a proximal end 2018 (from the perspective of the AL-AL metal gauge transition connector 1902) of the AL conductor 2012, a portion of the insulator layer 2014 is removed to expose a portion of the center conductor 2016. As shown, the proximal end 2018 of the AL conductor 2012, comprising the exposed portion of the center conductor 2016, is inserted into the second recess 1914 of the AL-AL metal gauge transition connector 1902 at the second entrance region 1918.

As mentioned previously, the first recess 1908 may have an interior diameter that is larger than the interior diameter of the second recess 1914. The larger interior diameter of the first recess 1908 may accommodate the AL conductor 2002, which may have a larger gauge than the AL conductor 2012. As previously noted, for purposes of the present disclosure, gauge size can be considered as increasing with diameter. In some embodiments, the first recess 1908 may be configured to accept a first range of gauges of conductors, and the second recess 1914 may be configured to accept a second range of gauges of conductors that is different from the first range of gauges. For instance, the first range of gauges may generally be larger than the second range of gauges. The first range of gauges may be associated with (e.g., defined by) a first maximum gauge and a first minimum gauge. The second gauge may be associated with (e.g., defined by) a second maximum gauge and a second minimum gauge. The first maximum gauge may be larger than the second maximum gauge, and the first minimum gauge may be larger than the second minimum gauge.

Figure 20B:
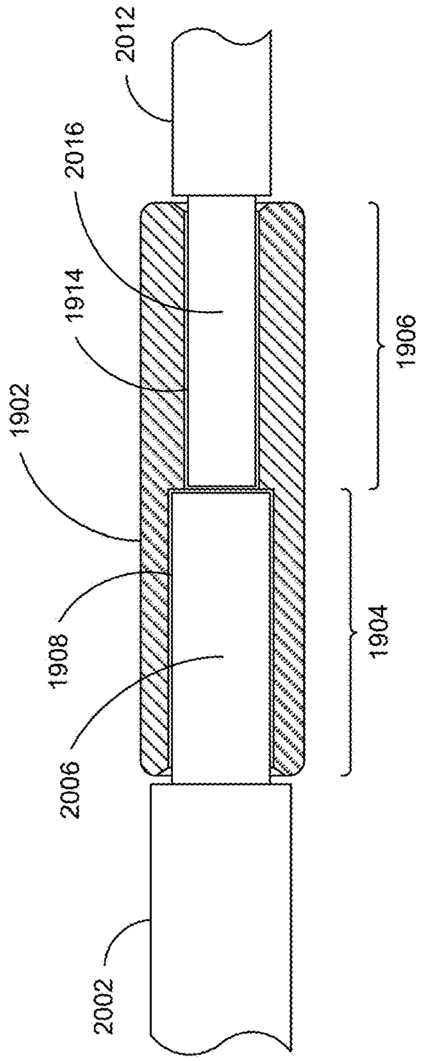
FIG. 20B illustrates the AL-AL metal gauge transition connector after insertion of a first AL conductor and a second AL connector, according to some embodiments.

FIG. 20B illustrates the AL-AL metal gauge transition connector 1902 after insertion of a first AL conductor and a second AL connector, according to some embodiments. As shown, the proximal end 2008 of the AL conductor 2002, specifically the exposed portion of the center conductor 2006, has been inserted into the first recess 1908 of the AL-AL metal gauge transition connector 1902. After insertion, the proximal end 2008 of the AL conductor 2002 may be fastened in order to form a reliable electrical and mechanical connection with the AL-AL metal gauge transition connector 1902. Thus, the first section 1904 of the AL-AL metal gauge transition connector 1902 may be mechanically fastened to and electrically connected with the proximal end 2008 of the AL conductor 2002. Once again, "electrically connected" refers to the formation of a connection capable of conducting electrical current and does not necessary require an electrical potential to be applied to cause the actual flow of electricity.

In some embodiments, the proximal end 2008 of the AL conductor 2002 is crimped by compressing the outer walls of the first section 1904 of the AL-AL metal gauge transition connector 1902 while the center conductor 2006 is positioned within the first recess 1908. A crimping tool (not shown) may comprise multiple tool surfaces positioned at various circumferential locations surrounding the first section 1904. The crimping tool may simultaneously drive the multiple tool surfaces toward the center conductor 2006. For example, the multiple tool surfaces may comprise an integer number (e.g., N=6) of tool surfaces, to form the same integer number (e.g., N=6) of crimp facets on the outer surface of the first section 1904. The crimping action may deform the walls of the first section 1904 of the AL-AL metal gauge transition connector 1902, to mechanically compress against the center conductor 2006, forming a mechanical and electrical connection between the first section 1904 and the center conductor 2006.

Similarly, the proximal end 2018 of the AL conductor 2012, specifically the exposed portion of the center conductor 2016, has been inserted into the second recess 1914 of the AL-AL metal gauge transition connector 1902. After insertion, the proximal end 2018 of the AL-AL metal gauge transition connector 1902 may be fastened in order to form a reliable electrical and mechanical connection with the AL-AL metal gauge transition connector 1902. In some embodiments, the proximal end 2018 of the AL conductor 2012 is crimped by compressing the outer walls of the second section 1906 of the AL-AL metal gauge transition connector 1902 while the center conductor 2016 is positioned within the second recess 1914. A crimping tool (not shown) may comprise multiple tool surfaces positioned at various circumferential locations surrounding the second section 1906. The crimping tool may simultaneously drive the multiple tool surfaces toward the center conductor 2016. For example, the multiple tool surfaces may comprise an integer number (e.g., N=6) of tool surfaces, to form the same integer number (e.g., N=6) of crimp facets on the outer surface of the second section 1906. The crimping action may deform the walls of the second section 1906 of the AL-AL metal gauge transition connector 1902, to mechanically compress against the center conductor 2016, forming a mechanical and electrical connection between the second section 1906 and the center conductor 2016.

Figure 21A:
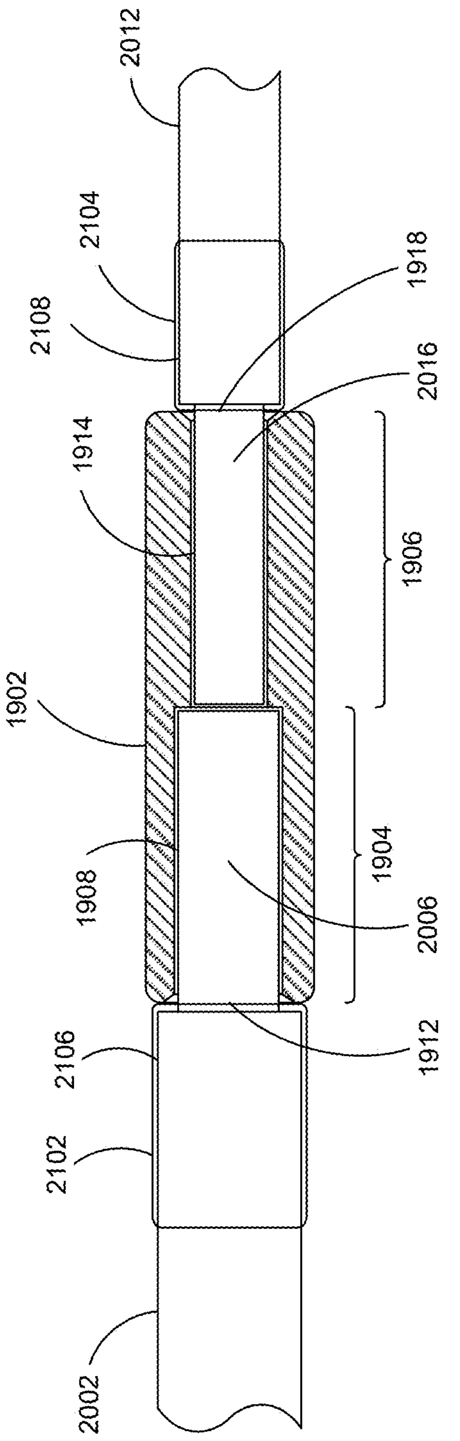
FIG. 21A illustrates the installation of a first temperature-activated sealing member and a second temperature-activated sealing member in an embodiment employing two temperature-activated sealing members.

FIG. 21A illustrates the installation of a first temperature-activated sealing member and a second temperature-activated sealing member in an embodiment employing two temperature-activated sealing members. Once again, an example of a temperature-activated sealing member is a heat shrink tube (HST). Shown is a first HST 2102 and a second HST 2104. The first HST 2102 circumferentially surrounds, and forms a seal 2106 against, a portion of the first AL conductor 2002 outside of the first recess 1908. For example, the seal 2106 may be formed against the outer surface of the insulation layer of the portion of the first AL conductor 2002 at a location that is adjacent to and outside of the first entrance region 1912, as shown in the figure. In some embodiments, the first HST 2102 comprises a temperature-activated outer layer and a temperature-activated adhesive lining an interior surface of the temperature-activated outer layer.

The first HST 2102 may be slipped over the first AL conductor 2002 prior to the insertion of the center conductor 2006 into the first recess 1908 of the AL-AL metal gauge transition connector 1902. Heat may be applied to the first HST 2102 either before or after the center conductor 2006 is inserted and fastened (e.g., crimped) into the first recess 1908 of the AL-AL metal gauge transition connector 1902. The applied heat may cause the adhesive lining the interior surface of the outer layer of the first HST 2102 to soften and begin to melt, to form the seal 2106 against the portion of the first AL conductor 2002. While an adhesive is described here as part of the first HST 2102, an HST that does not comprise any adhesive may be used to form the seal 2106 in other embodiments.

The second HST 2104 circumferentially surrounds, and forms a seal 2108 against, a portion of the second AL conductor 2012 outside of the second recess 1914. For example, the seal 2108 may be formed against the outer surface of the insulation layer of the portion of the second AL conductor 2012 at a location that is adjacent to and outside of the second entrance region 1918, as shown in the figure. In some embodiments, the second HST 2104 comprises a temperature-activated outer layer and a temperature-activated adhesive lining an interior surface of the temperature-activated outer layer.

The second HST 2104 may be slipped over the second AL conductor 2012 prior to the insertion of the center conductor 2016 into the second recess 1914 of the AL-AL metal gauge transition connector 1902. Heat may be applied to the second HST 2104 either before or after the center conductor 2016 is inserted and fastened (e.g., crimped) into the second recess 1914 of the AL-AL metal gauge transition connector 1902. The applied heat may cause the adhesive lining the interior surface of the outer layer of the second HST 2104 to soften and begin to melt, to form the seal 2108 against the portion of the second AL conductor 2012. While an adhesive is described here as part of the second HST 2104, an HST that does not comprise any adhesive may be used to form the seal 2108 in other embodiments.

One benefit of using the first HST 2102 and the second HST 2104 is that they provide an improved sealing and contact surface for additional layer(s) to be installed to encapsulate the structure containing the AL-AL metal gauge transition connector 1902, as discussed in later sections. Another benefit of using the first HST 2102 and the second HST 2104 is that they can provide hermetic seals to block undesirable elements such as moisture, dust, and air from coming into contact with the center conductors 2006 and 2016 or entering the first recess 1908 and second recess 1914 of the AL-AL metal gauge transition connector 1902. In the embodiment shown in FIG. 21, the first HST 2102 and the second HST 2104 do not overlap one another. In other embodiments, the first HST 2102 may at least partially overlap the second HST 2104 in an overlap region, in a manner similar to that of the first HST 1402 and the second HST 1502 shown in FIG. 15.

Figure 21B:
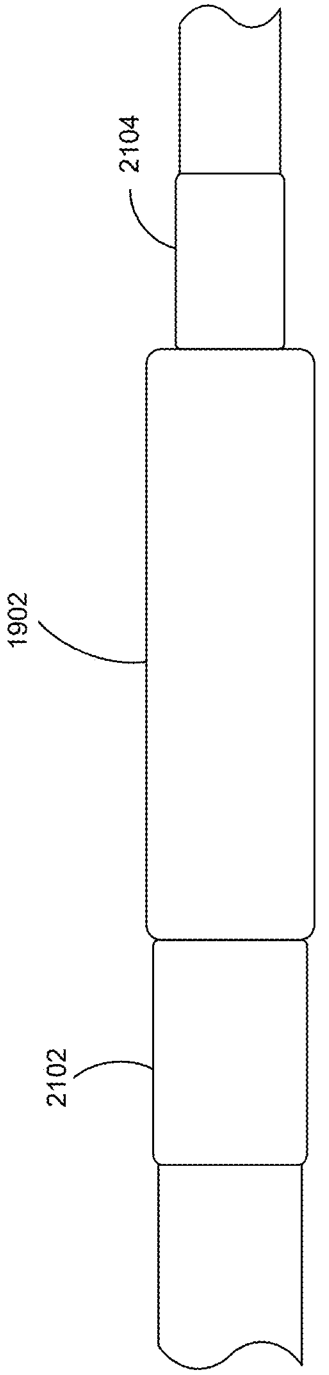
FIG. 21B presents an external view of the first temperature-activated sealing member and the second temperature-activated sealing member after both temperature-activated sealing members are installed, in an embodiment employing two temperature-activated sealing members.

FIG. 21B presents an external view of the first temperature-activated sealing member (e.g., first HST 2102) and the second temperature-activated sealing member (e.g., second HST 2104) after both temperature-activated sealing members are installed, in an embodiment employing two temperature-activated sealing members. As shown in the figure, the first HST 2102 and the second HST 2104 are spaced apart such that the AL-AL metal gauge transition connector 1902 is exposed along substantially its entire length, including the first section 1904 and the second section 806. In contrast to the example shown in FIG. 15B, there is no overlap between the temperature-activated sealing members.

Like the two-segment HST configuration in FIG. 4B, the use of two separate HSTs as sealing members here has the advantage of enabling the physical dimensions and material composition of the HSTs to be tailored to specific constraints, such as fire-retardation rating, electrical resistance, physical dimension shrinkage range, and/or other parameters-constraints which may differ across different parts of the assembled metal material transition unit. As mentioned above, the required diameter of the HST (e.g., prior to and/or subsequent to temperature-activated shrinkage) may be larger at one section (e.g., the first section 1904) than at another section (e.g., the second section 806). Accordingly, the first HST 2102 may have pre-shrinkage and post-shrinkage diameter specifications tailored to the outer diameter of the first section 1904, and the second HST 2104 may have pre-shrinkage and post-shrinkage diameter specifications tailored to the outer diameter of the second section 806. Various performance parameters such as fire-retardation rating, electrical resistance, etc. may be separately met and optimized with respect to each individual section.

Additionally, the configuration shown in FIG. 21B may have technical benefits that differ from those in previous examples such as that of FIG. 15B. Since there is little or no overlap between the HSTs and the AL-AL metal gauge transition connector 1902, the performance parameters (e.g., pre-shrinkage and post-shrinkage diameters) of each HST can be more precisely tuned to the diameter of their respective AL conductor (the first AL conductor 2002 in the case of the first HST 2102, and the second AL conductor 2012 in the case of the second HST 2104). Further, not having to cover the metal gauge transition connector 1902 with an HST reduces the amount of heat-shrink material and the total installation time of the HSTs. Although the savings for a single AL-AL metal gauge transition connector 1902 are relatively small, a solar array wiring system can include many instances of the AL-AL metal gauge transition connector 1902. Thus, the amount of heat-shrink material and installation time saved can add up significantly.

Figure 22A:
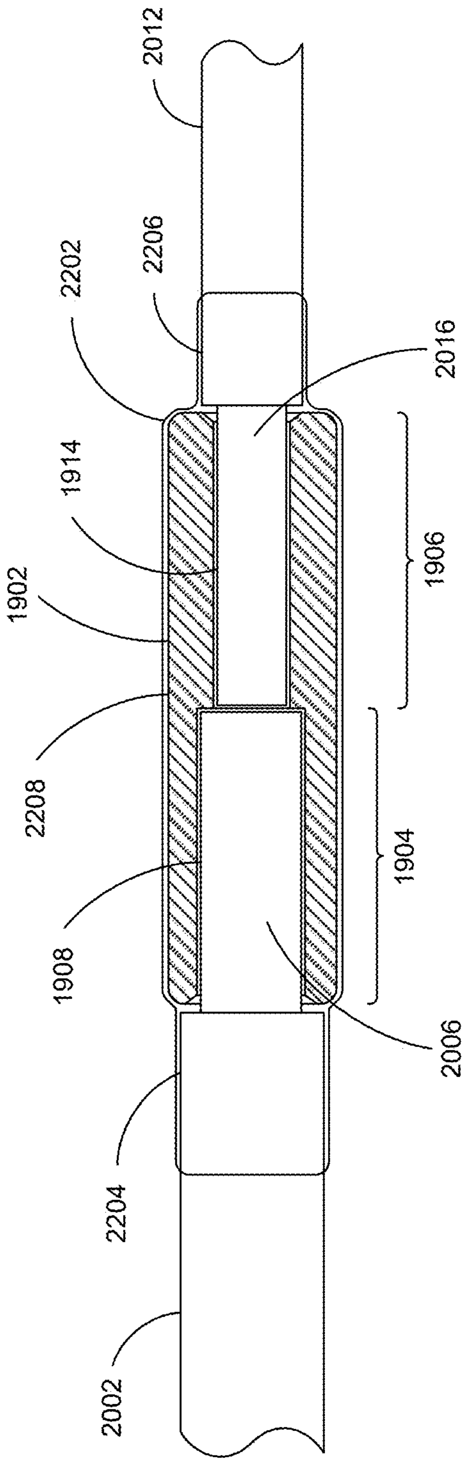
FIG. 22A illustrates the installation of a single temperature-activated sealing member, according to some embodiments of the disclosure.

FIG. 22A illustrates the installation of a single temperature-activated sealing member, according to some embodiments of the disclosure. Shown is an HST 2202 which circumferentially surrounds, and forms a seal 2204 against, a portion of the first AL conductor 2002. The HST 2202 also circumferentially surrounds, and forms a seal 2206 against, a portion of the second AL conductor 2012. In addition, the HST 1602 may also circumferentially surround, and form a seal 2208 against, the first section 1904 and the second section 1906 of the AL-AL metal gauge transition connector 1902. In some embodiments, the HST 2202 comprises a temperature-activated outer layer and a temperature-activated adhesive lining an interior surface of the temperature-activated outer layer.

The HST 2202 may be slipped over the first AL conductor 2002 or the second AL conductor 2012 prior to the insertion of the center conductor 2006 into the first recess 1908 of the AL-AL metal gauge transition connector 1902 and/or the insertion of the center conductor 2016 into the second recess 1914 of the AL-AL metal gauge transition connector 1902. Once the first section 1904 of the AL-AL metal gauge transition connector 1902 has been mechanically fastened to and electrically connected with the proximal end of the first AL conductor 2002 (e.g., crimped), and the second section 1906 of the AL-AL metal gauge transition connector 1902 has been mechanically fastened to and electrically connected with the proximal end of the second AL conductor 2012 (e.g., crimped), the HST 2202 may be moved into position over a portion of the first AL conductor 2002, the first section 1904 of the AL-AL metal gauge transition connector 1902, the second section 1906 of the AL-AL metal gauge transition connector 1902, and a portion of the second AL conductor 2012. Heat may then be applied to the HST 2202.

The applied heat may cause the HST 2202 to shrink and conform to the outer contours of the portion of the first AL conductor 2002, the first section 1904 of the AL-AL metal gauge transition connector 1902, the second section 1906 of the AL-AL metal gauge transition connector 1902, and the portion of the second AL conductor 2012. In addition, the applied heat may cause the adhesive lining the interior surface of the HST 2202 to soften and begin to melt, to form the seal 2204 against the portion of the first AL conductor 2002, the seal 2208 against the first section 1904 and the second section 1906 of the AL-AL metal gauge transition connector 1902, and the seal 2206 against the portion of the second AL conductor 2012. While an adhesive is described here as part of the HST 2202, an HST that does not comprise any adhesive may be used to form seals such as seals 2204, 2206, and 2208 in other embodiments.

One benefit of using the HST 2202 is that it provides an improved sealing and contact surface for additional layer(s) to be installed to encapsulate the structure containing the AL-AL metal gauge transition connector 1902, as discussed in later sections. Another benefit of using the HST 2202 is that it can provide a hermetic seal to block undesirable elements such as moisture, dust, and air from coming into contact with the center conductors 2006 and 2016 or entering the first recess 1908 and second recess 1914 of the AL-AL metal gauge transition connector 1902.

Figure 22B:
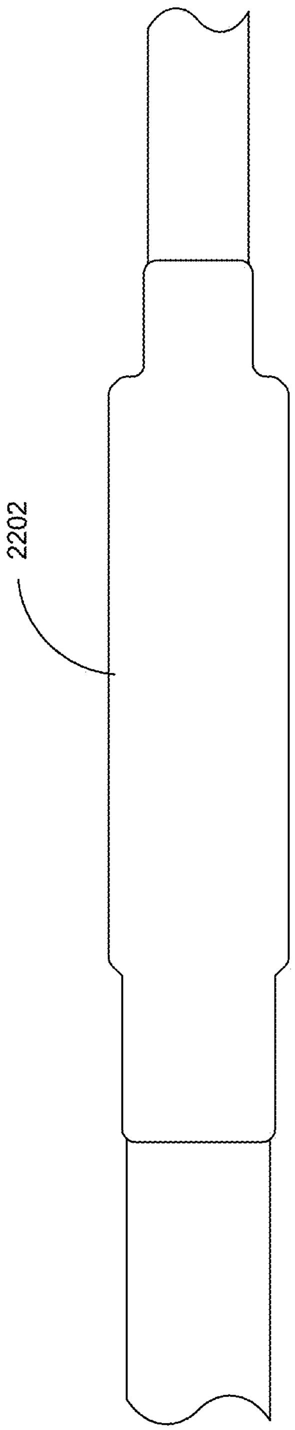
FIG. 22B presents an external view of the single temperature-activated sealing member after it is installed, according to some embodiments of the disclosure.

FIG. 22B presents an external view of the single temperature-activated sealing member (e.g., HST 2202) after it is installed, according to some embodiments of the disclosure. As shown, the HST 2202 forms a continuous layer of heat-shrink material that circumferentially surrounds the portion of the first AL conductor 2002, the AL-AL metal gauge transition connector 1902, and the portion of the second AL conductor 2012. The configuration shown in FIG. 22B is comparable to the single temperature-activated sealing member, i.e., HST 1602, for the AL-CU metal material transition connector shown in FIG. 16B. Once installed, the shape of the HST 2202 conforms to the external contours of the first AL conductor 2002, the AL-AL metal gauge transition connector 1902, and the portion of the second AL conductor 2012.

Figures 23A, 23B, 23C:
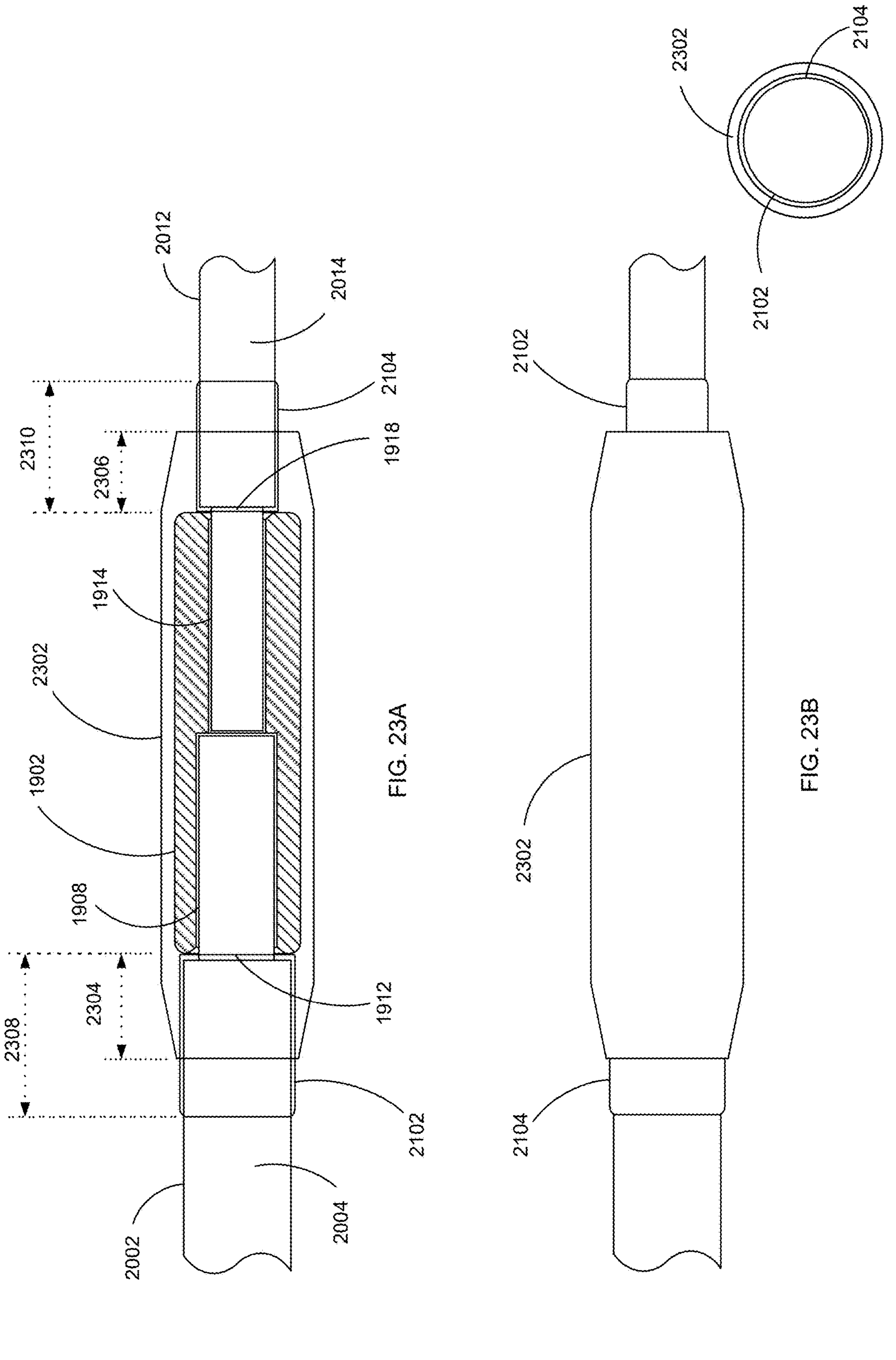
FIG. 23A illustrates the installation of an inner mold that encapsulates the metal gauge transition connector and at least partially encapsulates the one or more temperature-activated sealing members according to various embodiments of the disclosure.
FIG. 23B presents an external view of the inner mold, according to one or more embodiments.
FIG. 23C presents a lateral cross-sectional view of the inner mold that encapsulates the metal gauge transition connector and at least partially encapsulates the one or more temperature-activated sealing members, according to one or more embodiments.

FIG. 23A illustrates the installation of an inner mold 2302 that encapsulates the metal gauge transition connector (e.g., AL-AL metal gauge transition connector 1902), and at least partially encapsulates the one or more temperature-activated sealing members (e.g., first HST 2102 and second HST 2104) according to various embodiments of the disclosure. The construction of the AL-AL metal gauge transition connector 1902 and the temperature-activated sealing members may correspond with the description provided as relating to previous figures. The example of two HSTs 2102 and 2104 is shown in this figure. However, a single HST 2202 may also be encapsulated by an inner mold 2302 in a similar manner.

The inner mold 2302 may provide mechanical rigidity to protect the assembly comprising the metal gauge transition connector 1902, the first AL conductor 2002 inserted into the first recess 1908 of the metal gauge transition connector 1902, the second AL conductor 2012 inserted into the second recess 1914 of the metal gauge transition connector 1902, and the one or more temperature-activated sealing members (e.g., HSTs 2102 and 2104). According to embodiments of the disclosure, the inner mold 2302 may comprise a relatively rigid, lightweight, and electrically non-conductive material capable of withstanding various forces exerted on the assembly. In some embodiments, the inner mold 2302 comprises a polypropylene (PP) material. The solar array wiring system employing the above-described wiring assembly may need to withstand harsh environmental conditions for prolonged time periods. In many deployments, the environment can be associated with strong wind conditions that can subject the wiring system to abrupt movement, including vibration and impact. Furthermore, installation in challenging physical environments such as roughly prepared fields of dirt and rocky surfaces may also subject the wiring system to movement such as vibration and impact. Forces acting on the wiring assembly during installation and/or operation may also include tensile and bending forces that can damage the wire assembly. Adding an inner mold such as that described herein can significantly improve the reliability of the assembly, especially in environments where the assembly is subjected to forces associated with movement of the solar array wiring system.

The inner mold 2302 may also contribute to providing internal strain relief to certain portions of the wiring assembly (in addition to the external strain relief provided by the outer mold, as described in later sections). As discussed, forces acting on the wiring assembly during installation and/or operation may include bending forces that can damage the wire assembly. For example, the first AL conductor 2002 and the second AL conductor 2012 may be prone to breakage near the first entrance region 1912 and the second entrance region 1918 of the metal gauge transition connector 1902 resulting from such bending forces. The inner mold 2302 may extend for a distance, e.g., over a first inner mold extension region 2304 and a second inner mold extension region 2306, beyond the ends of the metal gauge transition connector 1902. The mechanical rigidity of the inner mold 2302 spanning the first inner mold extension region 2304 and the second inner mold extension region 2306 may provide a degree of strain relief for the first AL conductor 2002 and the second AL conductor 2012 against bending forces encountered during installation and operation of the solar array wiring assembly.

In addition, the inner mold 2302 may provide protection against external elements such as moisture, dust, and air that can potentially cause corrosion or other damage to interior components. According to various embodiments, the inner mold 2302 may work in conjunction with the one or more temperature-activated sealing members (e.g., HSTs 2102 and 2104) to form an effective shield against such external elements, particularly in the context of a solar array wiring system. One technical problem addressed by the inner mold 2302 used in conjunction with the one or more temperature-activated sealing members relates to the material properties of the insulator layer of the elongated conductor members (e.g., insulator layer 2004 of the first AL conductor 2002, insulator layer 2014 of the second AL conductor 2012, etc.). Often, such insulator layers are composed of rugged and relatively rigid polymer materials with high resistance to wear and ultraviolet (UV) exposure, to ensure longevity in potentially harsh external environments associated with deployment of solar array wiring systems. The material used for the inner mold 2302, such as polypropylene (PP), may also be relatively rigid. Direct contact of these two relatively rigid materials can result in a seal having reduced performance, as both rigid materials may have limited ability to conform to the shape of a surface.

Thus, according to certain embodiments of the disclosure, the one or more temperature-activated sealing members (e.g., HSTs 2102 and 2104) may serve as an intervening layer. Here, the one or more temperature-activated sealing members (e.g., HSTs 2102 and 2104) may form a primary seal against the insulator layer (e.g., insulator layer 2004 and insulator layer 2014) of the conductor, while also providing a more pliable surface against which the inner mold 2302 can form a secondary seal. For instance, the primary seal may be formed in a first HST extension region 2308 and a second HST extension region 2310, against the insulator layer 2004 of the first AL conductor 2002 and the insulator layer 2014 of the second AL conductor 2012, respectively. The secondary seal may be formed in the first inner mold extension region 2304 and the second inner mold extension region 2306, against the HSTs 2102 and 2104. As shown, the first HST extension region 2308 may extend further than the first inner mold extension region 2304 beyond the end of the metal gauge transition connector 1902. Similarly, the second HST extension region 2310 may extend further than the second inner mold extension region 2306 beyond the end of the metal gauge transition connector 1902. The resulting overall seal, comprising the primary seal and the secondary seal, may have significantly better performance than, e.g., directly sealing the inner mold 2302 against the insulator layer of the conductor(s). The combination of the inner mold 2302, the one or more temperature-activated sealing members, and the insulator layer of the conductor(s) thus provides effective protection against external elements, particularly in harsh environmental conditions associated with solar array deployments.

FIG. 23B presents an external view of the inner mold 2302, according to one or more embodiments. In some embodiments, such as shown in FIG. 23B, the inner mold 2302 may have a smooth exterior surface that does not include individual patterned features such as divots. Here, the frictional properties and/or general exterior contours of the inner mold 2302 (when keyed to the general interior contours of the outer mold) are sufficient to reduce relative movement between the inner mold 2302 and the outer mold. In other embodiments, the inner mold 2302 may comprise individual, patterned exterior features such as divots (not shown) that match, or key to, portions of the interior contours of the outer mold. For example, divots such as those described with respect to FIG. 17B may be used. FIG. 23C presents a lateral cross-sectional view of the inner mold 2302 that encapsulates the metal gauge transition connector 1902 and at least partially encapsulates the one or more temperature-activated sealing members, such as HSTs 2102 and 2104, according to one or more embodiments.

Figures 24A, 24B, 24C:
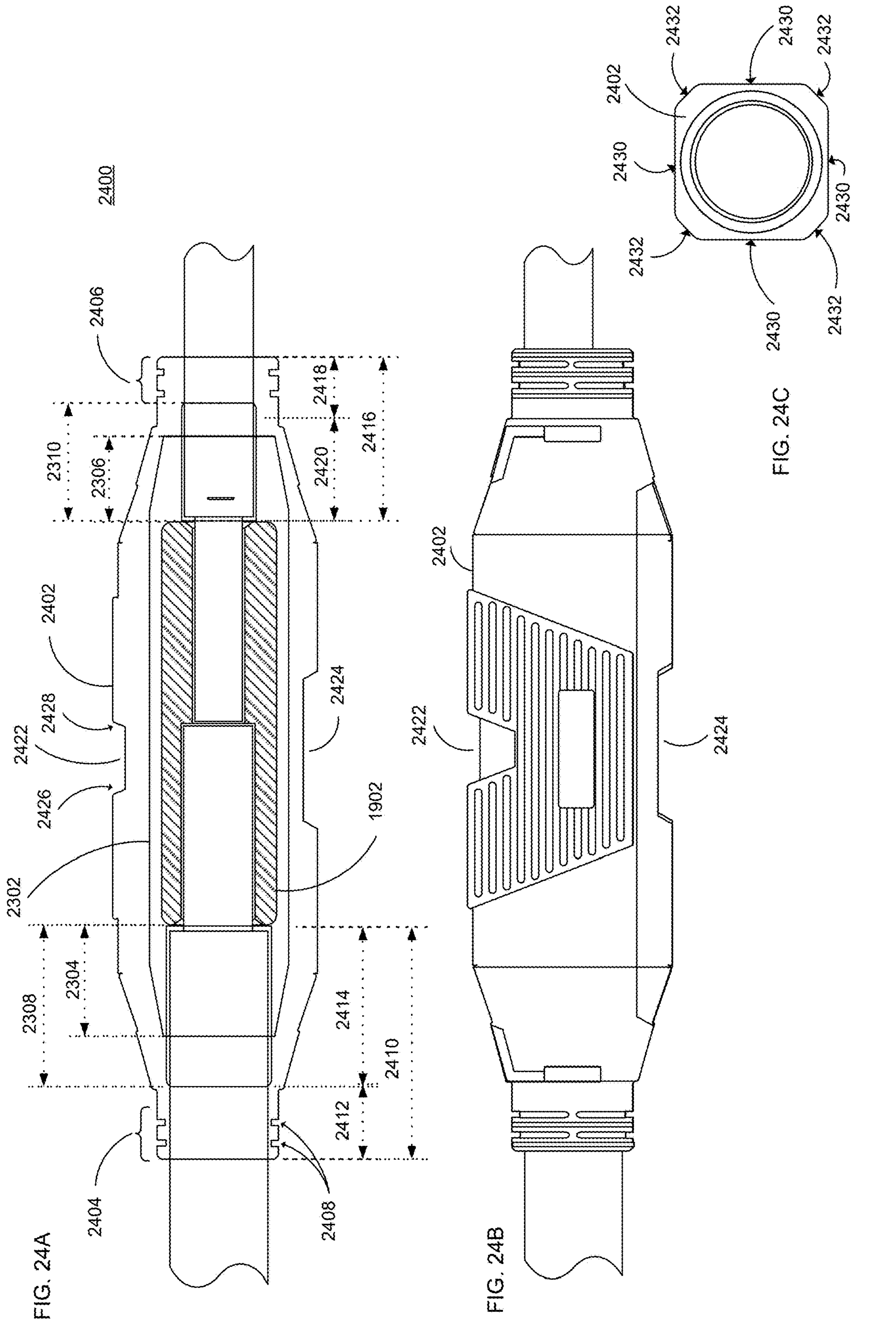
FIG. 24A presents an assembled metal gauge transition connector after installation of an outer mold, according to one or more embodiments of the disclosure.
FIG. 24B presents an external view of the assembled metal gauge transition connector, according to one or more embodiments.
FIG. 24C presents a lateral cross-sectional view of the assembled metal material transition connector after installation of an outer mold, according to one or more embodiments of the disclosure.

FIG. 24A presents an assembled metal gauge transition connector 2400 after installation of an outer mold 2402, according to one or more embodiments of the disclosure. The outer mold 2402 may comprise a rugged and pliable material that can withstand rough handling, abrasion, and prolonged exposure to UV rays. In some embodiments, the outer mold 2402 comprises a thermoplastic vulcanizate (TVP) material. The outer mold 2402 may provide external strain relief, as mentioned previously. As shown, the outer mold 2402 may include a first strain relief (SR) segment 2404 and a second strain relief segment 2406. Each of the first strain relief segment 2404 and the second strain relief segment 2406 comprises one or more strain relief concavities 2408. The strain relief concavities 2408 increase the flexibility of the outer mold 2402 at the respective strain relief segments, such that the strain sustained as result of a bending force applied to each elongated conductor (e.g., the AL conductor 2002 or the AL conductor 2012) is spread out over a greater length of the conductor. Thus, the first strain relief segment 2404 is configured to provide strain relief and counter against a force, such as a bending force, applied to the AL conductor 2002. The second strain relief segment 2406 is configured to provide strain relief and counter against a force, such as a bending force, applied to the AL conductor 2012.

According to some embodiments, the design of the outer mold 2402, including the placement of the first strain relief segment 2404 and the second strain relief segment 2406, may work in conjunction with the inner mold 2302 to further enhance the overall strain relief performance of the assembled metal gauge transition connector 2400. As shown, the outer mold 2402 may extend, in a first outer mold extension region 2410, beyond one end of the metal gauge transition connector 1902. The first outer mold extension region 2410 may comprise a first SR region 2412 and a first non-SR region 2414. The first non-SR region 2414 may extend beyond the end of the inner mold 2302. The outer mold 2402 may be more flexible in the first SR region 2412, where the first strain relief segment 2404 is located. The outer mold 2402 may be less flexible in the first non-SR region 2414, where the first strain relief segment 2404 is not located, but the outer mold 2402 may nevertheless provide some flexibility due to the pliability of the outer mold material (e.g., TVP). This reduced flexibility is especially exhibited where the first non-SR region 2414 extends beyond the end of the inner mold 2302 (e.g., beyond the first inner mold extension region 2304).

Similarly, the outer mold 2402 may extend, in a second outer mold extension region 2416, beyond the other end of the metal gauge transition connector 1902. The second outer mold extension region 2416 may comprise a second SR region 2418 and a second non-SR region 2420. The second non-SR region 2420 may extend beyond the other end of the inner mold 2302. The outer mold 2402 may be more flexible in the second SR region 2418, where the second relief segment 2406 is located (e.g., equally as flexible as in the first SR region 2412). The outer mold 2402 may be less flexible in the second non-SR region 2420, where the second relief segment 2406 is not located, but the outer mold 2402 may nevertheless provide some flexibility due to the pliability of the outer mold material (e.g., TVP), especially where the second non-SR region 2420 extends beyond the end of the inner mold 2302 (e.g., beyond the second inner mold extension region 2306).

Overall, the assembled metal gauge transition connector 2400 may have the least flexibility over the region occupied by the inner mold 2302 (e.g. in the first inner mold extension region 2304 and/or the second inner mold extension region 2306), where rigidity of the inner mold 2302, together with the additional structural support provided by the outer mold 2402, provide the most rigidity. Thus, the combination and relative placement of the first strain relief segment 2404 and the inner mold 2302 can provide graduated levels of structural support to enhance the ability of the assembled metal gauge transition connector 2400 to provide strain relief to the first AL conductor 2002. Likewise, the combination and relative placement of the second relief segment 2406 and the inner mold 2302 can provide graduated levels of structural support to enhance the ability of the assembled metal gauge transition connector 2400 to provide strain relief to the second AL conductor 2012.

FIG. 24B presents an external view of the assembled metal gauge transition connector 2400 after installation of the outer mold 2402, according to one or more embodiments. As shown in the figure, the outer mold 2402 may comprise the first strain relief segment 2404 and the second strain relief segment 2406. In addition, the outer mold 2402 may include one or more exterior troughs, such as a first exterior trough 2422 and a second exterior trough 2424, configured to receive an anchoring device (not shown) for the assembled metal gauge transition connector 2400. Some solar array deployment environments may be prone to extreme weather conditions, including those associated with high winds. Exterior troughs formed in the material of the outer mold 2402 provide a location for installing one or more anchoring devices used to secure the assembled metal gauge transition connector 2400 and attached conductors, e.g., against a rigid support structure, other cables, etc., in order to secure the wiring assembly against excessive movement. Examples of such an anchoring device may include a cable tie, a wire tie, a cable belt, etc.

Each exterior trough may be flanked by features that keep the anchoring device in place. For example, the first exterior trough 2422 may be positioned between a first raised wall 2426 and a second raised wall 2428, which can keep a cinched cable tie or other anchoring device from slipping off of the assembled metal gauge transition connector 2400. As shown, the first exterior trough 2422 is positioned at or near a center position (e.g., midpoint) along the length of the assembled metal gauge transition connector 2400. Other exterior trough(s), such as the second exterior trough 2424, may also be positioned at or near the center location along the length of the assembled metal gauge transition connector 2400, but at different facets. For example, FIG. 24C presents a lateral cross-sectional view of the assembled metal material transition connector after installation of an outer mold, according to one or more embodiments of the disclosure. Some exterior troughs, such as the second exterior trough 2424, may also be position at or near the center location along the length of the assembled metal gauge transition connector 2400, but at different facets (e.g., facets 2430 and 2432, shown in FIG. 24C) or different angles around the circumference of the assembled metal gauge transition connector 2400. Each trough thus reduces the exterior circumference of the assembled metal gauge transition connector 2400. Individually and collectively, the troughs contribute to the formation of a centrally-positioned, reduced-circumference location at which an anchoring device may be installed.

Figure 25:
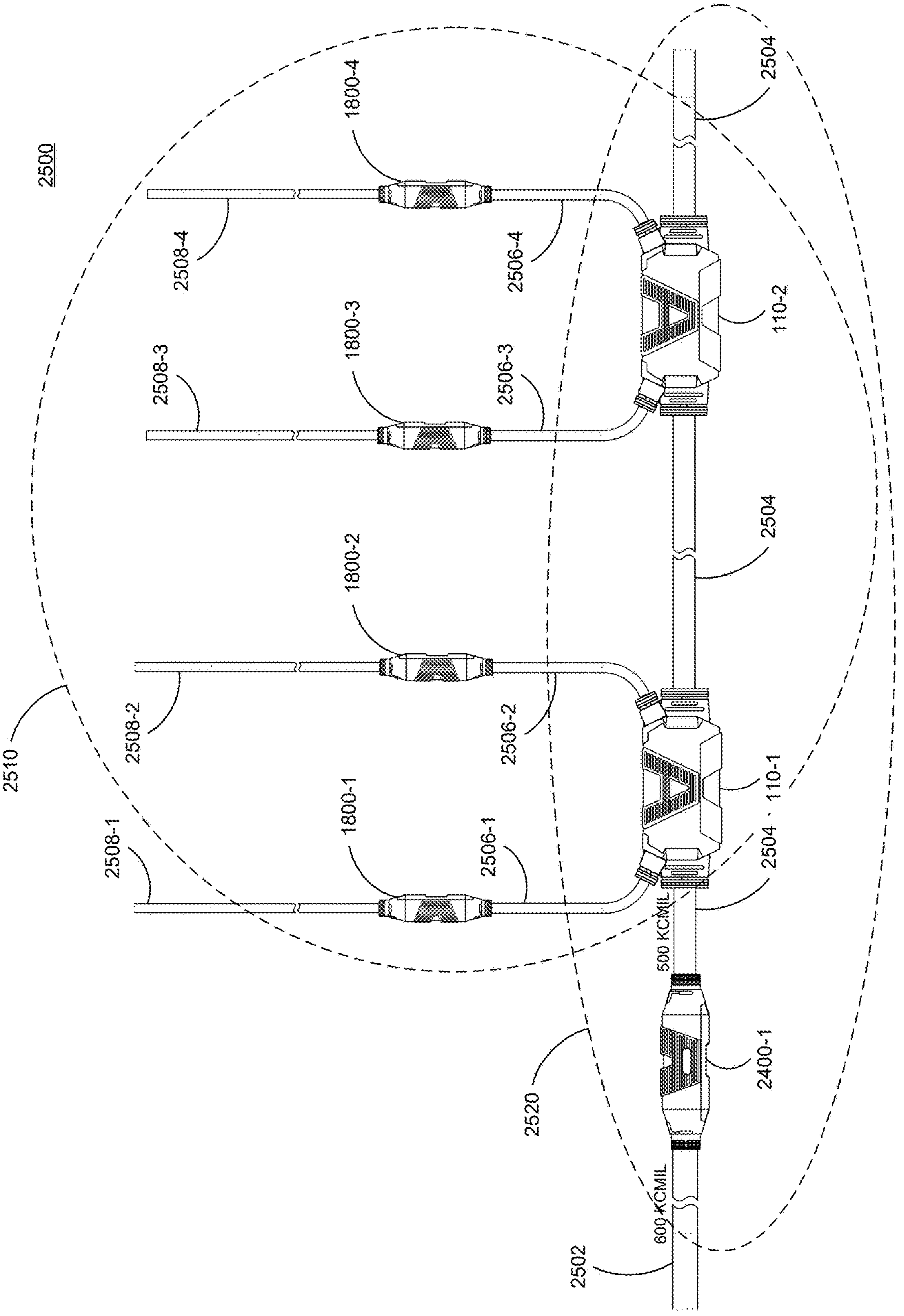
FIG. 25 illustrates one example of a wiring strategy utilizing a metal gauge transition connector, two trunk bus connectors, and four metal material transition connectors, according to one or more embodiments.

FIG. 25 illustrates a wiring arrangement 2500 utilizing a metal gauge transition connector, two trunk bus connectors, and four metal material transition connectors, according to one or more embodiments. The number of each component described is for illustration purposes only, and the system can be expanded to a greater number of components and connections. As shown, the wiring arrangement 2500 is configured to electrically connect multiple strings of PV panels and comprises a first aluminum (AL) trunk cable 2502 of a first size (e.g., 600 kcmil), a metal gauge transition connector 2400-1, a second AL trunk cable 2504 of a second size (e.g., 500 kcmil) that is smaller than the first size, an AL trunk bus connector 110-1, a second AL trunk bus connector 110-2, a plurality of AL branch cables 2506-1 through 2506-4, a plurality of metal material transition connectors 1800-1 through 1800-4, and a plurality of copper (CU) extension branch cables 2508-1 through 2508-4.

Wiring arrangement 2500 provides cost-efficient wiring by costly runs of copper PV wire and replacing copper wires with aluminum wires capable of handling comparable current at strategic locations, as well as replacing sections of larger size aluminum trunk cables with smaller size aluminum trunk cable where appropriate, further reducing cost. For example, the metal gauge transition connector 2400-1, which may comprise an aluminum connector body, may reduce the size of the AL trunk line by transitioning the 600 kcmil AL trunk cable 2502 to the 500 kcmil AL trunk cable 2504. A larger size trunk cable such as AL trunk cable 2502 may be utilized to carry electrical current over a longer span/distance. However, a smaller size trunk cable may be utilized closer to the PV panels and branch cables. The metal gauge transition connector 2400-1 thus advantageously transitions the larger 600 kcmil AL trunk cable 2502 to the smaller 500 kcmil AL trunk cable 2504, which then couples with the trunk bus connectors 110-1 and 110-2, various branch cables, and the PV panels. The trunk bus connectors 110-1 and 110-2 couple the AL branch cables 2506-1 through 2506-4 to the AL trunk cable 2504. The use of trunk bus connectors to facilitate the connection of branch cables to trunk line is discussed in previous sections.

The metal material transition connectors 1800-1 through 1800-4 change the wiring material from copper to aluminum. The CU extension branch cables 2508-1 through 2508-4 are connected to one end of the respective metal material transition connectors 1800-1 through 1800-4. The AL branch cables 2506-1 through 2506-4 are connected to the other end of the respective metal material transition connectors 1800-1 through 1800-4. In this manner, runs of copper PV wires from the PV panels—e.g., the CU extension branch cables 2508-1 through 2508-4—can be converted to aluminum wires of appropriate size to carrying comparable current. Aluminum wiring is associated with lower cost, when compared to copper wiring of similar voltage/current capacity. By utilizing the metal material transition connectors 1800-1 through 1800-4, runs of copper branch cables may be replaced with runs of aluminum branch cables, and further cost savings can be thereby achieved.

The metal material transition connectors 1800-1 through 1800-4 may transition copper wire of a specified size or size range to aluminum cable of a different specified size or size range. Different sizes and size ranges of CU and AL cables may be used according to various embodiments of the disclosure. Some simple, non-exhaustive examples of CU and AL cable sizes accommodated by one or more embodiments of the metal material transition connectors 1800-1 through 1800-4 are shown below:

| | Embodiment A | Embodiment B |
|---|---|---|
| CU | #8 or #10 size conductor | #6 size conductor |
| AL | #6 size conductor | #2 or #4 size conductor |

These gauge sizes are presented as examples, and different sizes may be implemented in other embodiments. For example, the CU cable size may range from #12 to #6, and the AL cable size may range from #6 to #2. Here, cable sizes are presented as gauge numbers ("#") which correspond to AWG (American Wire Gauge) units.

Different sections of the wiring arrangement 2500 may be selectively adopted in a wiring plan to realize particular benefits described above. In other words, only some of the parts of the wiring arrangement 2500 may be adopted in certain implementations. For instance, a section 2510 of the wiring arrangement 2500 may be adopted.

As shown, the section 2510 comprises the 500 kcmil AL trunk cable 2504, the AL trunk bus connectors 110-1 and 110-2, the AL branch cables 2506-1 through 2506-4, the metal material transition connectors 1800-1 through 1800-4, and the CU extension branch cables 2508-1 through 2508-4. The section 2510 is an example of an apparatus for forming electrical connections comprising a portion of a trunk cable of a first size (e.g., 500 kcmil), one or more branch cables of a second size (e.g., #2 or #4 AL conductor) smaller than the first size, one or more extension branch cables of a third size (e.g., #6 CU conductor) smaller than the second size, a trunk bus connector (e.g., AL trunk bus connectors 110-1 and 110-2) comprising a trunk pathway and at least one region of electrical contact. The apparatus further comprises one or more metal material transition connectors (e.g., metal gauge transition connector 2400-1), each metal material transition connector of the one or more metal material transition connectors comprising:

a first metal portion comprising a first metal material and including a first recess configured to receive a proximal end of a first elongated conductor member comprising the first metal material;

a second metal portion welded to the first metal portion at a welded region, the second metal portion comprising a second metal material different from the first metal material and including a second recess configured to receive a proximal end of a second elongated conductor member comprising the second metal material, wherein the first metal portion of the metal material transition connector is mechanically fastened to and electrically connected with the proximal end of the first elongated conductor member while the proximal end of the first elongated conductor member is positioned in the first recess, and wherein the second metal portion of the metal material transition connector is mechanically fasten to and electrically connected with the proximal end of the second elongated conductor member while the proximal end of the second elongated conductor member is positioned in the second recess;

one or more temperature-activated sealing members, wherein the one or more temperature-activated sealing members (a) circumferentially surround, and form a first seal against, at least a portion of the first elongated conductor member outside of the first recess while the proximal end of the first elongated conductor member is positioned in the first recess and is fastened to and electrically connected with the first metal portion of the metal material transition connector, and (b) circumferentially surround, and form a second seal against, at least a portion of the second elongated conductor member outside of the second recess while the proximal end of the second elongated conductor member is positioned in the second recess and is mechanically fastened to and electrically connected with the second metal portion of the metal material transition connector;

an inner mold, wherein the inner mold encapsulates the metal material transition connector and at least partially encapsulates the one or more temperature-activated sealing members while the one or more temperature-activated sealing members circumferentially surround, and form the first seal against, the portion of the first elongated conductor member and circumferentially surround, and form the second seal against, the portion of the second elongated conductor member; and an outer mold, wherein the outer mold encapsulates the inner mold while the inner mold encapsulates the metal material transition connector and at least partially encapsulates the one or more temperature-activated sealing members.

Here, the portion of the trunk cable comprises the first metal material (e.g., AL). Each branch cable of the one or more branch cables comprises the first metal material and is, as the first elongated conductor member, coupled to the first metal portion of a corresponding metal material transition connector of the one or more metal material transition connectors. Each extension branch cable of the one or more extension branch cables comprises the second metal material (e.g., CU) and is, as the second elongated conductor member, coupled to the second metal portion of a corresponding metal material transition connector of the one or more metal material transition connectors A different section 2520 of the wiring arrangement 2500 may be adopted without adopting the other components of wiring arrangement shown in FIG. 25. As shown, the section 2520 comprises the 600 kcmil AL trunk cable 2502, the metal gauge transition connector 2400-1, the 500 kcmil AL trunk cable 2504, the AL trunk bus connectors 110-1 and 110-2, and the AL branch cables 2506-1 through 2506-4.

The section 2520 is an example of an apparatus for forming electrical connection comprising a portion of a first trunk cable of a first size (e.g., 600 kcmil), a portion of a second trunk cable of a second size (e.g., 500 kcmil) smaller than the first size, one or more branch cables of a third size (e.g., #2 or #4 AL conductor)) smaller than the second size. The apparatus further comprises a metal gauge transition connector (e.g., metal gauge transition connector 2400-1) comprising:

a first metal material and having a first section and a second section, the first section including a first recess having a first internal diameter and configured to receive a proximal end of a first elongated conductor member comprising the first metal material, the second section including a second recess having a second internal diameter different from the first internal diameter and configured to receive a proximal end of a second elongated conductor member comprising the first metal material, wherein the solar array wiring system comprises the first elongated conductor member and the second elongated conductor member, wherein the first section of the metal gauge transition connector is mechanically fastened to and electrically connected with the proximal end of the first elongated conductor member while the proximal end of the first elongated conductor member is positioned in the first recess, and wherein the second section of the metal gauge transition connector is mechanically fasten to and electrically connected with the proximal end of the second elongated conductor member while the proximal end of the second elongated conductor member is positioned in the second recess;

one or more temperature-activated sealing members, wherein the one or more temperature-activated sealing members (a) circumferentially surround, and form a first seal against, at least a portion of the first elongated conductor member outside of the first recess while the proximal end of the first elongated conductor member is positioned in the first recess and is fastened to and electrically connected with the first section of the metal gauge transition connector, and (b) circumferentially surround, and form a second seal against, at least a portion of the second elongated conductor member outside of the second recess while the proximal end of the second elongated conductor member is positioned in the second recess and is mechanically fastened to and electrically connected with the second section of the metal gauge transition connector;

an inner mold, wherein the inner mold encapsulates the metal gauge transition connector and at least partially encapsulates the one or more temperature-activated sealing members while the one or more temperature-activated sealing members circumferentially surround, and form the first seal against, the portion of the first elongated conductor member and circumferentially surround, and form the second seal against, the portion of the second elongated conductor member; and an outer mold, wherein the outer mold encapsulates the inner mold while the inner mold encapsulates the metal gauge transition connector and at least partially encapsulates the one or more temperature-activated sealing members.

Here, the apparatus further comprises a trunk bus connector (e.g., AL trunk bus connectors 110-1 or 110-2) comprising a trunk pathway and at least one region of electrical contact, wherein the portion of the second trunk cable passes through the trunk pathway, the one or more branch cables are connected with the at least one region of electrical contact, and the trunk bus connector secures and provides electrical connection between the portion of the second trunk bus cable and the one or more branch cables. The portion of the first trunk cable comprises the first metal material (e.g., AL) and is, as the first elongated conductor member, coupled to the first section of the metal gauge transition connector. The portion of the second trunk cable comprises the first metal material and is, as the second elongated conductor member, coupled to the second section of the metal gauge transition connector. Each branch cable of the one or more branch cables comprises the first metal material and is electrically coupled with the portion of the second trunk cable via the trunk bus connector.

Figure 26:
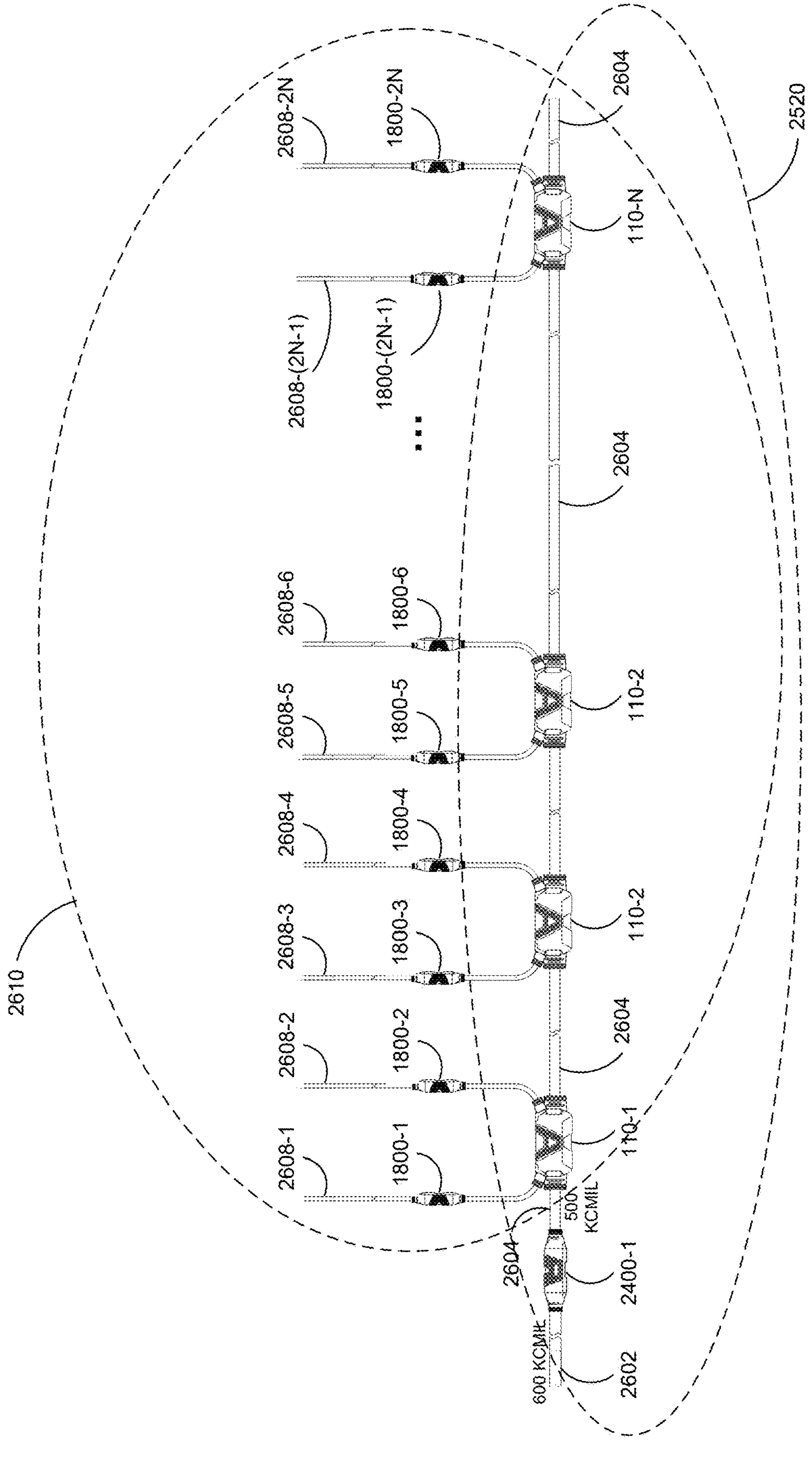
FIG. 26 illustrates another example of a wiring strategy utilizing a metal gauge transition connector, N trunk bus connectors, and N×M metal material transition connectors, according to one or more embodiments.

FIG. 26 illustrates a wiring arrangement 2600 utilizing a metal gauge transition connector, N trunk bus connectors, and N×M metal material transition connectors, according to one or more embodiments. The arrangement is similar to that shown in FIG. 25, but with the number of trunk bus connectors and corresponding branch cables expanded to greater quantities. In the particular embodiment shown, M=2. However, N and M can each be any positive integer and are not limited to the particular values shown in this embodiment. As shown, the wiring arrangement 2600 is configured to electrically connect multiple strings of PV panels and comprises a first aluminum (AL) trunk cable 2602 of a first size (e.g., 600 kcmil), a metal gauge transition connector 2400-1, a second AL trunk cable 2604 of a second size (e.g., 500 kcmil) that is smaller than the first size, a plurality of AL trunk bus connectors 110-1 through 110-N, a plurality AL branch cables, a plurality of metal material transition connectors 1800-1 through 1800-2N, and a plurality of copper (CU) extension branch cables 2608-1 through 2508-2N.

Wiring arrangement 2500 provides cost-efficient wiring by costly runs of copper PV wire and replacing copper wires with aluminum wires capable of handling comparable current at strategic locations, as well as replacing sections of larger size aluminum trunk cables with smaller size aluminum trunk cable where appropriate, further reducing cost, in manner similar to that described with respect to FIG. 25.

Different sections of the wiring arrangement 2600 may be selectively adopted in a wiring plan to realize particular benefits described above. In other words, only some of the parts of the wiring arrangement 2600 may be adopted in certain implementations. For instance, a section 2610 of the wiring arrangement 2600 may be adopted. As another example, a different section 2620 of the wiring arrangement 2600 may be adopted without adopting the other components of wiring arrangement shown in FIG. 26. Adoption of different sections of the wiring arrangement may be realized in a similar manner and using similar components as that described in the context of FIG. 25.

Figure 27:
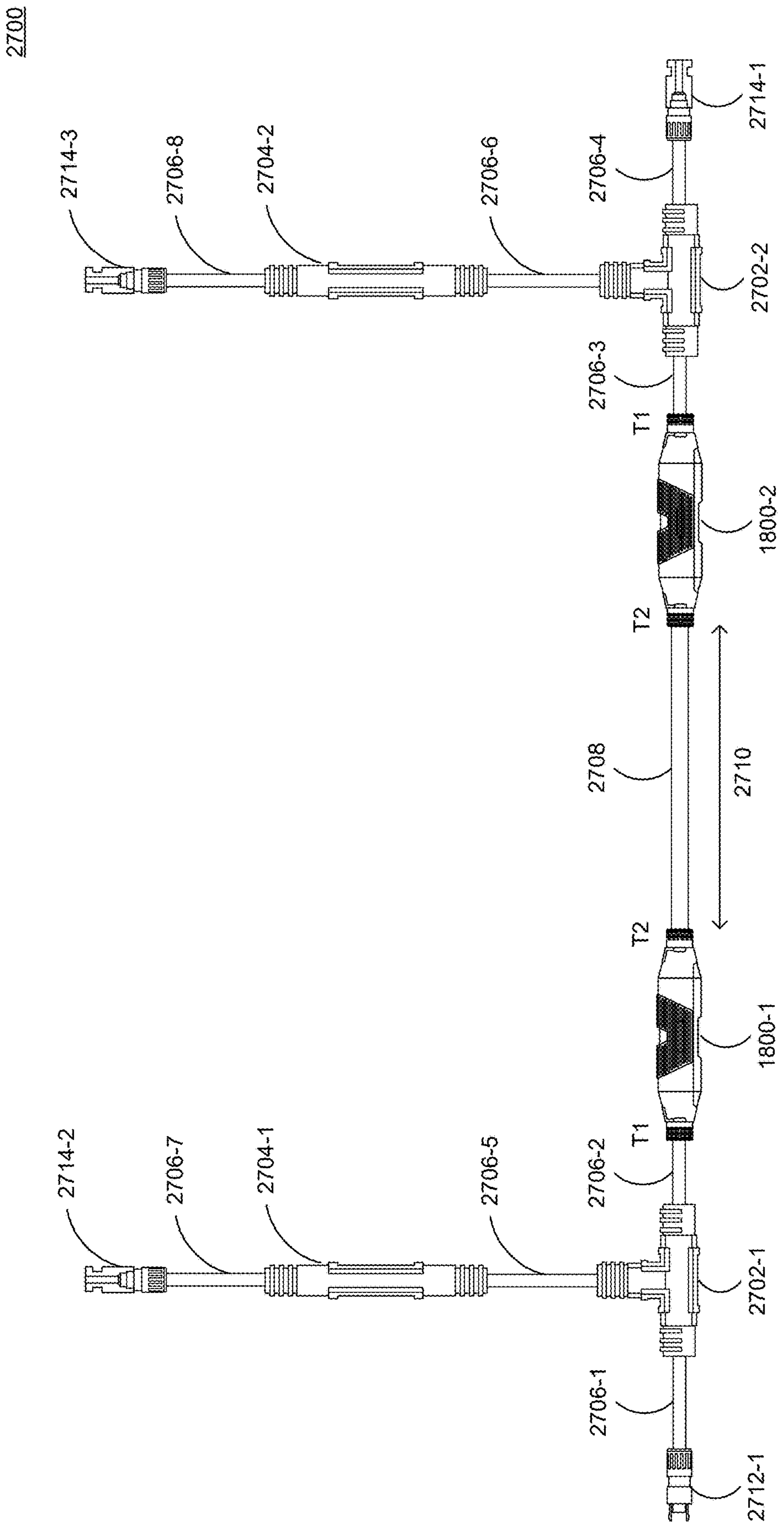
FIG. 27 illustrates a wiring strategy utilizing two metal gauge transition connectors, according to one or more embodiments.

FIG. 27 illustrates a wiring arrangement 2700 utilizing two metal material transition connectors, according to one or more embodiments. The wiring arrangement 2700, which may also be referred to as a metal transition wire extension harness, provides an ability to form a connection over a span of distance using an alternative metal material by transitioning from a first metal material to a second material, traversing the span utilizing wiring comprising the second metal material, and transiting back to the first material at the other end of the span. The metal transition wire extension harness may also comprise additional components to facilitate efficient installation in a photovoltaic wiring system. In the embodiment shown in FIG. 27, the wiring arrangement 27 comprises a first metal material transition connector 1800-1, a second metal material transition connector 1800-2, a first junction connector 2702-1, a second junction connector 2702-2, a first in-line fuse 2704-1, and a second in-line fuse 2704-2.

The first junction connector 2702-1 and the second junction connector 2702-2 support branch circuits that may be, for example, connected to different strings of photovoltaic panels separated by a span of distance 2710. A first cable 2706-1 of a first size and comprising a first metal material (e.g., #6 size CU conductor) is connected to a first terminal of the first junction connector 2702-1. A second cable 2706-2 of the first size and comprising the first metal material is connected to a second terminal of the first junction connector 2702-1 and a first terminal of the first metal material transition connector 1800-1. A cable 2708 of a second size and comprising a second metal material (e.g., #2 or #4 AL conductor) is connected to a second terminal of the first metal material transition connector 1800-1 and a second terminal of the second metal material transition connector 1800-2.

The cable 2708 spans the distance 2710, which may be significant if branches of wiring for different strings of photovoltaic panels are located relatively far apart. The wiring arrangement 2700 may be manufactured with various specified lengths to cover the distance 2710. The cable 2708, comprising a conductor member made of the second metal material, may be associated with significantly lower cost than a cable of the same length comprising a conductor member made of the first metal material. To achieve similar voltage and/or current performance, the cable 2708 may be of a larger size (i.e., diameter) than that of the cable comprising the first metal material. Even employing a larger size conductor, cost savings may be achieved by utilizing the wiring arrangement 2700 to replace a section of cable of the first material with a section of cable made of the second metal material over the distance 2710. In at least some embodiments of the disclosure, the first metal material may be a copper (CU) metal material, and the second metal material may be an aluminum (AL) metal material.

A third cable 2706-3 of the first size and comprising the first metal material is connected to a first terminal of the second metal material transition connector 1800-2 and a first terminal of a first terminal of the second junction connector 2702-2. A fourth cable 2706-4 of the first size and comprising the first metal material is connected to a second terminal of the second junction connector 2702-2. A fifth cable 2706-5 of the first size and comprising the first metal material is connected to the third terminal of the first junction connector 2702-1. A sixth cable 2706-6 of the first size and comprising the first metal material is connected to the third terminal of the second junction connector 2702-2.

In the embodiment presented in FIG. 27, each of the first junction connector 2702-1 and the second junction connector 2702-2 is presented as a "T" junction connector having a first terminal, a second terminal, and a third terminal. In other embodiments, each of the first junction connector 2702-1 and the second junction connector 2702-2 may be a different style of junction connector, such as a "Y" junction connector having three terminals, a "+" junction connector having four terminals, etc. Such different configurations for the junction connector facilitates different numbers of branch circuits and different approach angles of the cables connecting to the junction connector.

The wiring arrangement 2700 may further incorporate a first in-line fuse 2704-1 and a second in-line fuse 2704-2. A fifth cable 2706-5 of the first size and comprising the first metal material is further connected to a first terminal of the first in-line fuse 2704-1. The sixth cable 2706-6 of the first size and comprising the first metal material is further connected to the first terminal of the second in-line fuse 2704-2. A seventh cable 2706-7 of the first size and comprising the first metal material is connected to a second terminal of the first in-line fuse 2704-1. An eighth cable 2706-8 of the first size and comprising the first metal material is connected to a second terminal of the second in-line fuse 2704-2. The first in-line fuse 2704-1 and the second in-line fuse 2704-2 provide protection against possible damage associated with inadvertently high current and may be rated for different levels of electrical current, such as a current in the range of 1 amp (A) to 80 A.

The wiring arrangement 2700 may further incorporate additional wiring connectors to support easy installation and connection to other parts of a photovoltaic wiring system. For example, the wiring arrangement 2700 may include a first male wiring connector 2712-1 connected to the first cable 2706-1 of the first size and comprising the first metal material. The wiring arrangement 2700 may also include a first female wiring connector 2714-1 connected to the fourth cable 2706-4 of the first size and comprising the first metal material. In addition, the wiring arrangement 2700 may also include a second female wiring connector 2714-2 connected to the seventh cable 2706-7 of the first size and comprising the first metal material, as well as a third female wiring connector 2714-3 connected to the eight cable 2706-8 of the first size and comprising the first metal material. The wiring connectors 2712-1, 2714-1, 2714-2, and 2714-3 facilitate connection of the wiring arrangement 2700 to other parts of the overall PV wiring system. In other arrangements, the choice of male vs. female wiring connectors may be changed for each wiring connector to achieve compatibility with respective mating connectors.

Figure 28:
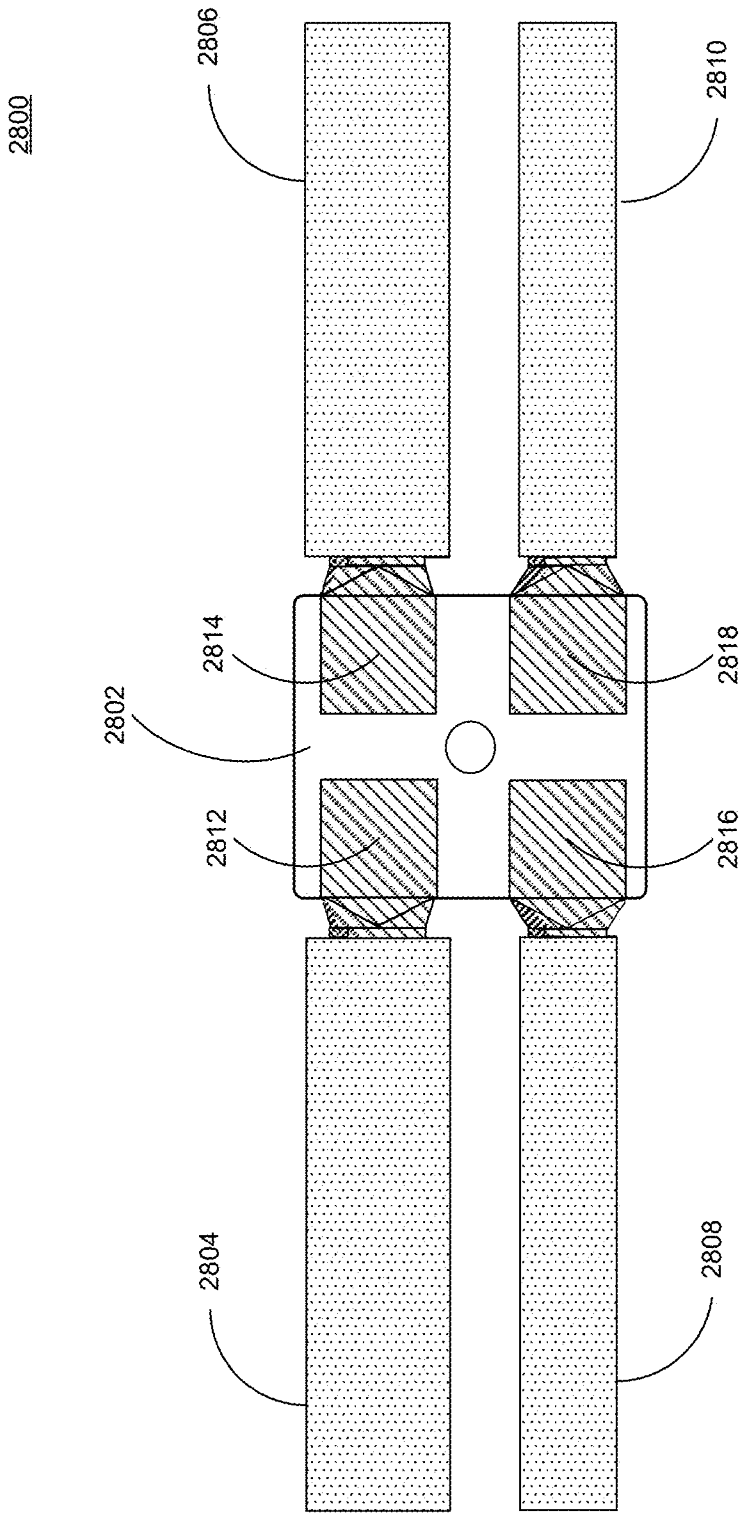
FIG. 28 is a top-down view of an internal conductive assembly of a material/gauge transition connector prior to molding, according to one embodiment.

FIG. 28 illustrates a top-down view of an internal conductive assembly 2800 of a material/gauge transition connector prior to a molding process, according to one embodiment. This view shows a central metal transition conductor 2802, which serves as a primary electrical junction for creating a reliable, multi-conductor connection point designed to withstand harsh environmental conditions. In various embodiments, the metal transition conductor 2802 comprises a main body, which may be formed from a copper metal material, selected for its high conductivity; an aluminum metal material, which can offer advantages in cost and weight; or another suitable conductive metal or metal alloy. The main body may be a bare, uncoated plate, or it may include one or more coating layers to enhance electrical performance and prevent galvanic corrosion, particularly when connecting dissimilar conductor materials like copper and aluminum. For example, the one or more coating layers may comprise a silver plating material (e.g., for enhanced conductivity), a nickel plating material (e.g., for hardness and wear resistance),a tin plating material (e.g., to improve weldability and corrosion resistance), and/or other plating material(s). The one or more coating layers may be applied using techniques such as a high-purity electroplating process, a uniform electroless plating process, and/or other suitable plating techniques.

The assembly 2800 includes terminal portions of four separate electrical cables 2804, 2806, 2808, and 2810. These terminal portions can have their insulation stripped to expose a terminal section of the core conductor, which is then flattened to form terminal ends 2812, 2814, 2816, and 2818, respectively. The core conductors themselves may be of various constructions; for example, they can be solid conductors made of a single, elongated wire or stranded conductors made of multiple individual wires twisted or braided together. To enhance the electrical and mechanical properties of the final connection, the exposed core conductor may be treated, for example, by cleaning to remove oxides and contaminants, applying a fluxing agent, and/or tinning (coating with a thin layer of solder) to improve weldability and prevent oxidation; this treatment may occur before or after the conductor is flattened. The prepared terminal ends are then electrically and mechanically coupled to the metal transition conductor 2802. This coupling can be achieved, for example, through a solid-state ultrasonic welding process that forms a metallurgical bond, or via electric resistance welding (ERW).

In an alternative embodiment, the metal transition conductor 2802 may not involve direct welding of the cables to the main body. Instead, the metal transition conductor may further comprise a plurality of metal lugs coupled to the main body, where each lug is configured to receive a terminal portion of an electrical cable via a mechanical crimping process, which deforms the lug to create a secure mechanical and electrical connection, often suitable for field installations. The number of lugs generally corresponds to the number of cables to be terminated. For example, in a configuration corresponding to FIG. 28, the apparatus would include four metal lugs. In other embodiments, a different number of lugs may be used. For example, in one embodiment, the apparatus comprises a first metal lug, a second metal lug, and a third metal lug, each electrically and mechanically coupled to the metal plate. In such configurations, the terminal portion of the first electrical cable is inserted and secured to an interior portion of the first metal lug, the terminal portion of the second electrical cable is inserted and secured to an interior portion of the second metal lug, and the terminal portion of the third electrical cable is inserted and secured to an interior portion of the third metal lug. The terminal portions are then secured within their respective lugs via the mechanical crimping process, wherein each of the first metal lug, second metal lug, and third metal lug is deformed to create the secure connection.

While FIG. 28 illustrates an exemplary embodiment with four electrical cables, it is to be understood that the apparatus can be configured to accommodate a different number of cables. For example, in some embodiments, the apparatus may be configured to connect a terminal portion of a first electrical cable, a terminal portion of a second electrical cable, and a terminal portion of a third electrical cable, with each terminating at the metal transition conductor. In other embodiments, the apparatus can be configured to connect additional terminal portions of additional electrical cables, such that the terminal portions of a total of N electrical cables are electrically and mechanically coupled to the metal transition conductor, where N is a positive integer greater than 4.

The arrangement demonstrates an advantage of this connector design: an ability to terminate and interconnect various cables at a single junction. The connector can accommodate cables of various wire gauges, for example, from 1 AWG to 12 AWG. While the exemplary embodiment in FIG. 28 shows cables of two different gauges (two thicker and two thinner), it should be understood that the connector is configured to accommodate a wide range of wire gauges, and each of the four cables could potentially have a unique gauge. It can also accommodate cables with different conductor materials. Examples of these materials include a copper metal material, an aluminum metal material, or a copper clad material. A copper-clad aluminum (CCA) material, for instance, is a bimetallic conductor comprising an aluminum core with a metallurgically bonded outer layer of copper. This provides significant design flexibility and potential cost savings by minimizing the use of more expensive conductor materials where not required. For instance, in an embodiment with at least three electrical cables, at least two of the first electrical cable, second electrical cable, and third electrical cable may comprise conductors of different metal materials, and at least two of the first electrical cable, second electrical cable, and third electrical cable may comprise conductors of different wire gauges. This flexibility applies whether the connector is configured for three, four, or more cables. The connector is highly versatile and can accommodate numerous combinations of conductor gauges and materials. For instance, while one common embodiment may involve connecting two copper cables and two aluminum cables, the design allows for any combination, including embodiments where each of the four cables is made of a different conductor material. The following table illustrates, by way of example, various possible configurations for the four conductors, using Copper (Cu) and Aluminum (Al) conductors. While there are sixteen total permutations, the table below lists the ten unique, non-symmetrical gauge and material configurations.

TABLE 1

| Configuration | Wire #1 (Thick) | Wire #2 (Thin) | Wire #3 (Thick) | Wire #4 (Thin) |
|---|---|---|---|---|
| A | Cu | Cu | Cu | Cu |
| B | Cu | Cu | Cu | Al |
| C | Cu | Cu | Al | Cu |
| D | Cu | Cu | Al | Al |
| E | Cu | Al | Cu | Al |
| F | Cu | Al | Al | Cu |
| G | Cu | Al | Al | Al |
| H | Al | Cu | Al | Cu |
| I | Al | Cu | Al | Al |
| J | Al | Al | Al | Al |

In at least one embodiment, the apparatus is a single piece of hardware capable of performing both a material transition and a wire gauge transition. The apparatus can accommodate numerous combinations of conductor gauges and materials. For instance, in an embodiment with at least three electrical cables, at least two of the electrical cables may comprise conductors of different metal materials, and at least two of the electrical cables may comprise conductors of different wire gauges. The versatility of the apparatus is a significant benefit of the connector design.

Figure 29:
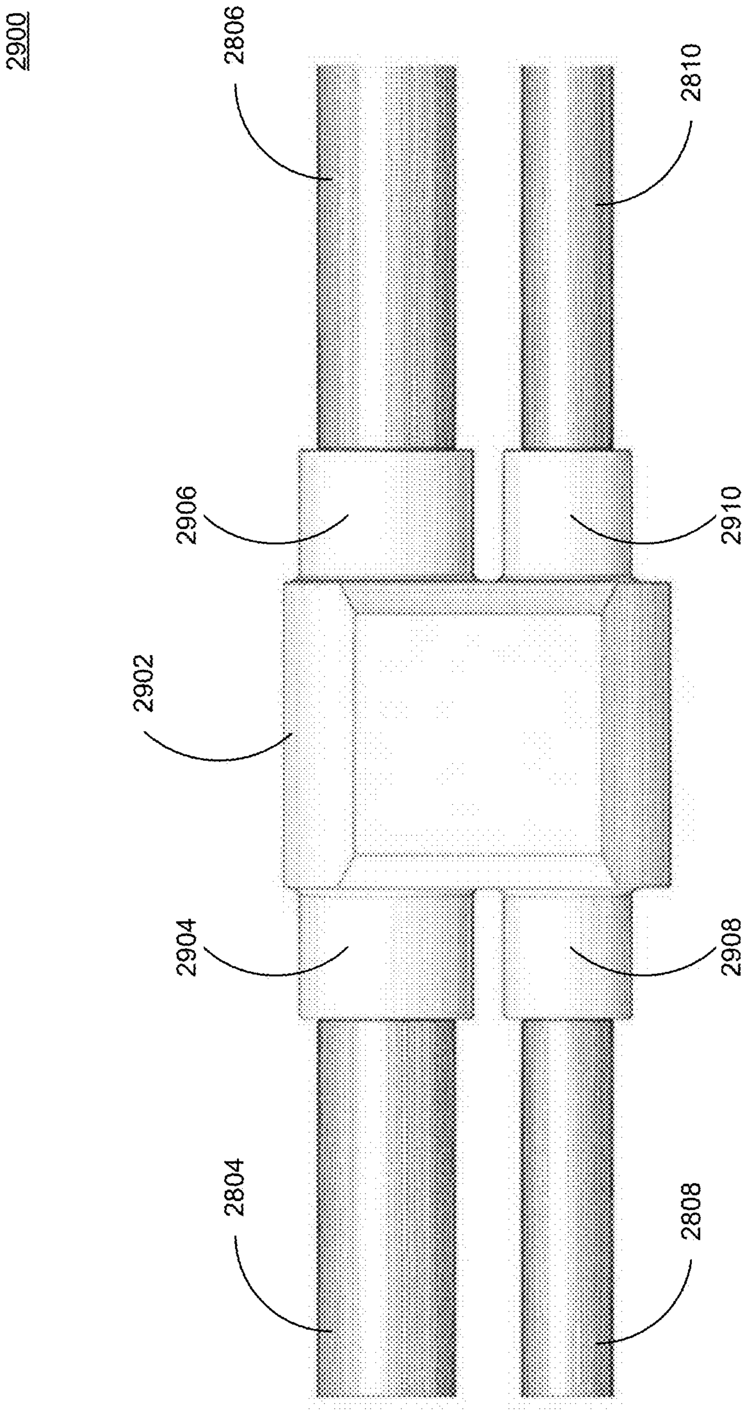
FIG. 29 is a top-down view of an inner mold assembly formed over the conductive assembly of FIG. 28, according to one embodiment.

FIG. 29 provides a top-down external view of an inner mold assembly 2900 formed over the conductive assembly 2800 shown in FIG. 28, in accordance with one embodiment. The inner mold assembly 2900 includes a central body 2902 that encapsulates the metal transition conductor 2802 and the welded terminal ends (2812, 2814, 2816, and 2818). The assembly also includes four extension portions 2904, 2906, 2908, and 2910. These extension portions encapsulate the terminal ends of the cables, including the uninsulated conductors and a portion of each cable that is covered by insulation. In this manner, the inner mold forms a seal against the insulation of the cables 2804, 2806, 2808, and 2810, thereby more fully encapsulating and protecting the cables and the metal transition conductor 2802. The inner mold (comprising elements 2902, 2904, 2906, 2908, and 2910) may be made of a rigid, electrically non-conductive material and formed by a process such as injection molding. Examples of suitable materials include various thermoplastic or thermosetting materials, such as a polypropylene (PP) material, a reinforced thermoplastics (RTP) material, a thermoplastic vulcanizate (TPV) material, an ethylene vinyl acetate (EVA) material, or a thermoplastic rubber (TPR) material. For example, molten material can flow into a mold cavity and conform to the shape of the internal conductive components, creating a solid, substantially void-free encapsulation. This process provides an initial layer of electrical insulation and structural support. For example, the rigid inner mold can protect the internal components from mechanical stress, thereby enhancing the overall durability and reliability of the electrical connections.

Figure 30:
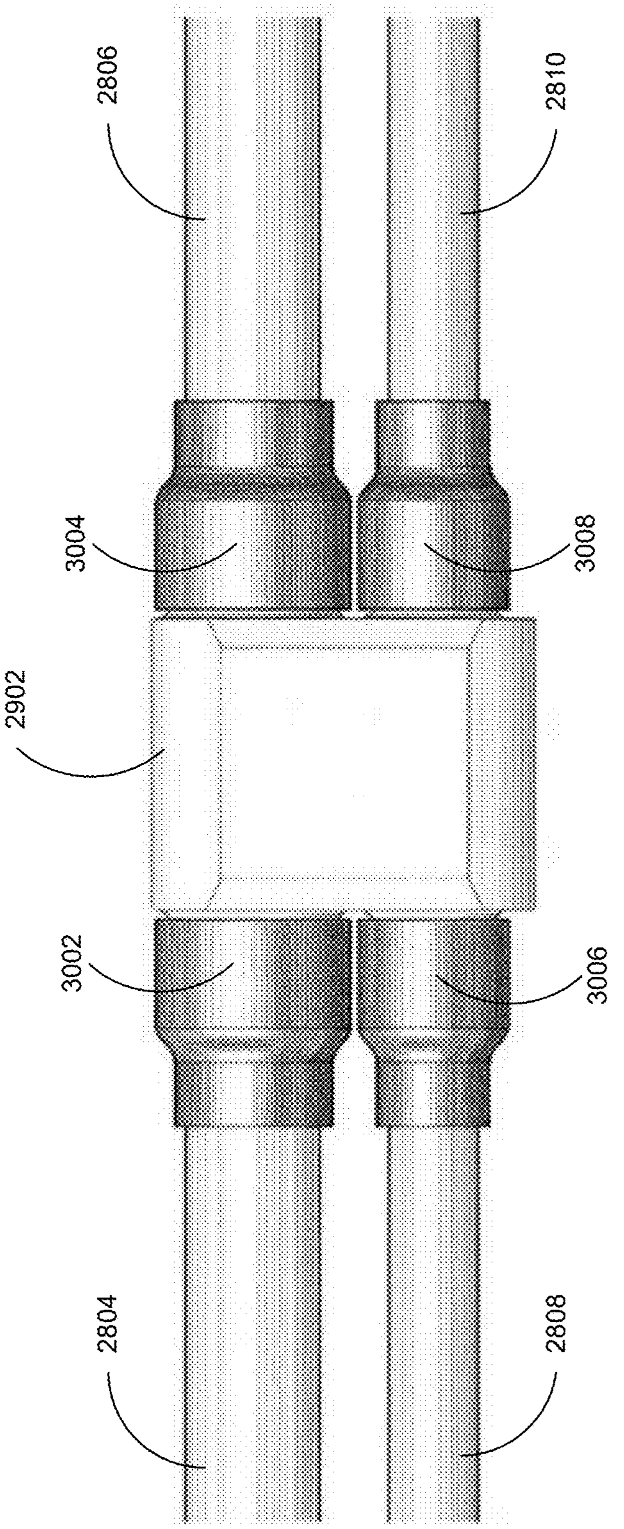
FIG. 30 is a top-down view of the assembly of FIG. 29 after the installation of temperature-activated sealing members, according to one embodiment.

FIG. 30 shows a top-down view of the inner mold assembly 3000 from FIG. 29 after the installation of temperature-activated sealing members, according to an example embodiment. In this view, four heat shrink tubes (HSTs) 3002, 3004, 3006, and 3008 have been positioned over the junction between the inner mold's extension portions and the insulation of the electrical cables 2804, 2806, 2808, and 2810. While the illustrated embodiment shows four HSTs corresponding to the four cables, it is to be understood that the number of HST segments will correspond to the number of cables being terminated. For example, in an embodiment with three electrical cables, a first heat shrink tube (HST) segment, a second HST segment, and a third HST segment would be used. The first HST segment is positioned over a first extension portion of the inner mold and a near-terminal portion of the first electrical cable, the second HST segment is positioned over a second extension portion of the inner mold and a near-terminal portion of the second electrical cable, and the third HST segment is positioned over a third extension portion of the inner mold and a near-terminal portion of the third electrical cable.

In an example assembly process, each HST can be slipped over the terminal portion of the corresponding cable and moved to a position further down the cable, away from the terminal portion and metal transition conductor. This allows the HST to be kept at a safe distance from any heat generated during the welding and injection molding processes. After the inner mold has been formed and has cooled, each HST may be moved into its final position, as shown in FIG. 30. In at least one embodiment, each HST is positioned to overlap both a part of the corresponding extension portion of the inner mold assembly and a part of the insulation of the cable. When heat is applied, the HSTs shrink to form a tight seal at this interface. This creates, in conjunction with the inner mold and the cable insulation, an overall hermetic seal that protects the internal conductors and terminals from environmental factors such as moisture and dust, further enhancing the reliability of the assembly. Additionally, the HSTs may provide a secondary benefit as a form of strain relief. After cooling, the rigid structure of the HST provides added mechanical support that can modulate bending forces on a cable over a larger curvature, reducing stress where the cable exits the inner mold.

Figure 31:
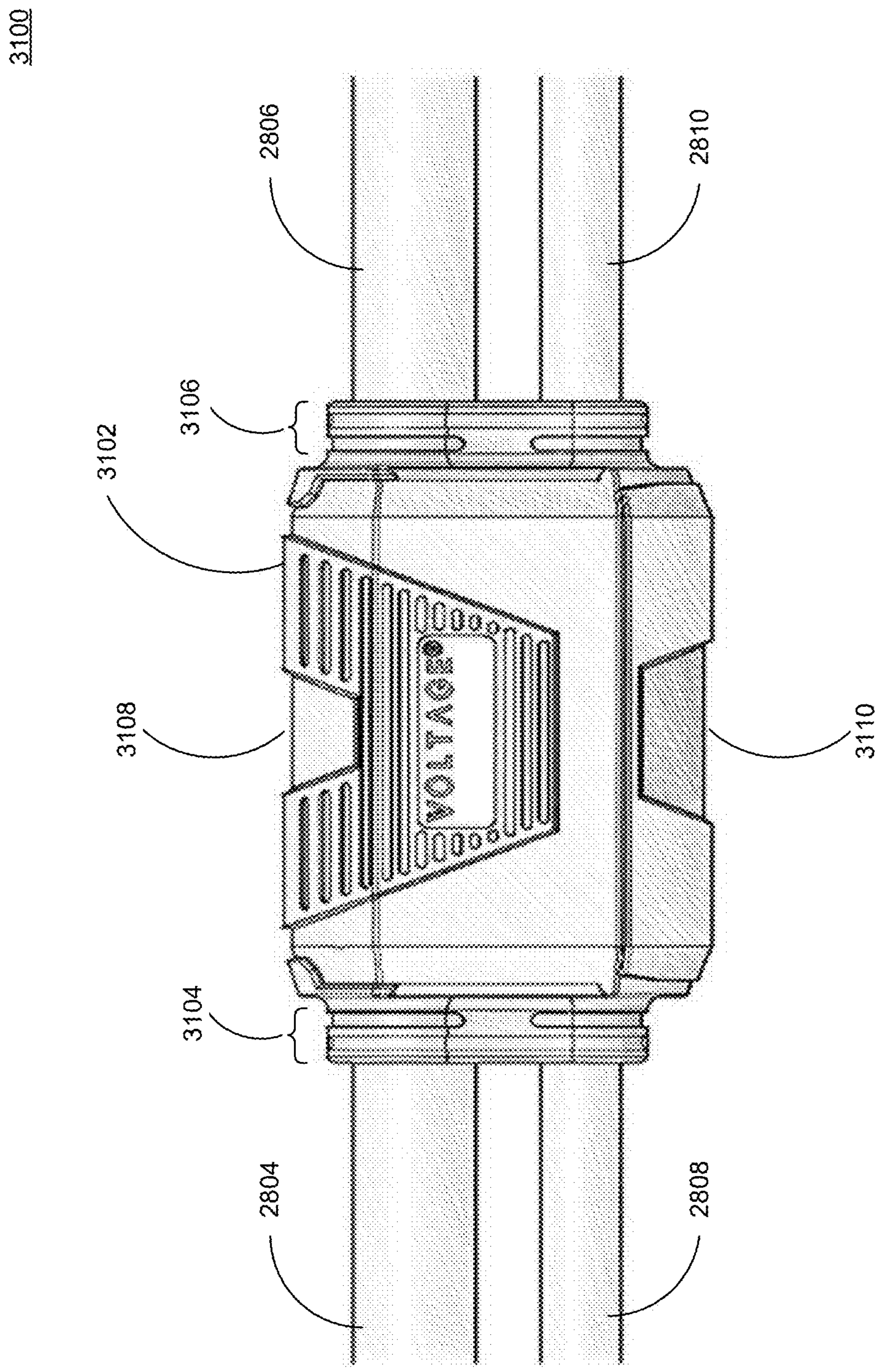
FIG. 31 is a top-down view of a completed material/gauge transition connector after an outer mold has been formed, according to one embodiment.

FIG. 31 shows a top-down view of the final, completed material/gauge transition connector 3100 after an outer mold 3102 has been formed over the inner mold assembly, according to one or more embodiments of the disclosure. The outer mold 3102 may comprise a rugged and pliable material, such as a thermoplastic vulcanizate (TVP) material, that can withstand rough handling, abrasion, and prolonged exposure to UV rays. The outer mold 3102 encapsulates the inner mold and HST assembly, providing a final layer of robust, hermetic sealing. The outer mold 3102 provides external strain relief for the electrical cables 2804, 2806, 2808, and 2810. As shown, the outer mold 3102 may include a first strain relief (SR) segment 3104 and a second strain relief segment 3106. Each strain relief segment comprises one or more concavities that increase the flexibility of the outer mold 3102 at the cable exit points. This increased flexibility allows strain from bending forces to be distributed over a greater length of the cable, reducing the risk of damage to the conductors at the point of connection.

In addition, the outer mold 3102 may include one or more exterior troughs, such as an upper trough 3108 and a lower trough 3110, configured to receive an anchoring device (not shown). In solar array deployment environments, which may be prone to high winds, these troughs provide a secure location for installing anchoring devices, such as cable ties, to secure the connector and prevent excessive movement. The troughs may be flanked by raised features that keep the anchoring device from slipping. Individually and collectively, the troughs contribute to the formation of a centrally-positioned, reduced-circumference location at which an anchoring device may be installed.

Figure 32A:
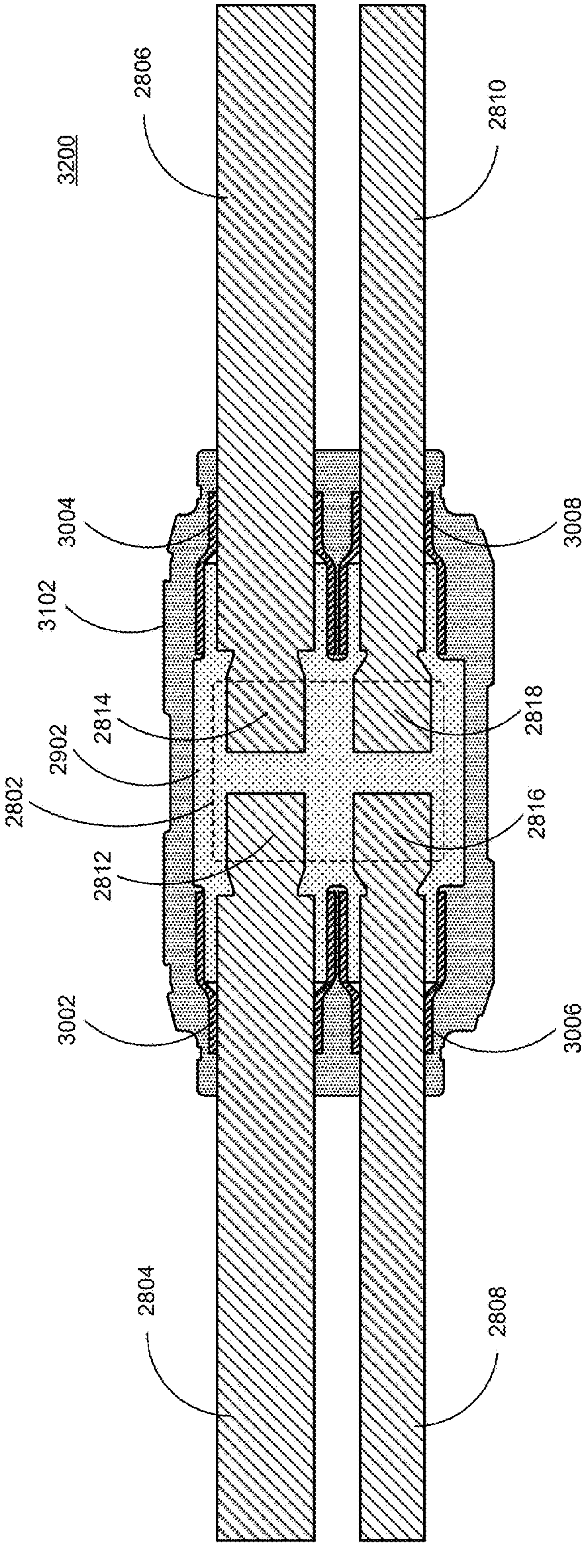
FIG. 32A is a longitudinal cross-section view of the assembled material/gauge transition connector of FIG. 31, according to one embodiment.

FIG. 32A presents a longitudinal cross-section view 3200 of the fully assembled material/gauge transition connector. This view illustrates the multi-layered encapsulation that is the result of the sequential molding and sealing processes and which protects the internal components. At the center, the metal transition conductor 2802 is shown with the terminal ends 2812, 2814, 2816, and 2818 of the electrical cables welded to it. Surrounding this central conductive assembly is the inner mold 2902, which provides primary structural rigidity and electrical insulation. The heat shrink tubes (HSTs) 3002, 3004, 3006, and 3008 are shown in their activated, shrunken state, forming a primary environmental seal over the inner mold and the cable insulation. Finally, the outer mold 3102 fully encapsulates the entire assembly. This layered construction provides robust electrical insulation, effective mechanical protection, and a hermetic seal that shields the sensitive electrical junctions from long-term exposure to moisture, dust, and UV radiation common in solar field deployments.

Figure 32B:
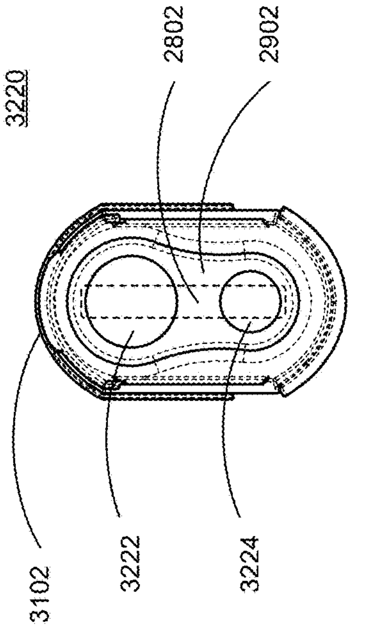
FIG. 32B is a lateral cross-section view of the assembled material/gauge transition connector of FIG. 31, according to one embodiment.

FIG. 32B presents a lateral cross-section view 3220 of the same connector. The dotted lines in this view represent contour lines of the various components at different longitudinal positions, illustrating how the internal and external shapes change along the connector's length." This view clarifies the compact, non-cylindrical profile of the assembly and shows the relative positioning of the internal conductors. The outer mold 3102 forms the exterior shape, enclosing the inner mold 2902 and the metal transition conductor 2802. Because this is a lateral cross-section at a particular longitudinal position, the cross-sections of only two of the four core conductors, 3222 and 3224, are visible within the assembly. These core conductors are the internal, current-carrying portions of the electrical cables (e.g., 2804 and 2808) shown in previous figures, such as FIG. 28. As described previously, the terminal portions of these cables are stripped of insulation to form the terminal ends (e.g., 2812 and 2816). In one embodiment, this preparation includes flattening the exposed core conductors. The prepared terminal ends are then coupled to the metal transition conductor 2802.

It is understood that while these internal components are made visible by the cross-sectional view of the drawing, they would not be visible from the exterior of the finished connector during operation. The differing cross-sectional areas of these conductors clearly illustrate a key feature of embodiments of the connector: its ability to terminate conductors of substantially different wire gauges within the same monolithic body. This allows, for example, a thicker trunk conductor and a thinner drop conductor to be joined reliably.

Figure 33A:
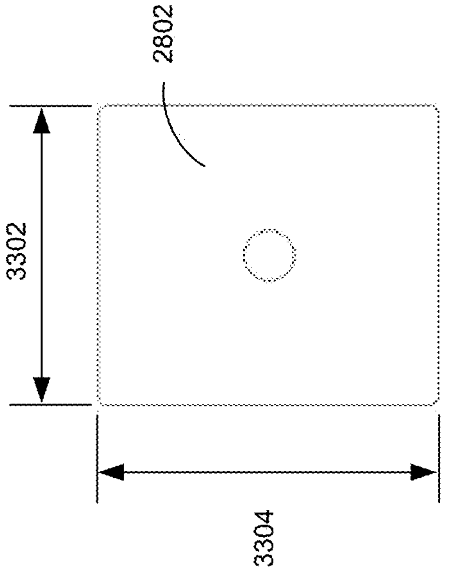
FIGS. 33A-33D illustrate various views of a metal transition conductor, according to one embodiment.
Figure 33B:
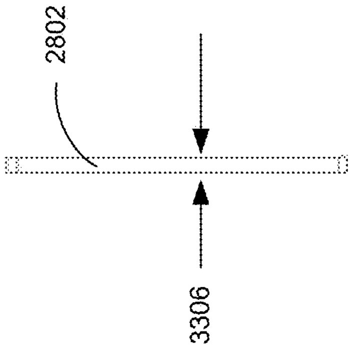
Figure 33C:
Figure 33D:
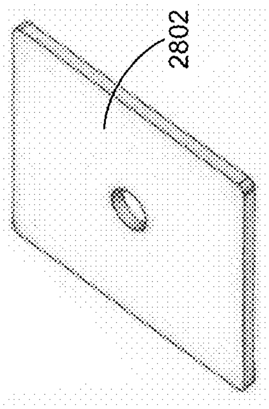

FIGS. 33A-33D illustrate various views of the metal transition conductor 2802. FIG. 33A is a top-down view of the metal transition conductor 2802. FIG. 33B is a side view of the metal transition conductor 2802. FIG. 33C is an end view of the metal transition conductor 2802. FIG. 33D is a perspective view of the component. As first introduced in the description of FIG. 28, the metal transition conductor 2802 serves as the primary electrical junction for the connector. The width of the plate is represented by dimension 3302. In one embodiment, this dimension can range from approximately 21 mm to 42 mm; in another embodiment, it can fall within a broader range of approximately 15 mm to 54 mm. The height of the plate is represented by dimension 3304. In one embodiment, this dimension can range from approximately 24 mm to 48 mm; in another embodiment, it can fall within a broader range of approximately 17 mm to 61 mm. The thickness of the plate is represented by dimension 3306. In one embodiment, this dimension can range from approximately 1.0 mm to 2.1 mm; in another embodiment, it can fall within a broader range of approximately 0.7 mm to 2.7 mm. It is to be understood that these specific ranges are provided as examples of different embodiments, and that other ranges are also within the scope of the present disclosure.

Figure 34B:
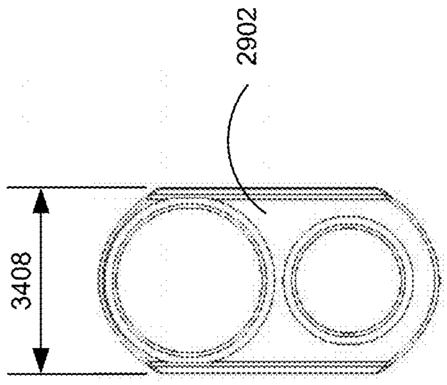
FIGS. 34A-34D illustrate various views of an inner mold, according to one embodiment.
Figure 34D:
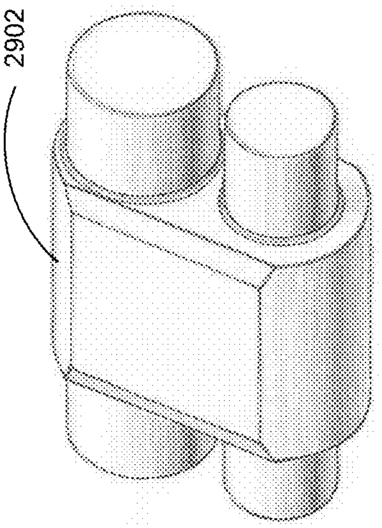
Figure 34A:
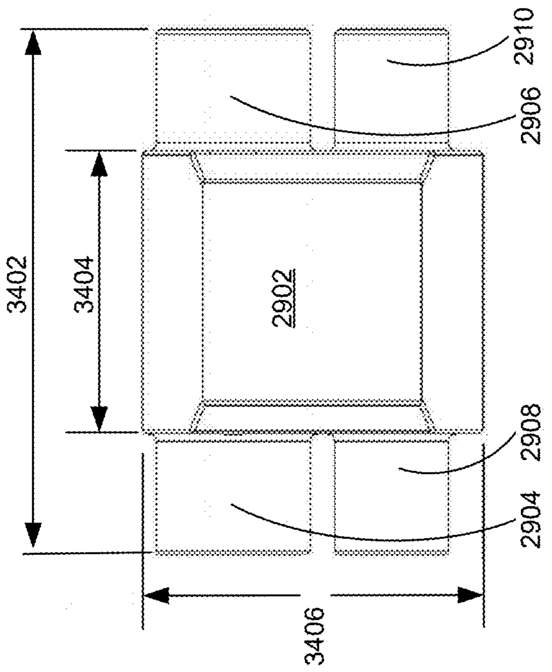
Figure 34C:
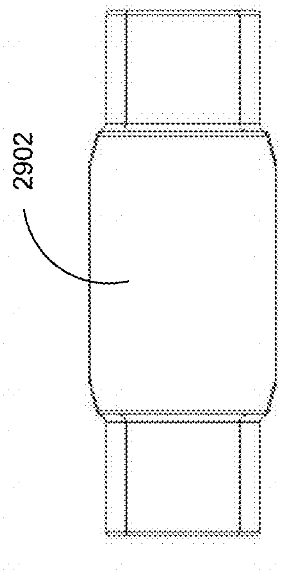

FIGS. 34A-34D illustrate various views of the inner mold 2902. FIG. 34A is a top-down view of the inner mold 2902. FIG. 34B is an end view of the inner mold 2902. FIG. 34C is a side view of the inner mold 2902. FIG. 34D is a perspective view of the inner mold 2902. As first shown in FIG. 29, the inner mold is comprised of a central body 2902 and four extension portions 2904, 2906, 2908, and 2910. The central body 2902 encapsulates the metal transition conductor and the welded terminal ends of the cables. The extension portions extend from the central body and encapsulate the portions of the cables adjacent to the terminal ends, thereby forming a seal against the cable insulation. Regarding the component's dimensions, the overall length is represented by dimension 3402. In one embodiment, this dimension can range from approximately 45 mm to 91 mm; in another embodiment, this dimension can fall within a broader range of approximately 32 mm to 117 mm. The length of the central body is represented by dimension 3404. In one embodiment, this dimension can range from approximately 24 mm to 49 mm; in another embodiment, this dimension can fall within a broader range of approximately 17 mm to 63 mm. The overall height is represented by dimension 3406. In one embodiment, this dimension can range from approximately 29 mm to 59 mm; in another embodiment, this dimension can fall within a broader range of approximately 21 mm to 76 mm. The width of the end portions is represented by dimension 3408. In one embodiment, this dimension can range from approximately 16 mm to 32 mm; in another embodiment, this dimension can fall within a broader range of approximately 11 mm to 41 mm. It is to be understood that these specific ranges are provided as examples of different embodiments, and that other ranges are also within the scope of the present disclosure.

Figure 35B:
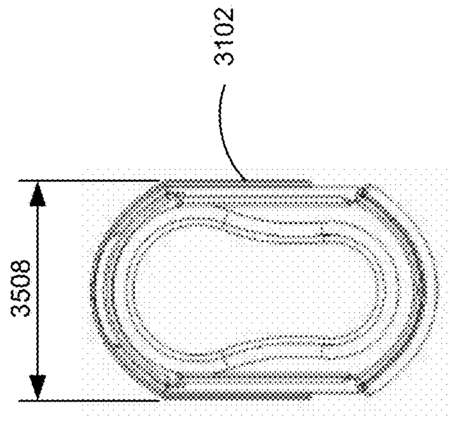
FIGS. 35A-35D illustrate various views of an outer mold, according to one embodiment.
Figure 35D:
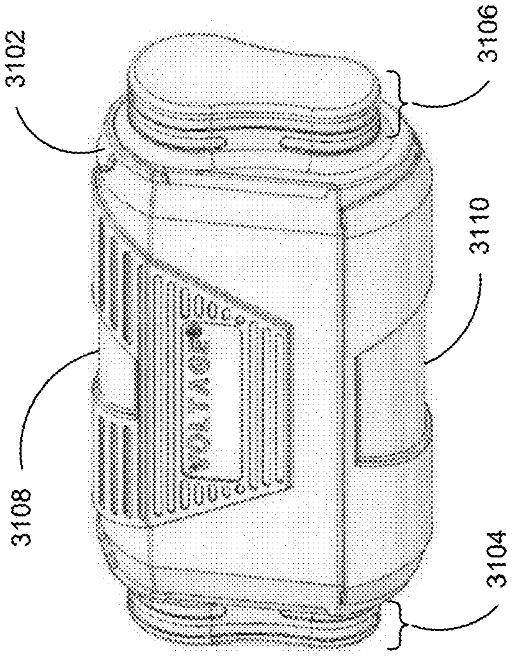
Figure 35A:
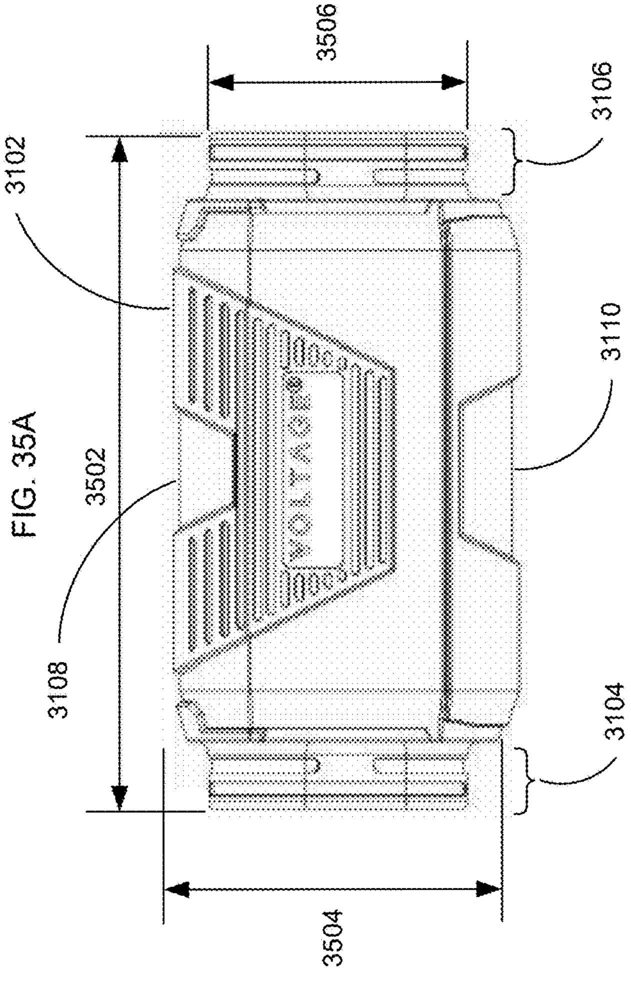
Figure 35C:
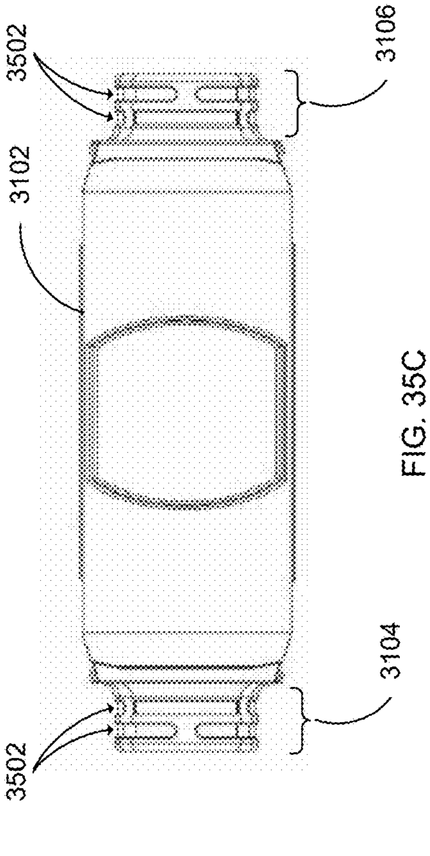

FIGS. 35A-35D illustrate various views of the outer mold 3102. FIG. 35A is a top-down view of the outer mold 3102. FIG. 35B is an end view of the outer mold 3102. FIG. 35C is a side view of the outer mold 3102. FIG. 35D is a perspective view of the outer mold 3102. As first introduced in the description of FIG. 31, the outer mold 3102 provides a final, robust layer of protection against mechanical stress, moisture, and UV degradation, and includes several features such as strain relief segments 3104 and 3106 and exterior troughs 3108 and 3110. Regarding the component's dimensions, the overall length is represented by dimension 3502. In one embodiment, this dimension can range from approximately 70 mm to 140 mm; in another embodiment, this dimension can fall within a broader range of approximately 50 mm to 180 mm. The overall height is represented by dimension 3504. In one embodiment, this dimension can range from approximately 36 mm to 71 mm; in another embodiment, this dimension can fall within a broader range of approximately 25 mm to 92 mm. The height of the main body portion is represented by dimension 3506. In one embodiment, this dimension can range from approximately 27 mm to 53 mm; in another embodiment, this dimension can fall within a broader range of approximately 19 mm to 69 mm. The width of the end portions is represented by dimension 3508. In one embodiment, this dimension can range from approximately 22 mm to 45 mm; in another embodiment, this dimension can fall within a broader range of approximately 16 mm to 58 mm. It is to be understood that these specific ranges are provided as examples of different embodiments, and that other ranges are also within the scope of the present disclosure.

It should be noted that FIGS. 33-35 present simplified component views, and certain details may not be shown for the sake of clarity. For example, openings or holes in the inner mold 2902 and outer mold 3102 through which the electrical cables pass are not explicitly illustrated in these particular views but would be present in the manufactured components.

Figure 36A:
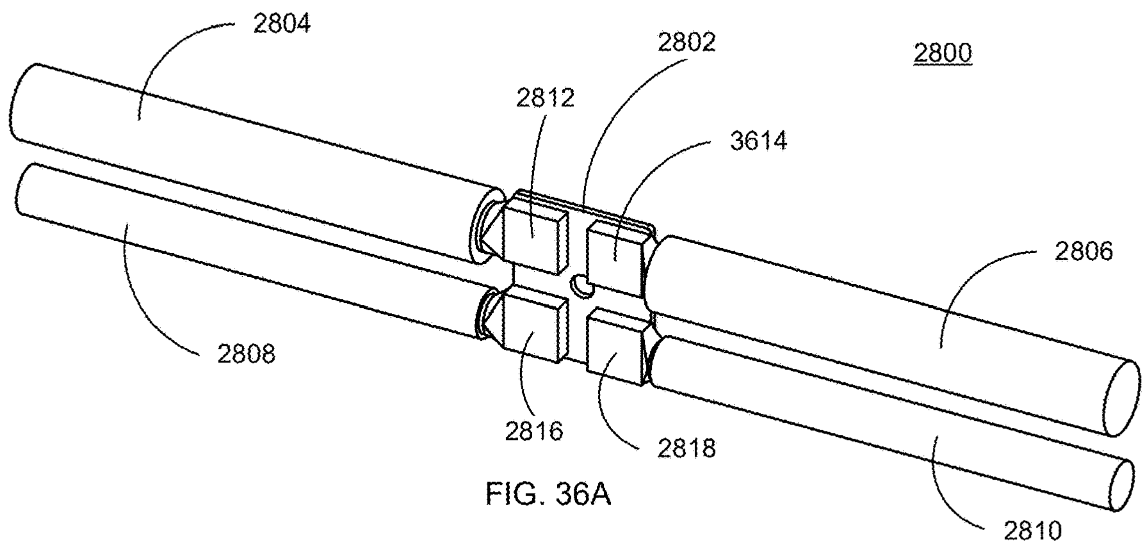
FIGS. 36A-36C are perspective views illustrating a manufacturing sequence for a material/gauge transition connector, according to one embodiment.
Figure 36B:
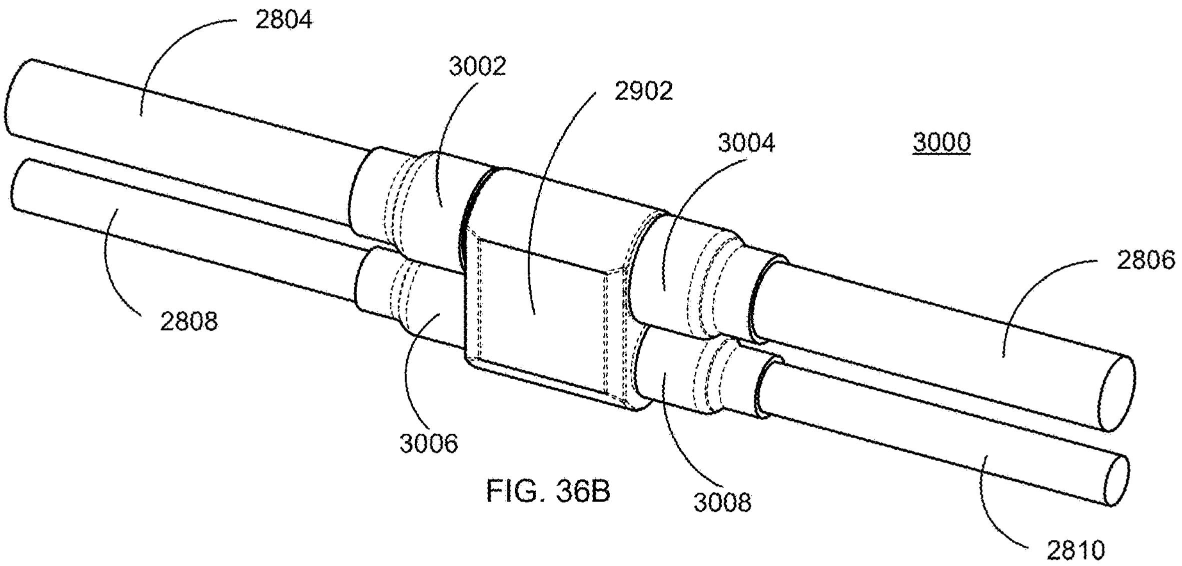
Figure 36C:
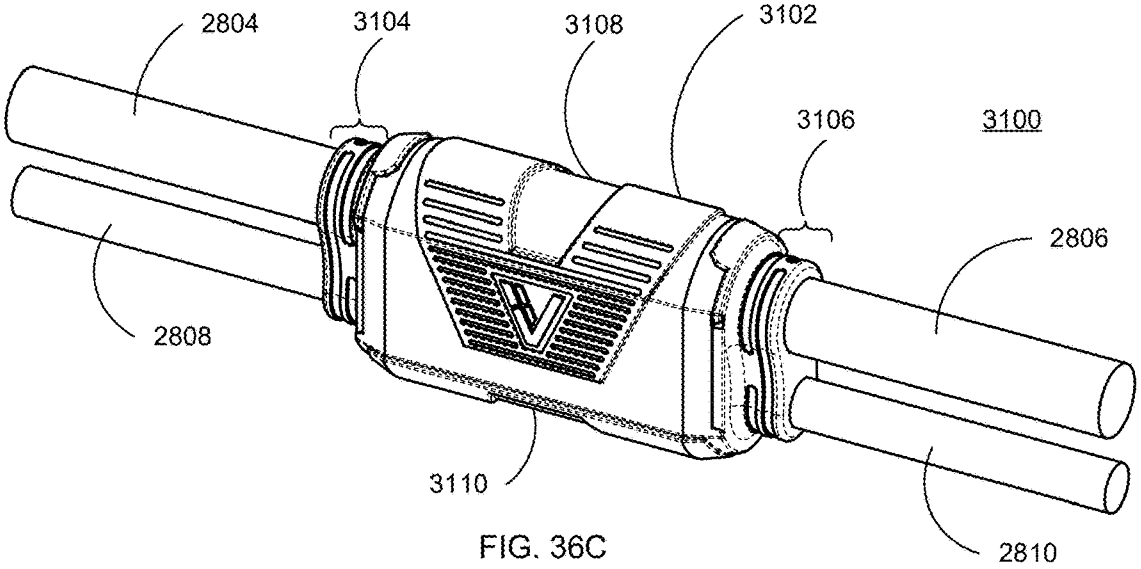

FIGS. 36A-36C illustrate the sequential manufacturing process of the material/gauge transition connector in a series of perspective views. FIG. 36A shows the initial internal conductive assembly 2800. As first detailed in the description for FIG. 28, this assembly includes the central metal transition conductor 2802. The terminal portions of four electrical cables (2804, 2806, 2808, and 2810) are prepared to form flattened terminal ends (2812, 3614, 2816, and 2818), which are then electrically and mechanically coupled to the metal transition conductor 2802. FIG. 36B shows the resulting sub-assembly 3000 after the application of the inner mold and sealing members. As described in relation to FIG. 29, an inner mold 2902 is formed over the internal conductive assembly from the previous step. Subsequently, as described in relation to FIG. 30, temperature-activated sealing members, such as heat shrink tubes (3002, 3004, 3006, and 3008), are positioned to seal the junctions between the inner mold 2902 and the electrical cables 2804, 2806, 2808, and 2810. FIG. 36C shows the final, fully assembled connector 3100. As described in relation to FIG. 31, a final outer mold 3102 is formed over the sub-assembly 3000. This outer mold provides a robust outer layer of protection for the connector and the exiting electrical cables 2804, 2806, 2808, and 2810. The outer mold includes features such as strain relief segments (3104 and 3106) and exterior troughs (3108 and 3110) for anchoring.

Figure 37:
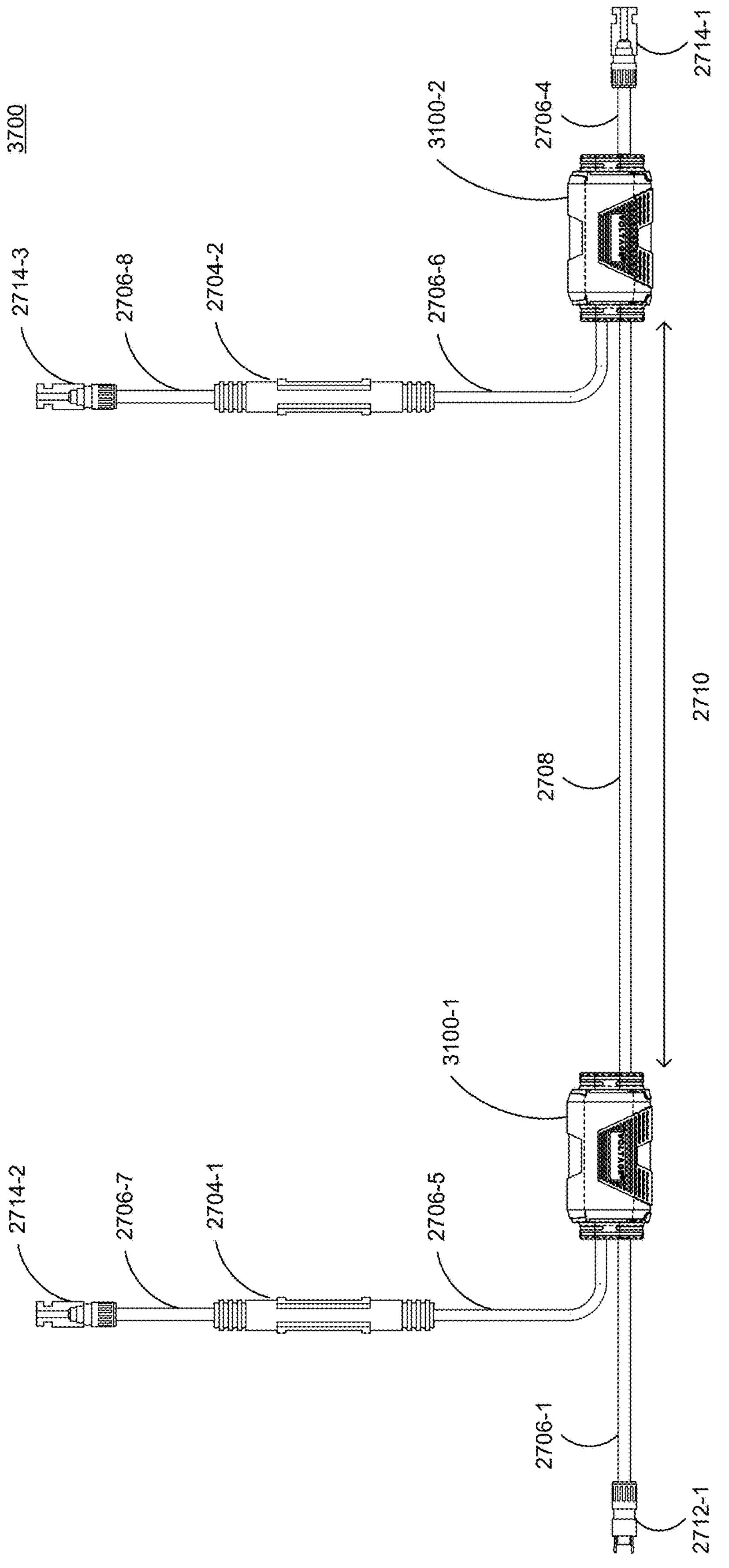
FIG. 37 illustrates a wiring arrangement utilizing the material/gauge transition connector, according to one embodiment.

FIG. 37 illustrates an exemplary wiring arrangement 3700 which utilizes the multi-terminal material/gauge transition connector 3100 described previously. This arrangement demonstrates an improvement in component consolidation when compared to the prior wiring arrangement 2700 shown in FIG. 27. The comparison of FIG. 37 with FIG. 27 highlights the flexibility and utility of a multi-terminal material/gauge transition connector according to embodiments of the present disclosure, as it is capable of replacing multiple separate components.

In the wiring arrangement 3700, a single multi-terminal material/gauge transition connector 3100-1 replaces two separate components from the prior harness 2700: the T-junction connector 2702-1 and the metal material transition connector 1800-1 (both shown in FIG. 27). This single connector 3100-1 is capable of both terminating multiple cables of different materials and gauges and serving as a junction point for multiple branch circuits, thereby reducing component count, lowering manufacturing costs, and simplifying field installation. While the connector is described in some embodiments as having four connection points, or ports, it should be understood that this is merely exemplary. As illustrated by the connection of connector 3100-1, the connector can be utilized with fewer than the maximum number of ports occupied. For example, as shown with connector 3100-1, the apparatus serves to connect a terminal portion of a first electrical cable 2706-1, a second electrical cable 2708, and a third electrical cable 2706-5. This illustrates an embodiment where at least three electrical cables terminate at the metal transition conductor within the connector 3100-1. In such configurations, any unoccupied ports can be environmentally sealed, for example, by manufacturing the connector without such openings in the inner and outer molds. Similarly, a second multi-terminal material/gauge transition connector 3100-2 replaces the T-junction connector 2702-2 and the metal material transition connector 1800-2 from the prior harness.

Many of the other components in the harness 3700 are analogous to those in the prior harness shown in FIG. 27. A central cable 2708, being of a second size (e.g., #2 or #4) and comprising a second metal material such as an aluminum (AL) conductor, spans a distance 2710 between the two connectors 3100-1 and 3100-2. Various branch cables (2706-1, 2706-4, 2706-5, 2706-6, 2706-7, 2706-8), being of a first size (e.g., #6 size) and comprising a first metal material such as a copper (CU) conductor, connect to the main assembly to form the complete harness. The harness also includes in-line fuses 2704-1 and 2704-2 for overcurrent protection. The harness terminates with various wiring connectors, including a male connector 2712-1 and female connectors 2714-1, 2714-2, and 2714-3, to facilitate connection to other parts of a larger photovoltaic wiring system. Thus, the wiring arrangement 3700 achieves the same functionality as the prior harness 2700 but with fewer components and connection points, resulting in a more streamlined and reliable assembly.

Figure 38:
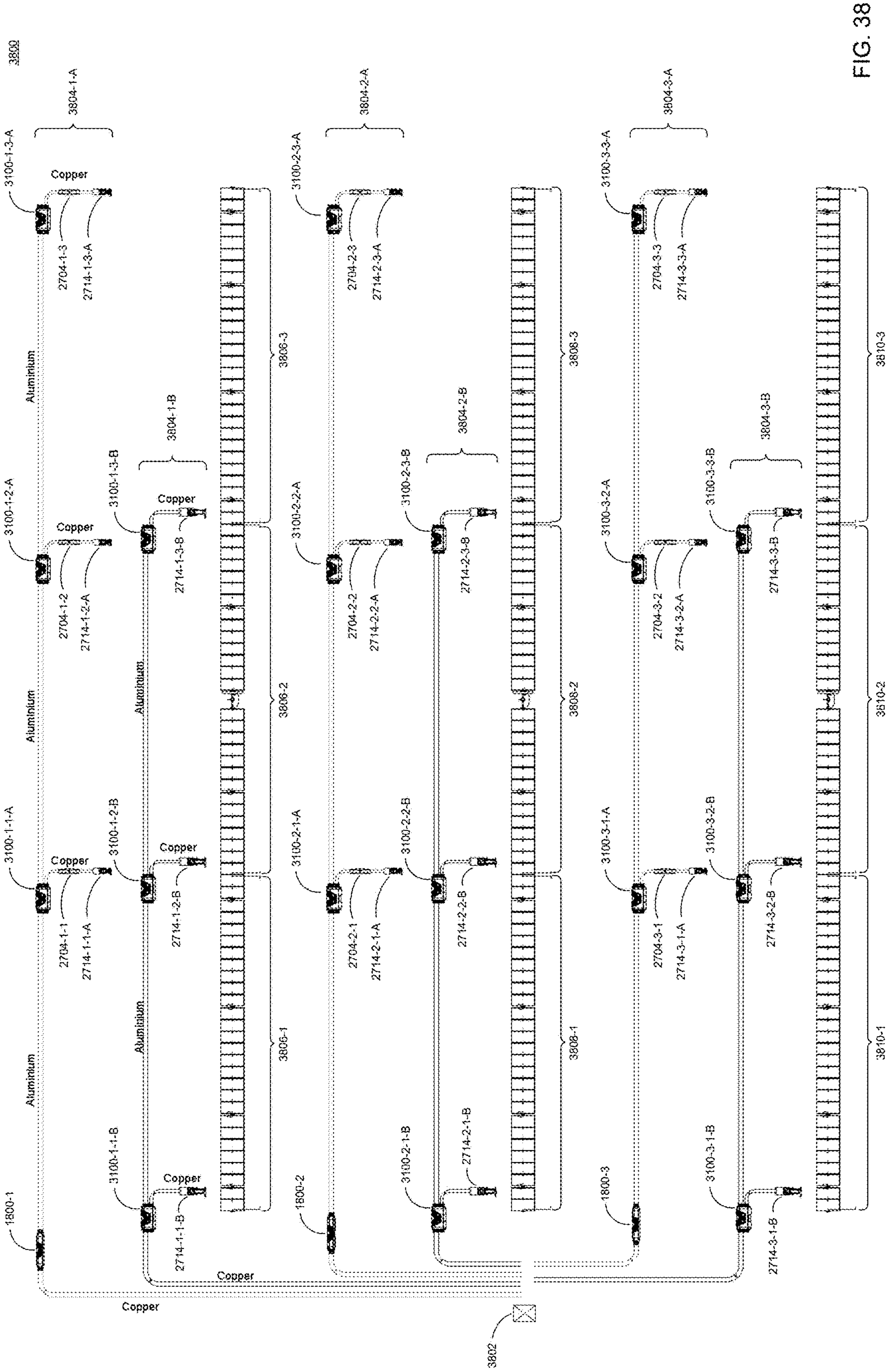
FIG. 38 illustrates a solar power system utilizing wiring harnesses that incorporate material/gauge transition connectors, according to one embodiment.

FIG. 38 is a schematic diagram illustrating a solar power system 3800 that utilizes one or more wiring harnesses incorporating material/gauge transition connectors, in accordance with one embodiment. The system 3800 shows multiple rows of solar panels connected to a combiner box 3802. Each row of solar panels is serviced by a pair of wiring harnesses, one for the positive terminals and one for the negative terminals.

In the embodiment shown, a first row of solar panels includes three strings of solar panels: 3806-1, 3806-2, and 3806-3. In the embodiment of FIG. 38, each string of solar panels comprises 28 solar panels. In this embodiment, the solar panels within each string are connected in series, causing their individual voltages to add together. However, in other embodiments, the number of solar panels in a string can vary, and they may be connected in other configurations (e.g., in parallel or a series-parallel combination). This first row is serviced by a positive terminal wiring harness 3804-1-A and a negative terminal wiring harness 3804-1-B. Both harnesses 3804-1-A and 3804-1-B are electrically connected to the combiner box 3802.

The positive wiring harness 3804-1-A begins with a copper cable segment extending from the combiner box 3802 to a metal transition connector 1800-1. The metal transition connector 1800-1 facilitates a connection from the initial copper cable to a less expensive aluminum cable, which extends along the length of the solar panel row. The use of aluminum wiring for long runs achieves significant cost savings over the use of copper wiring for the same distance.

The aluminum cable of harness 3804-1-A connects to a first material/gauge transition connector 3100-1-1-A. This connector provides a copper drop line that terminates with a female wiring connector 2714-1-A. An in-line fuse 2704-1-1 is integrated into this drop line for overcurrent protection. The female wiring connector 2714-1-1-A provides the positive terminal connection for the first string of solar panels 3806-1. From the material/gauge transition connector 3100-1-1-A, another segment of aluminum cable extends to a second material/gauge transition connector 3100-1-2-A. This second connector provides a fused (2704-1-2) copper drop line terminating in a female connector (2714-1-2-A) for the second string of solar panels 3806-2. Similarly, a third segment of aluminum cable connects to the third material/gauge transition connector 3100-1-3-A, which provides a fused (2704-1-3) copper drop line terminating in a female connector (2714-1-3-A) for the third string of solar panels 3806-3.

The negative wiring harness 3804-1-B is constructed in a similar fashion to complete the electrical circuit for each solar panel string. It includes material/gauge transition connectors 3100-1-1-B, 3100-1-2-B, and 3100-1-3-B. Each of these connectors provides a copper drop line that terminates with a female wiring connector (2714-1-1-B, 2714-1-2-B, and 2714-1-3-B, respectively), which serves as the negative terminal for the corresponding solar panel string (3806-1, 3806-2, and 3806-3, respectively).

The system 3800 includes additional rows of solar panels that are wired in a similar manner. A second row includes solar panel strings 3808-1, 3808-2, and 3808-3, which are serviced by a positive wiring harness 3804-2-A and a negative wiring harness 3804-2-B. These harnesses utilize a metal transition connector 1800-2 and corresponding material/gauge transition connectors (3100-2-1-A, 3100-2-2-A, 3100-2-3-A on the positive side; 3100-2-1-B, 3100-2-2-B, 3100-2-3-B on the negative side), in-line fuses (2704-2-1, 2704-2-2, 2704-2-3), and female wiring connectors (2714-2-1-A, 2714-2-2-A, 2714-2-3-A on the positive side; 2714-2-1-B, 2714-2-2-B, 2714-2-3-B on the negative side).

Likewise, a third row includes solar panel strings 3810-1, 3810-2, and 3810-3, serviced by a positive wiring harness 3804-3-A and a negative wiring harness 3804-3-B. These harnesses utilize a metal transition connector 1800-3 and corresponding material/gauge transition connectors (3100-3-1-A, 3100-3-2-A, 3100-3-3-A on the positive side; 3100-3-1-B, 3100-3-2-B, 3100-3-3-B on the negative side), in-line fuses (2704-3-1, 2704-3-2, 2704-3-3), and female wiring connectors (2714-3-1-A, 2714-3-2-A, 2714-3-3-A on the positive side; 2714-3-1-B, 2714-3-2-B, 2714-3-3-B on the negative side). All harnesses connect back to the central combiner box 3802.

The use of the material/gauge transition connector provides significant flexibility in the design of the wiring harnesses. A system designer can strategically specify changes in both the material and the gauge of the wiring at different points along a harness to reduce costs and accommodate the specific needs of an installation. In some embodiments, these design decisions are implemented when the wiring harness is pre-fabricated in a factory setting. This pre-fabrication with integrated transition connectors greatly simplifies the on-site installation process, making it significantly less manually intensive. In such cases, an installer can simply unspool the pre-fabricated harness and connect it to the appropriate points. For instance, while a designer may specify a long run of wiring to be a cost-effective aluminum cable, the same designer can specify the use of a material/gauge transition connector (e.g., 3100-1-1-A) to provide an integrated copper drop line where needed. This is advantageous when certain components, such as in-line fuses (e.g., 2704-1-1), may only be available with copper leads. A pre-fabricated harness provides the necessary copper drop line directly, ensuring a reliable connection and eliminating the need for the installer to create a separate material transition in the field. This reduces both installation time and the number of potential failure points. However, the present disclosure is not limited to pre-fabricated embodiments, and such material/gauge transitions can also be implemented on-site by an installer.

As used herein, the term 'material' is intended to be interpreted broadly. For example, when a specific material is mentioned, such as a 'copper material' or a 'polypropylene material,' it should be understood to encompass not only the pure base material but also various compositions that include the base material. This includes, but is not limited to, alloys, mixtures, composites, materials with additives, and materials with impurities, unless the context clearly indicates otherwise.

The foregoing description of the embodiments has been presented for the purposes of illustration and description. It is not intended to be exhaustive or to limit the disclosure to the precise form disclosed. Many modifications and variations are possible in light of the above teaching. It is intended that the scope of the disclosure be limited not by this detailed description, but rather by the claims appended hereto. The use of the terms "a" and "an" and "the" and similar referents in the context of describing the disclosure (especially in the context of the following claims) are to be construed to cover both the singular and the plural, unless otherwise indicated herein or clearly contradicted by context. The term "comprising" as used herein is synonymous with "including," "containing," or "characterized by," and is inclusive or open-ended and does not exclude additional, unrecited elements or method steps.

Furthermore, the described features, structures, or characteristics of the disclosed embodiments may be combined in any suitable manner. For example, features described in connection with one embodiment may be practiced in any other embodiment without departing from the scope of the disclosure. Thus, the embodiments are not mutually exclusive, and it is to be understood that the various features of the embodiments disclosed herein may be combined with one another, unless specifically noted otherwise.

What is claimed is:

1. An apparatus for forming electrical connections comprising:

a metal transition conductor;

a terminal portion of a first electrical cable electrically and mechanically coupled to the metal transition conductor;

a terminal portion of a second electrical cable electrically and mechanically coupled to the metal transition conductor;

a terminal portion of a third electrical cable electrically and mechanically coupled to the metal transition conductor;

wherein the metal transition conductor comprises a metal plate, wherein each of the first electrical cable, second electrical cable, and third electrical cable terminates at the metal transition conductor, wherein at least two of the first electrical cable, second electrical cable, and third electrical cable comprise conductors of different metal materials, and wherein at least two of the first electrical cable, second electrical cable, and third electrical cable comprise conductors of different wire gauges; and a mold structure encasing the metal transition conductor, the terminal portion of the first electrical cable, the terminal portion of the second electrical cable, and the terminal portion of the third electrical cable.

2. The apparatus of claim 1, wherein the different metal materials comprise a copper metal material and an aluminum metal material.

3. The apparatus of claim 1, wherein the different metal materials comprise a copper clad material.

4. The apparatus of claim 1, wherein the terminal portion of the first electrical cable, the terminal portion of the second electrical cable, and the terminal portion of the third electrical cable are each welded directly to the metal plate.

5. The apparatus of claim 4, wherein the terminal portion of the second electrical cable, and the terminal portion of the third electrical cable are each welded to the metal plate by ultrasonic welding.

6. The apparatus of claim 4, wherein the terminal portion of the second electrical cable, and the terminal portion of the third electrical cable are each welded to the metal plate by electric resistance welding (ERW).

7. The apparatus of claim 1, wherein the metal plate comprises a main body comprising a body metal material.

8. The apparatus of claim 7, wherein the body metal material comprises a copper metal material.

9. The apparatus of claim 7, wherein the body metal material comprises an aluminum metal material.

10. The apparatus of claim 7, wherein the metal plate further includes a coating layer comprising a coating metal material, the coating layer attached to an outer surface of the main body.

11. The apparatus of claim 10, wherein the coating metal material comprises a silver plating material.

12. The apparatus of claim 10, wherein the coating metal material comprises a nickel plating material.

13. The apparatus of claim 10, wherein the coating metal material comprises a tin plating material.

14. The apparatus of claim 1, wherein the metal transition conductor further comprises:

a first metal lug electrically and mechanically coupled to the metal plate;

a second metal lug electrically and mechanically coupled to the metal plate; and a third metal lug electrically and mechanically coupled to the metal plate, wherein the terminal portion of the first electrical cable is inserted and secured to an interior portion of the first metal lug, the terminal portion of the second electrical cable is inserted and secured to an interior portion of the second metal lug, and the terminal portion of the third electrical cable is inserted and secured to an interior portion of the third metal lug.

15. The apparatus of claim 14, wherein the terminal portion of the first electrical cable, the terminal portion of the second electrical cable, and the terminal portion of the third electrical cable, are secured to the interior portions of the first metal lug, second metal lug, and third metal lug, respectively, by crimping each of the first metal lug, second metal lug, and third metal lug.

16. The apparatus of claim 1, wherein:

the mold structure comprises an inner mold and an outer mold, the inner mold encases the metal transition conductor, the terminal portion of the first electrical cable, the terminal portion of the second electrical cable, and the terminal portion of the third electrical cable, and the outer mold encasing the inner mold.

17. The apparatus of claim 16, further comprising:

a first heat shrink tube (HST) segment;

a second HST segment; and a third HST segment, wherein the first HST segment is positioned over first extension portion of the inner mold and a near-terminal portion of the first electrical cable, the second HST segment is positioned over a second extension portion of the inner mold and a near-terminal portion of the second electrical cable, and the third HST segment is positioned over a third extension portion of the inner mold and a near-terminal portion of the third electrical cable.

18. The apparatus of claim 1, further comprising:

a terminal portion of a fourth electrical cable electrically and mechanically coupled to the metal transition conductor.

19. The apparatus of claim 1, further comprising:

additional terminal portions of additional electrical cables, such that the terminal portions of a total of N electrical cables are electrically and mechanically coupled to the metal transition conductor, wherein N is a positive integer greater than 4.

20. The apparatus of claim 1, wherein the terminal portion of each of the first electrical cable, the second electrical cable, and the third electrical cable comprises a flattened core conductor.

21. A wiring harness for forming electrical connections comprising:

a plurality of multi-terminal metal transition connectors; and a plurality of electrical cables segments connecting the plurality of multi-terminal metal transition connectors, wherein the plurality of electrical cable segments include an electrical cable segment connected between a first multi-terminal metal transition connector and a second multi-terminal metal transition connector, and wherein each of the plurality of multi-terminal metal transition connectors comprises:

a metal transition conductor;

a terminal portion of a first electrical cable electrically and mechanically coupled to the metal transition conductor;

a terminal portion of a second electrical cable electrically and mechanically coupled to the metal transition conductor;

a terminal portion of a third electrical cable electrically and mechanically coupled to the metal transition conductor;

wherein the metal transition conductor comprises a metal plate, wherein at least two of the first electrical cable, second electrical cable, and third electrical cable comprise conductors of different metal materials, and wherein at least two of the first electrical cable, second electrical cable, and third electrical cable comprise conductors of different wire gauges; and a mold structure encasing the metal transition conductor, the terminal portion of the first electrical cable, the terminal portion of the second electrical cable, and the terminal portion of the third electrical cable.

22. A solar power system, comprising:

a combiner box;

at least one row of solar panels, the row comprising a plurality of solar panel strings;

a positive terminal wiring harness and a negative terminal wiring harness, each electrically connected between the combiner box and the at least one row of solar panels;

wherein each of the positive and negative terminal wiring harnesses comprises a plurality of connectors, wherein each connector comprises:

a metal transition conductor;

a terminal portion of a first electrical cable electrically and mechanically coupled to the metal transition conductor;

a terminal portion of a second electrical cable electrically and mechanically coupled to the metal transition conductor;

a terminal portion of a third electrical cable electrically and mechanically coupled to the metal transition conductor;

wherein the metal transition conductor comprises a metal plate, wherein each of the first electrical cable, second electrical cable, and third electrical cable terminates at the metal transition conductor, wherein at least two of the first electrical cable, second electrical cable, and third electrical cable comprise conductors of different metal materials, and wherein at least two of the first electrical cable, second electrical cable, and third electrical cable comprise conductors of different wire gauges; and a mold structure encasing the metal transition conductor and the terminal portions of the first, second, and third electrical cables.

23. The solar power system of claim 22, wherein each wiring harness comprises a segment of an aluminum cable extending along the row of solar panels and a plurality of copper cables forming drop lines to corresponding solar panel strings.

24. The solar power system of claim 23, further comprising a metal transition connector positioned between the combiner box and a first of the plurality of connectors, the metal transition connector configured to transition from a copper cable to the aluminum cable.

25. The solar power system of claim 22, wherein each drop line on the positive terminal wiring harness further comprises an in-line fuse.

26. A method of manufacturing an apparatus for forming electrical connections, the method comprising the steps of:

providing a first electrical cable, a second electrical cable, and a third electrical cable, wherein at least two of the electrical cables comprise conductors of different metal materials, and wherein at least two of the electrical cables comprise conductors of different wire gauges;

electrically and mechanically coupling a terminal portion of the first electrical cable, a terminal portion of the second electrical cable, and a terminal portion of the third electrical cable to a metal transition conductor, such that each cable terminates at the metal transition conductor, wherein the metal transition conductor comprises a metal plate; and forming a mold structure to encase the metal transition conductor, the terminal portion of the first electrical cable, the terminal portion of the second electrical cable, and the terminal portion of the third electrical cable.

27. The method of claim 26, wherein the step of electrically and mechanically coupling comprises ultrasonic welding.

28. The method of claim 26, wherein the step of forming a mold structure comprises:

forming an inner mold to encase the metal transition conductor and the terminal portions of the electrical cables; and forming an outer mold to encase the inner mold.

29. The method of claim 28, further comprising the step of:

positioning a plurality of heat shrink tube (HST) segments over extension portions of the inner mold and near-terminal portions of the electrical cables after forming the inner mold and before forming the outer mold; and applying heat to the plurality of HST segments, causing the HST segments to shrink and conform to the extension portions of the inner mold and the near-terminal portions of the electrical cables.

* * * * *